US009983409B2

(12) United States Patent
Ueno et al.

(10) Patent No.: US 9,983,409 B2
(45) Date of Patent: May 29, 2018

(54) STEREOSCOPIC DISPLAY DEVICE AND CONTROL METHOD

(71) Applicant: KYOCERA Corporation, Kyoto-shi, Kyoto (JP)

(72) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 14/431,273

(22) PCT Filed: Sep. 26, 2013

(86) PCT No.: PCT/JP2013/076048
§ 371 (c)(1),
(2) Date: Mar. 25, 2015

(87) PCT Pub. No.: WO2014/050959
PCT Pub. Date: Apr. 3, 2014

(65) Prior Publication Data
US 2015/0260990 A1  Sep. 17, 2015

(30) Foreign Application Priority Data
Sep. 27, 2012  (JP) .................. 2012-214957

(51) Int. Cl.
*G02B 27/01* (2006.01)
*G06T 19/00* (2011.01)
(Continued)

(52) U.S. Cl.
CPC ....... *G02B 27/017* (2013.01); *G02B 27/0101* (2013.01); *G06F 3/01* (2013.01);
(Continued)

(58) Field of Classification Search
CPC . G09G 5/36; G09G 5/00; G09G 3/003; G06F 3/01; G06F 3/017; G06F 3/012;
(Continued)

(56) References Cited

U.S. PATENT DOCUMENTS 6,040,840 A    3/2000  Koshiba et al.
7,328,171 B2   2/2008  Helot et al.
(Continued)

FOREIGN PATENT DOCUMENTS

AU   2011205223 B1   9/2012
CN   1392991 A       1/2003
(Continued)

OTHER PUBLICATIONS

Office Action in JP Application No. 2012-214957, dated Mar. 29, 2016, for which an explanation of relevance is attached.
(Continued)

*Primary Examiner* — Saptarshi Mazumder
(74) *Attorney, Agent, or Firm* — Hauptman Ham, LLP

(57) ABSTRACT

According to one of aspects, a display device includes: a display unit configured to three-dimensionally display an object by displaying images respectively corresponding to both eyes of a user by being worn; a detection unit configured to detect a real body that operates the object; and a control unit configured to change the object according to movement of the real body, and perform order processing for ordering a product corresponding to the object.

8 Claims, 41 Drawing Sheets

(51) Int. Cl.

| | | |
|---|---|---|
| *G09G 3/00* | (2006.01) | |
| *G06F 3/01* | (2006.01) | |
| *H04N 13/02* | (2006.01) | |
| *H04N 13/04* | (2006.01) | |
| *G09G 5/00* | (2006.01) | |
| *G09G 5/36* | (2006.01) | |
| *G06F 3/0481* | (2013.01) | |
| *H04N 13/00* | (2018.01) | |

(52) U.S. Cl.
CPC ............. *G06F 3/011* (2013.01); *G06F 3/012* (2013.01); *G06F 3/017* (2013.01); *G06F 3/04815* (2013.01); *G06T 19/006* (2013.01); *G09G 3/003* (2013.01); *G09G 5/00* (2013.01); *G09G 5/36* (2013.01); *H04N 13/0239* (2013.01); *H04N 13/044* (2013.01); *H04N 13/0468* (2013.01); *G02B 2027/014* (2013.01); *G02B 2027/0134* (2013.01); *G02B 2027/0178* (2013.01); *G09G 2354/00* (2013.01); *H04N 2013/0085* (2013.01); *H04N 2213/008* (2013.01)

(58) Field of Classification Search
CPC ............. H04N 13/044; H04N 13/0239; H04N 2013/0085; H04N 2213/008; G02B 2027/014; G02B 2027/0134
See application file for complete search history.

(56) References Cited

U.S. PATENT DOCUMENTS

| | | | | |
|---|---|---|---|---|
| 7,594,853 | B2* | 9/2009 | Noro | A63F 13/10 |
| | | | | 273/148 B |
| 8,094,091 | B2 | 1/2012 | Noma | |
| 2002/0040332 | A1 | 4/2002 | Maari et al. | |
| 2002/0116295 | A1* | 8/2002 | Shino | G06Q 30/0643 |
| | | | | 705/26.81 |
| 2003/0109949 | A1 | 6/2003 | Ikeda et al. | |
| 2005/0168486 | A1 | 8/2005 | Sato et al. | |
| 2006/0026521 | A1* | 2/2006 | Hotelling | G06F 3/0418 |
| | | | | 715/702 |
| 2009/0077504 | A1 | 3/2009 | Bell et al. | |
| 2010/0070378 | A1* | 3/2010 | Trotman | G06Q 30/02 |
| | | | | 705/26.1 |
| 2011/0140994 | A1* | 6/2011 | Noma | G02B 27/017 |
| | | | | 345/8 |
| 2011/0179368 | A1* | 7/2011 | King | G06F 3/04815 |
| | | | | 715/769 |
| 2011/0191688 | A1 | 8/2011 | Hasegawa et al. | |
| 2012/0050138 | A1* | 3/2012 | Sato | B60K 35/00 |
| | | | | 345/4 |
| 2012/0113104 | A1 | 5/2012 | Jung et al. | |
| 2012/0113223 | A1 | 5/2012 | Hilliges et al. | |
| 2012/0159402 | A1 | 6/2012 | Nurmi et al. | |
| 2012/0212509 | A1 | 8/2012 | Benko et al. | |
| 2012/0299909 | A1* | 11/2012 | Ueno | G06F 3/0346 |
| | | | | 345/419 |
| 2013/0050061 | A1 | 2/2013 | Ueno et al. | |
| 2013/0286004 | A1 | 10/2013 | McCulloch et al. | |

FOREIGN PATENT DOCUMENTS

| | | |
|---|---|---|
| JP | 7-104718 A | 4/1995 |
| JP | 10-334278 A | 12/1998 |
| JP | 2001-344484 A | 12/2001 |
| JP | 2002-15144 A | 1/2002 |
| JP | 2002-109301 A | 4/2002 |
| JP | 2002-109306 A | 4/2002 |
| JP | 2004-234439 A | 8/2004 |
| JP | 2011-95547 A | 5/2011 |
| JP | 2011-128220 A | 6/2011 |
| JP | 2011-164696 A | 8/2011 |
| JP | 2011-253324 A | 12/2011 |
| JP | 2013-520729 A | 6/2013 |
| WO | 02/084550 A1 | 10/2002 |
| WO | 03/030045 A1 | 4/2003 |
| WO | 2011/103272 A2 | 8/2011 |

OTHER PUBLICATIONS

International Search Report and Written Opinion dated Oct. 29, 2013 in corresponding International Application No. PCT/JP2013/076048.
Extended European Search Report in EP Application No. 13841377.8 dated Apr. 7, 2016.
Office Action in JP Application No. 2016-129394, dated Feb. 21, 2017, for which an explanation of relevance is attached.
Office Action in JP Application No. 2012-214957, dated Mar. 28, 2017, for which an explanation of relevance is attached.
Office Action in U.S. Appl. No. 15/424,705, dated Jun. 20, 2017.
Office Action in JP Application No. 2016-129394, dated Aug. 15, 2017, for which an explanation of relevance is attached. 3pp.
Office Action in EP Application No. 13841377.8, dated Aug. 17, 2017. 8pp.
Office Action in U.S. Appl. No. 15/424,705, dated Oct. 18, 2017, 81pp.
Office Action in CN Application No. 201380050402.6 dated Jul. 4, 2017, for which an explanation of relevance is attached.
Office Action in JP Application No. 2016-129394, dated Feb. 27, 2018, for which an explanation of relevance is attached, 4pp.
Office Action in U.S. Appl. No. 15/424,705, dated Feb. 23, 2018, 55pp.

\* cited by examiner

| TYPE | FULCRUM | OBSTACLE | SPEED OF PRESSING | CHANGE |
|---|---|---|---|---|
| RIGID BODY | ABSENT | ABSENT | * | MOVED IN DIRECTION OF PRESSING ACCORDING TO AMOUNT OF PRESSING |
| | | FIXED OBSTACLE | * | MOVED IN DIRECTION OF PRESSING ACCORDING TO AMOUNT OF PRESSING NOT MOVED AFTER COMING IN CONTACT WITH OBSTACLE |
| | | ANOTHER RIGID BODY | SLOW | MOVED IN DIRECTION OF PRESSING ACCORDING TO AMOUNT OF PRESSING MOVED TOGETHER WITH ANOTHER RIGID BODY AFTER COMING IN CONTACT WITH ANOTHER RIGID BODY |
| | | | FAST | MOVED IN DIRECTION OF PRESSING ACCORDING TO AMOUNT OF PRESSING MOVED SUCH THAT ANOTHER RIGID BODY IS FLICKED WHEN COMING IN CONTACT WITH ANOTHER RIGID BODY |
| | | ANOTHER RIGID BODY (CAPABLE OF BEING PASSED THROUGH) | * | MOVED IN DIRECTION OF PRESSING ACCORDING TO AMOUNT OF PRESSING MOVED TO PASS THROUGH ANOTHER RIGID BODY WHEN COMING IN CONTACT WITH ANOTHER RIGID BODY |
| | PRESENT | ABSENT | * | ROTATED AROUND FULCRUM |

FIG.14

| TYPE | MATERIAL | AMOUNT OF CHANGE | SPEED OF PRESSING | CHANGE |
|---|---|---|---|---|
| ELASTIC BODY | RUBBER BASE | NO LIMITATION | SLOW | DEFORMED IN DIRECTION OF PRESSING ACCORDING TO AMOUNT OF PRESSING RETURNED TO ORIGINAL SHAPE WHEN BEING RELEASED |
| | | | FAST | DEFORMED IN DIRECTION OF PRESSING ACCORDING TO AMOUNT OF PRESSING AFTER THAT, MOVED WHILE RETURNING TO ORIGINAL SHAPE |
| | METAL BASE | LIMITED | * | DEFORMED IN DIRECTION OF PRESSING ACCORDING TO AMOUNT OF PRESSING UP TO DEFORMABLE RANGE AFTER THAT, MOVED WHILE RETURNING TO ORIGINAL SHAPE |
| | | LIMITED | * | WHEN BEING PRESSED IN DEFORMABLE DIRECTION, DEFORMED IN DIRECTION OF PRESSING ACCORDING TO AMOUNT OF PRESSING UP TO DEFORMABLE RANGE WHEN BEING RELEASED, REPEATEDLY RETURNED TO ORIGINAL SHAPE AND DEFORMED (VIBRATE) WHEN BEING PRESSED IN DIRECTION OTHER THAN DEFORMABLE DIRECTION, MOVED SIMILARLY TO RIGID BODY |

FIG.15

| TYPE | CHANGE |
|---|---|
| PLASTIC BODY | ENTIRE SHAPE IS DEFORMED SUCH THAT PRESSED PORTION IS RECESSED |

| TYPE | SPEED OF PRESSING | CHANGE |
|---|---|---|
| LIQUID | SLOW | BODY IS SUBMERGED IN LIQUID |
| | MEDIUM | BODY IS SUBMERGED IN LIQUID<br>RIPPLE OUT IN WAVES |
| | FAST | BODY IS SUBMERGED IN LIQUID<br>MAKE SPLASH |

| TYPE | SPEED OF PRESSING | CHANGE |
|---|---|---|
| GAS | SLOW | INTERRUPTED BY BODY (HANG AROUND) |
| | MEDIUM | SCATTERED |
| | FAST | CAUSE WHIRL BY TURBULENCE AT REAR SIDE IN MOVING DIRECTION OF BODY |

| TYPE | BONDING OF ELEMENTS | CHANGE |
|---|---|---|
| AGGRE-GATION | NOT BONDED | ENTIRE SHAPE AS AGGREGATION IS DEFORMED SUCH THAT PRESSED PORTION IS RECESSED |
| | BONDED | ENTIRE SHAPE AS AGGREGATION IS DEFORMED SUCH THAT PRESSED PORTION IS RECESSED. ELEMENTS OTHER THAN PRESSED PORTION ARE PULLED BY ELEMENTS IN PRESSED PORTION AND MOVED |
| | NOT BONDED (ATTRACTION FORCE OR REPULSIVE FORCE IS WORKING BETWEEN THREE-DIMENSIONAL OBJECT AND BODY) | WHEN ATTRACTION FORCE ACTS, ELEMENTS ARE ATTRACTED BY BODY WHEN ENTERING WITHIN PREDETERMINED DISTANCE TO BODY WITHOUT BEING IN CONTACT WITH BODY. WHEN REPULSIVE FORCE ACTS, ELEMENTS ARE MOVED AWAY FROM BODY WHEN ENTERING WITHIN PREDETERMINED DISTANCE TO BODY WITHOUT BEING IN CONTACT WITH BODY |

FIG.25
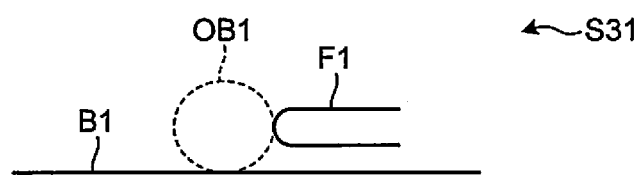
← S31
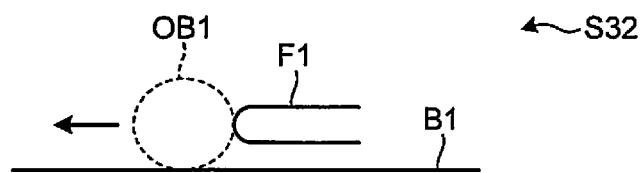
← S32
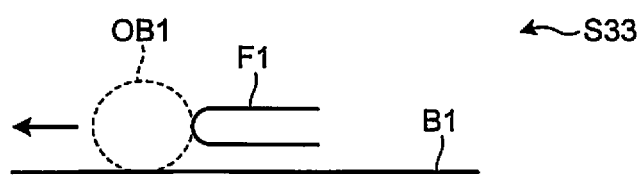
← S33

FIG.26
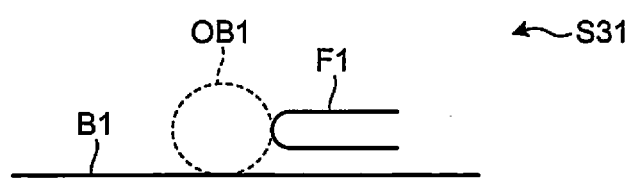
← S31
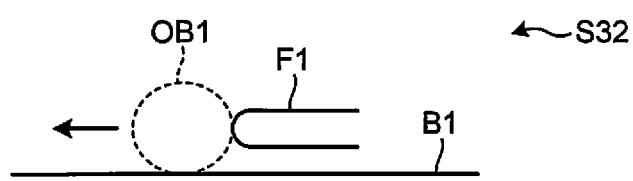
← S32
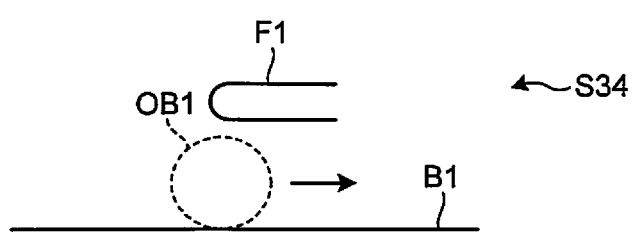
← S34

FIG.32
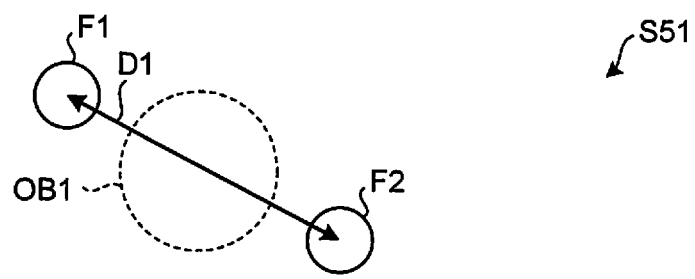
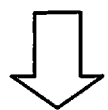
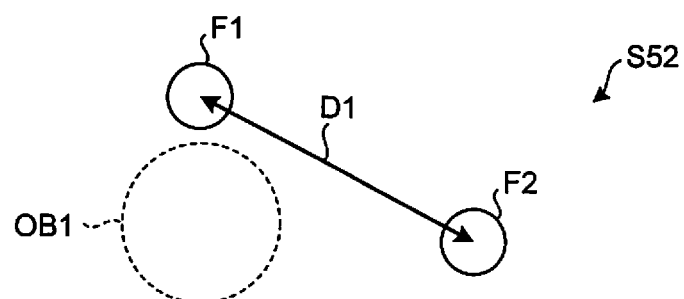
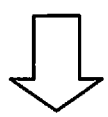
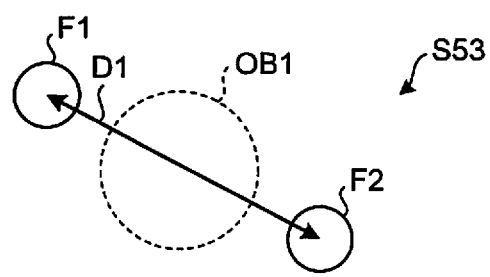

FIG.34
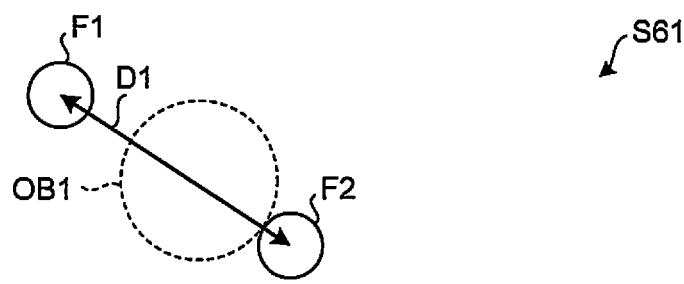
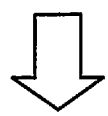
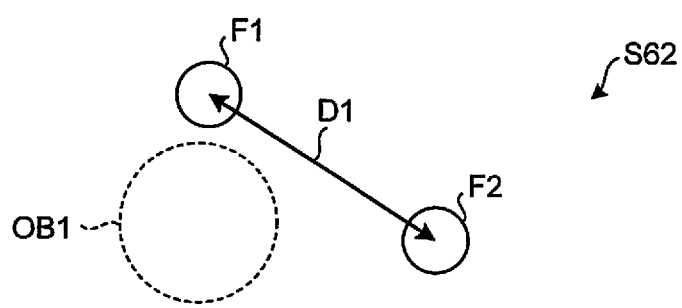
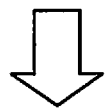
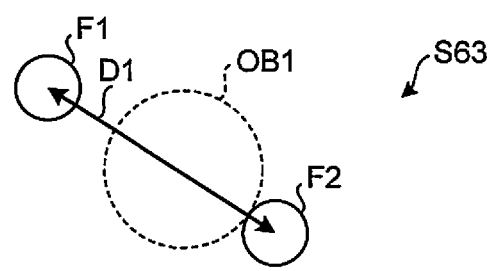

FIG.35
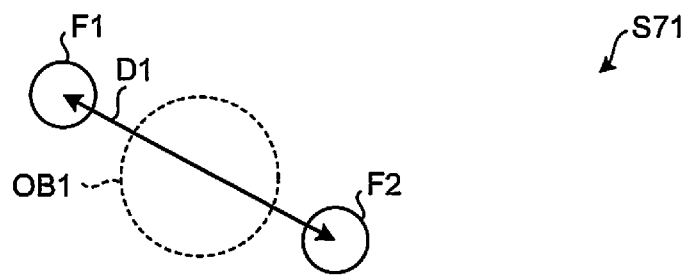
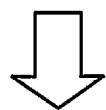
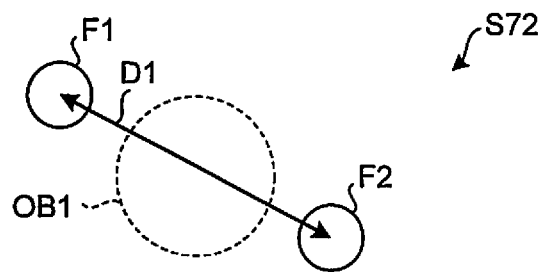
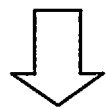
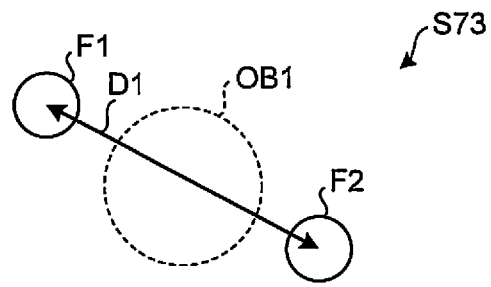

FIG.36
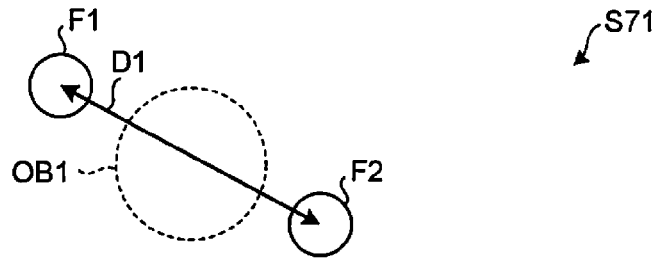
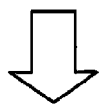
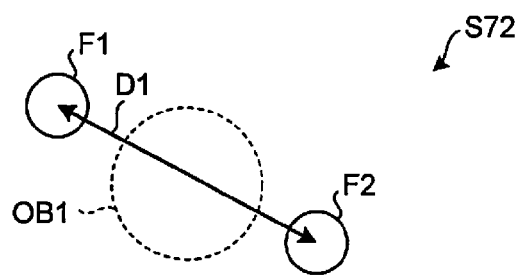
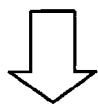
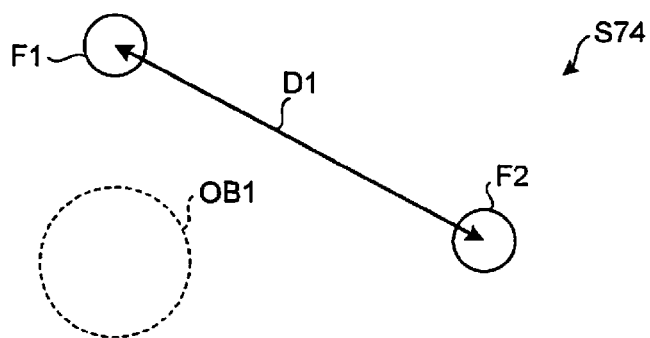

FIG.39
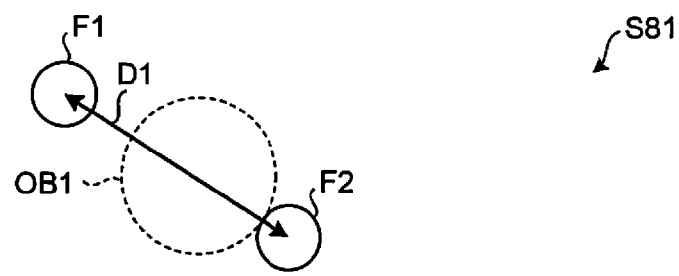
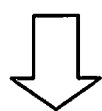
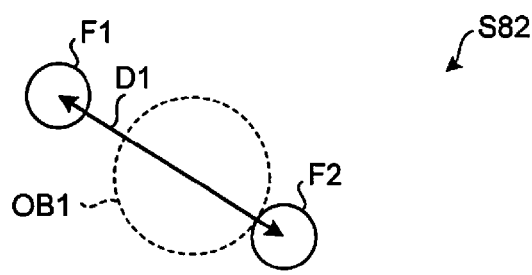
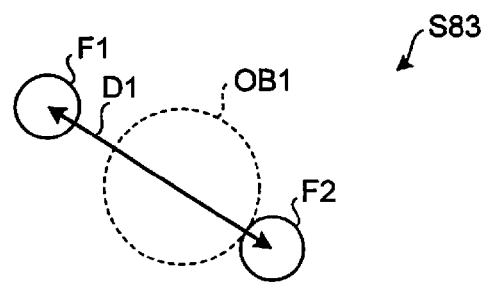

FIG.40
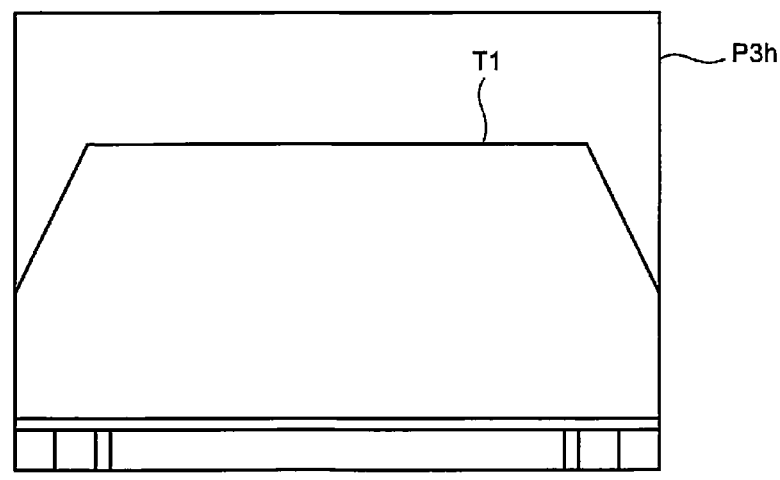
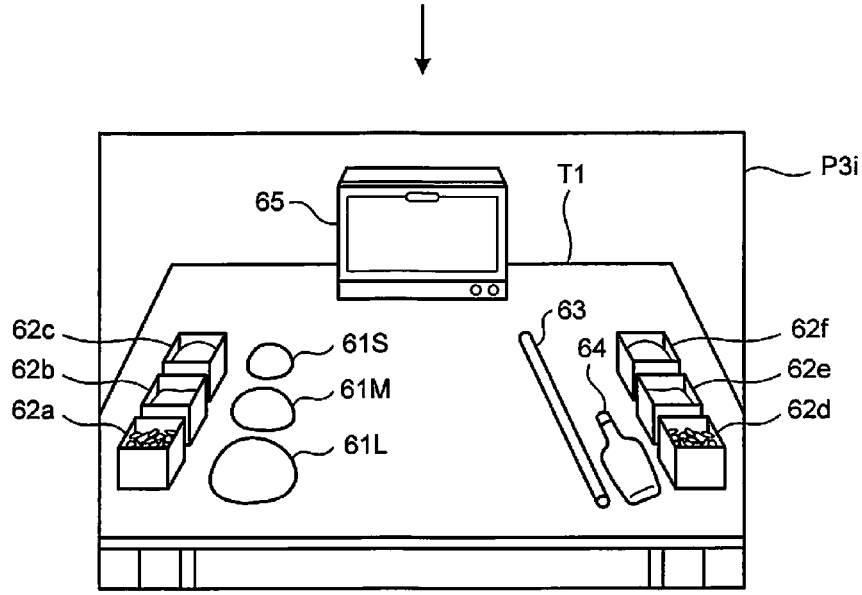

STEREOSCOPIC DISPLAY DEVICE AND CONTROL METHOD

CROSS-REFERENCE TO RELATED APPLICATION

This application is a National Stage of PCT international application Ser. No. PCT/JP2013/076048 filed on Sep. 26, 2013 which designates the United States, incorporated herein by reference, and which is based upon and claims the benefit of priority from Japanese Patent Application No. 2012-214957 filed on Sep. 27, 2012, the entire contents of which are incorporated herein by reference.

FIELD

The present disclosure relates to a display device and a control method.

BACKGROUND

Among display devices that include a display unit, there are ones that can stereoscopically display images and the like (for example, see Patent Literature 1). The stereoscopic display is realized using binocular parallax.

CITATION LIST

Patent Literature

Patent Literature 1: JP 2011-95547 A

Technical Problem

Although the stereoscopic display is a display format that is friendly to users, the stereoscopic display is used only for the purpose of viewing and is not used for improving convenience of operations in the conventional display devices. For the foregoing reasons, there is a need for a display device and a control method, which can provide the user with a highly convenient operation method.

SUMMARY

According to one of aspects, a display device includes: a display unit configured to three-dimensionally display an object by displaying images respectively corresponding to both eyes of a user by being worn; a detection unit configured to detect a real body that operates the object; and a control unit configured to change the object according to movement of the real body, and perform order processing for ordering a product corresponding to the object.

According to another aspect, a control method of a display device includes: three-dimensionally displaying an object by displaying images respectively corresponding to both eyes of a user; detecting a real body that operates the object; changing the object according to movement of the real body; and performing order processing for ordering a product corresponding to the object according to movement of the real body.

Advantageous Effects of Invention

One of embodiments of the present invention exhibits an effect to provide the users with a highly convenient operation method.

BRIEF DESCRIPTION OF DRAWINGS

FIG. 13 is a diagram illustrating one of examples of information stored in acting data.

FIG. 14 is a diagram illustrating one of examples of information stored in acting data.

FIG. 15 is a diagram illustrating one of examples of information stored in acting data.

FIG. 16 is a diagram illustrating one of examples of information stored in acting data.

FIG. 17 is a diagram illustrating one of examples of information stored in acting data.

FIG. 18 is a diagram illustrating one of examples of information stored in acting data.

FIG. 25 is a diagram for describing a third example of detection of operation of pressing a three-dimensional object, and change of the three-dimensional object according to the detected operation.

FIG. 26 is a diagram for describing the third example of detection of operation of pressing a three-dimensional object, and change of the three-dimensional object according to the detected operation.

FIG. 32 is a diagram for describing a second example of detection of operation performed by holding a three-dimensional object.

FIG. 34 is a diagram for describing a modification of the second example of detection of operation performed by holding a three-dimensional object.

FIG. 35 is a diagram for describing a third example of detection of operation performed by holding a three-dimensional object.

FIG. 36 is a diagram for describing the third example of detection of operation performed by holding a three-dimensional object.

FIG. 39 is a diagram for describing a modification of the third example of detection of operation performed by holding a three-dimensional object.

FIG. 40 is a diagram for describing start of order processing of a pizza.

DESCRIPTION OF EMBODIMENTS

Hereinafter, embodiments will be described in details with reference to the drawings. The present invention is not limited by the description below. Configuration elements in the description below include things which can be easily conceived by a person skilled in the art, which are substantially the same, and which are so-called equivalents.

Embodiment 1

Figure 1:
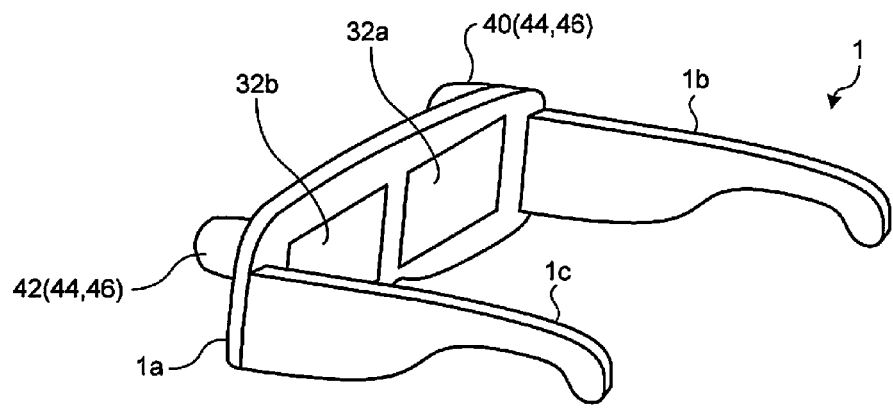
FIG. 1 is a perspective view of a display device according to a first embodiment.
Figure 2:
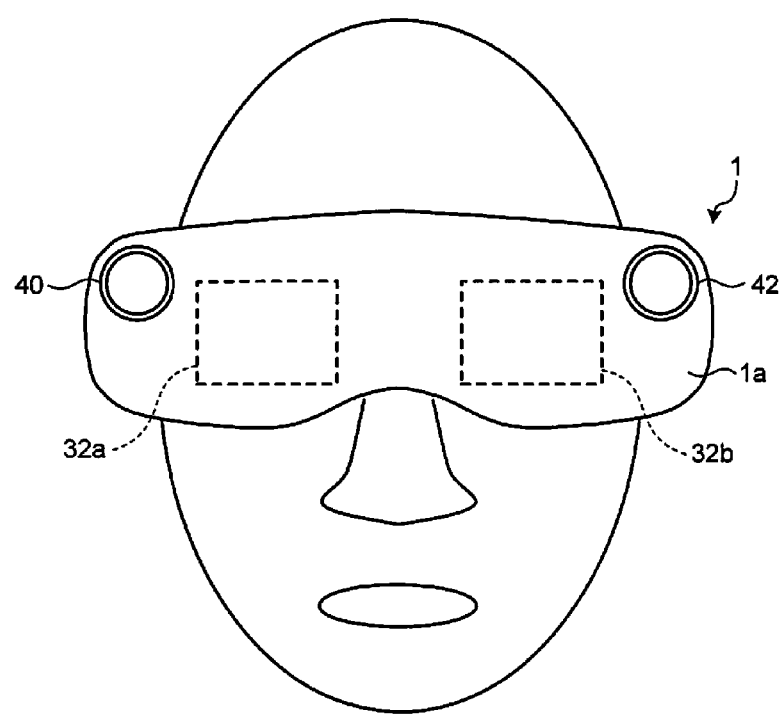
FIG. 2 is a diagram of the display device worn by a user as viewed from the front.

First of all, an overall configuration of a display device 1 according to a first embodiment will be described with reference to FIGS. 1 and 2. FIG. 1 is a perspective view of the display device 1. FIG. 2 is a diagram of the display device 1 worn by a user as viewed from the front. As illustrated in FIGS. 1 and 2, the display device 1 is a head mount-type device that is worn on the head of the user.

The display device 1 includes a front portion 1a, a side portion 1b, and a side portion 1c. The front portion 1a is arranged in front of the user to cover both eyes of the user when being worn by the user. The side portion 1b is connected to one end portion of the front portion 1a, and the side portion 1c is connected to the other end portion of the front portion 1a. The side portion 1b and the side portion 1c are supported by ears of the user like temples of eyeglasses when being worn, and stabilize the display device 1. The side portion 1b and the side portion 1c may be configured to be connected at the rear of the head of the user when being worn.

The front portion 1a includes a display unit 32a and a display unit 32b on a side facing the eyes of the user when being worn. The display unit 32a is arranged at a position facing a right eye of the user when being worn, and the display unit 32b is arranged at a position facing a left eye of the user when being worn. The display unit 32a displays an image for the right eye, and the display unit 32b displays an image for the left eye. As described above, the display device 1 can realize three-dimensional display using binocular parallax by including the display units 32a and 32b that display the images corresponding to the respective eyes of the user when being worn.

The display units 32a and 32b may be configured from one display device as long as the device can independently provide different images for the right eye and the left eye of the user. For example, the one display device may be configured to independently provide the different images for the right eye and the left eye by quickly switching a shutter that shields one eye so that only the other eye can see a displayed image. The front portion 1a may be configured to cover the eyes of the user so that light from outside does not enter the eyes of the user when being worn.

The front portion 1a includes an imaging unit 40 and an imaging unit 42 on a face opposite to the face where the display unit 32a and the display unit 32b are provided. The imaging unit 40 is arranged near one end portion (a right eye side when being worn) of the front portion 1a, and the imaging unit 42 is arranged near the other end portion (a left eye side when being worn) of the front portion 1a. The imaging unit 40 acquires an image in a range corresponding to a field of view of the right eye of the user. The imaging unit 42 acquires an image in a range corresponding to a field of view of the left eye of the user. The field of view referred to here is, for example, a field of view of when the user sees the front.

The display device 1 displays an image captured by the imaging unit 40 in the display unit 32a as an image for the right eye, and displays an image captured by the imaging unit 42 in the display unit 32b as an image for the left eye. Therefore, the display device 1 can provide the user who wears the display device 1 with a scene similar to a scene that is viewed by the user who does not wear the display device 1, even if the field of view is shielded by the front portion 1a.

The display device 1 has a function to three-dimensionally display virtual information, and to enable the user to operate the virtual information, in addition to the function to provide the user with a real scene as described above. According to the display device 1, the virtual information is superimposed on the real scene and displayed as if actually existed. The user can operate the virtual information as if the user actually touched the virtual information using a hand, for example, and apply change such as movement, rotation, deformation, or the like to the virtual information. As described above, the display device 1 provides an intuitive and highly convenient operation method in regard to the virtual information. In the description below, the virtual information that is three-dimensionally displayed by the display device 1 may be called "three-dimensional object".

The display device 1 provides the user with a wide field of view similar to a case where the user does not wear the display device 1. Further, the display device 1 can arrange a three-dimensional object with an arbitrary size in an arbitrary position in the wide field of view. As described above, the display device 1 can display three-dimensional objects having various sizes in various positions in a wide space without limitation due to size of the display device. Further, a person who can see the three-dimensional object is limited to the user of the display device 1. Therefore, high security can be secured.

Figure 3:
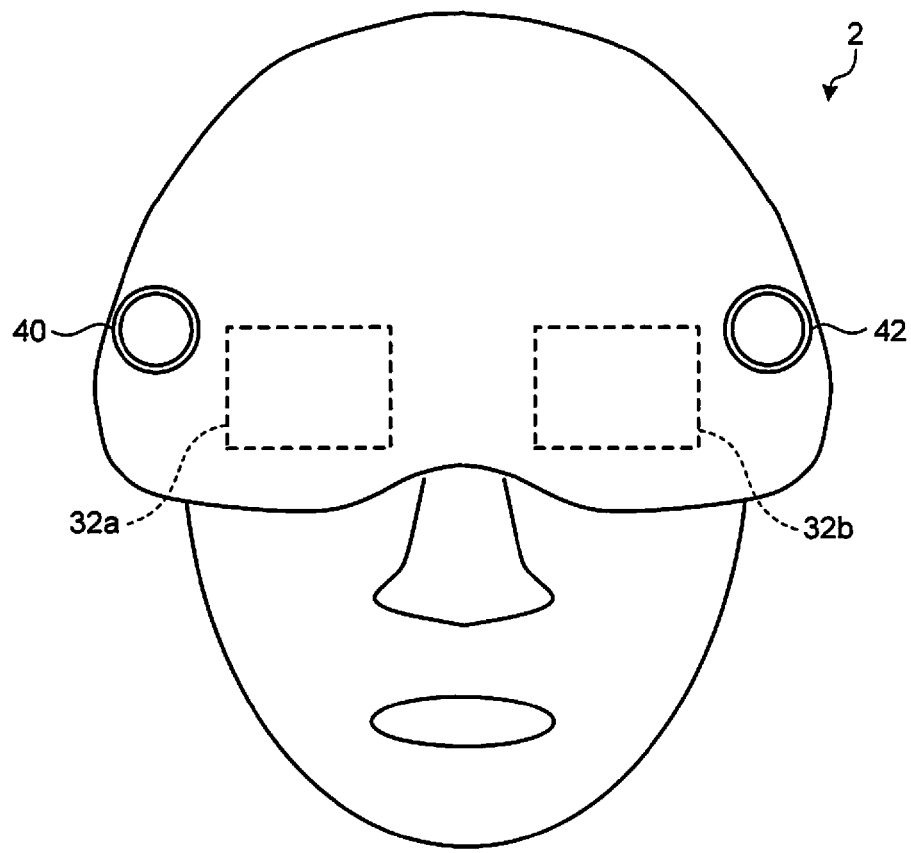
FIG. 3 is a diagram illustrating a modification of a display device.
Figure 4:
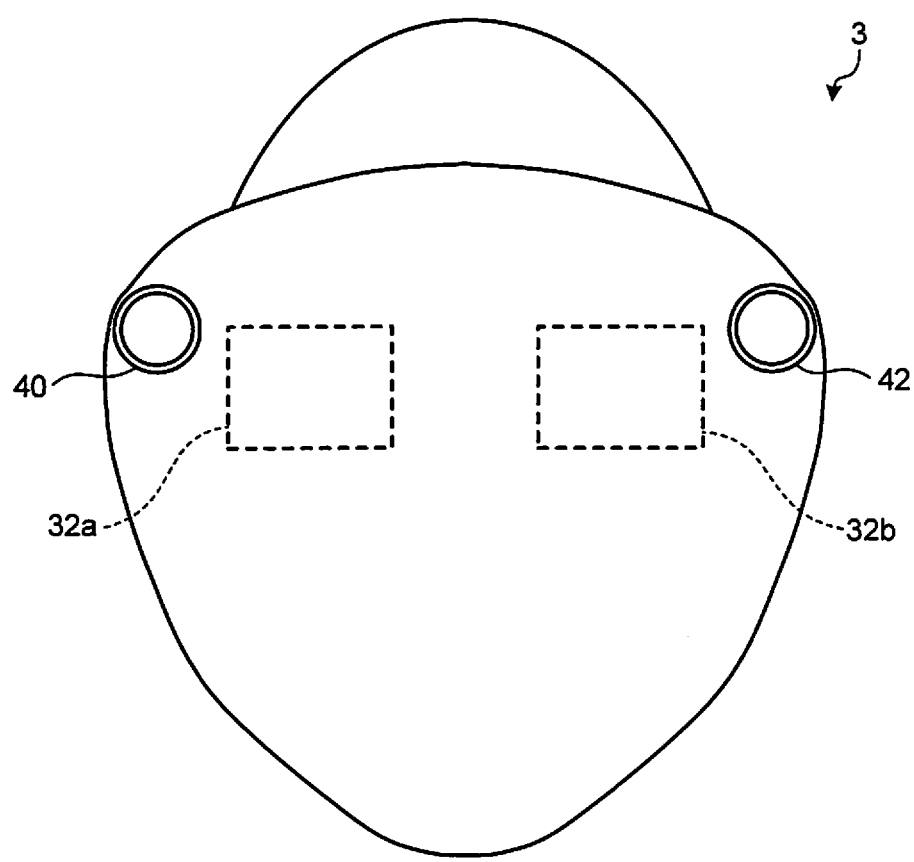
FIG. 4 is a diagram illustrating another modification of a display device.
Figure 5:
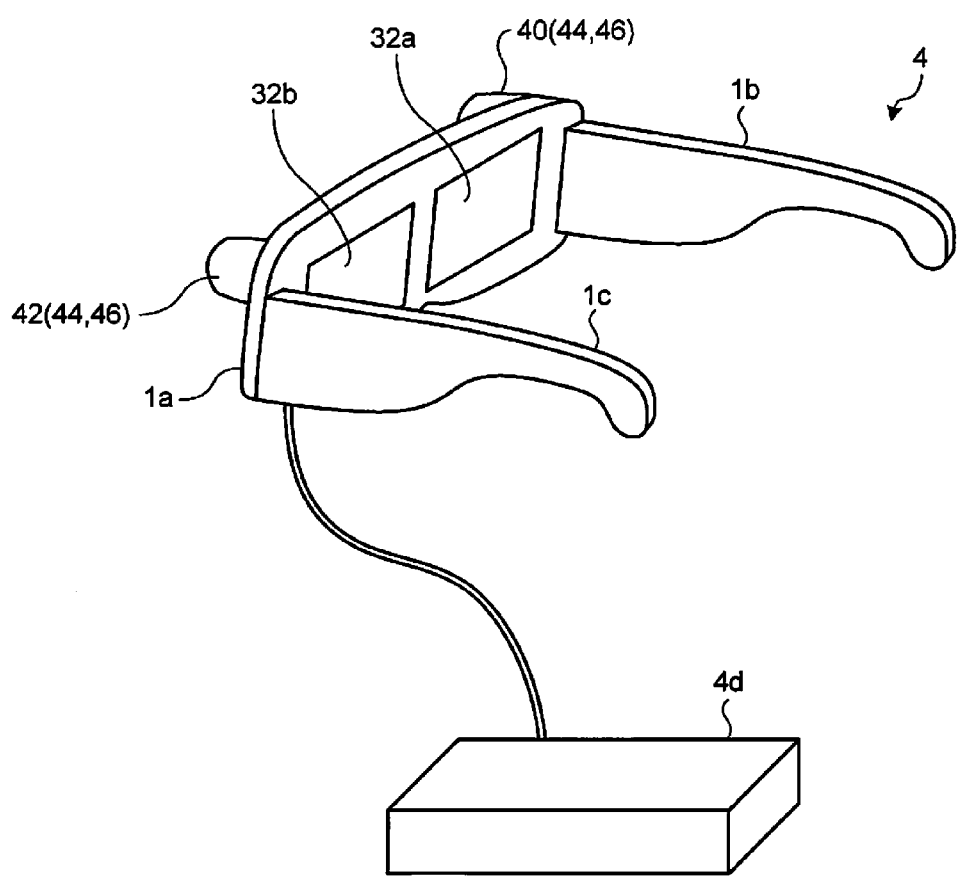
FIG. 5 is a diagram illustrating still another modification of a display device.

While, in FIGS. 1 and 2, one of examples in which the display device 1 has a shape of eyeglasses (goggles) has been described, the shape of the display device 1 is not limited thereto. For example, the display device 1 may have a helmet-type shape that substantially covers an upper half of the head of the user, like a display device 2 illustrated in FIG. 3. Alternatively, the display device 1 may have a mask-type shape that substantially covers the entire face of the user, like a display device 3 illustrated in FIG. 4. The display device 1 may be configured to be connected with an external device 4d such as an information processing device or a battery device in a wireless or wired manner, like a display device 4 illustrated in FIG. 5.

Figure 6:
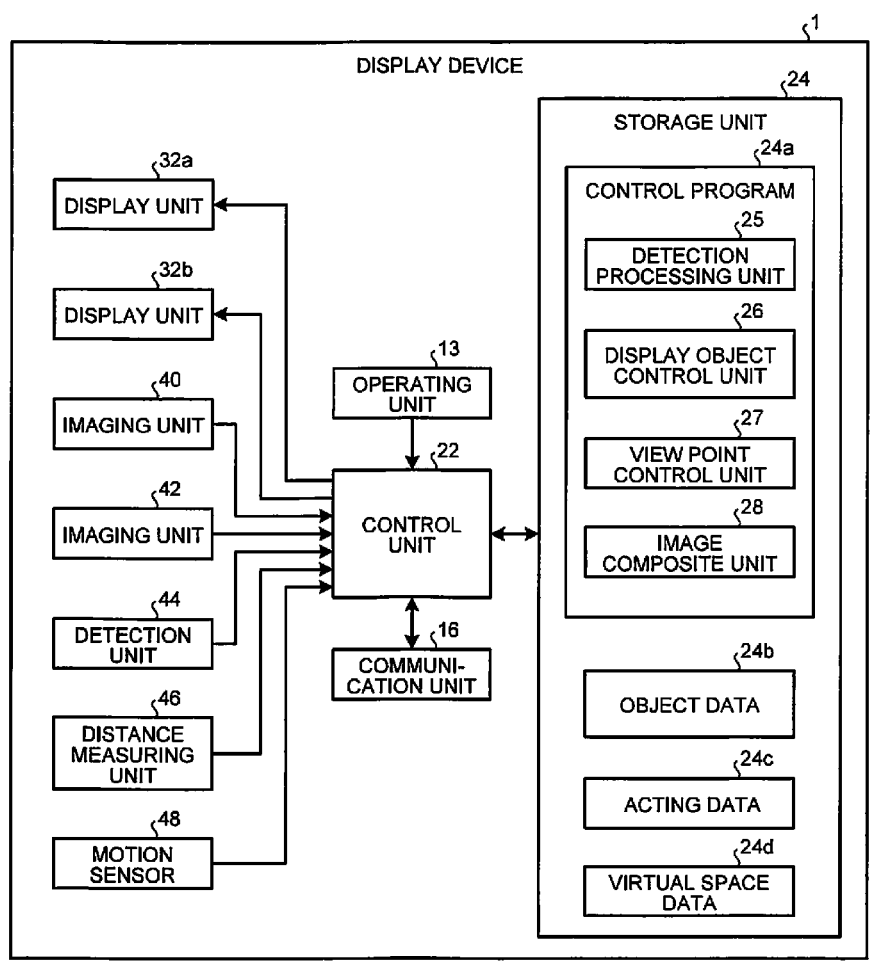
FIG. 6 is a block diagram of the display device according to the first embodiment.

Then, a functional configuration of the display device 1 will be described with reference to FIG. 6. FIG. 6 is a block diagram of the display device 1. As illustrated in FIG. 6, the display device 1 includes an operating unit 13, a control unit 22, a storage unit 24, a communication unit 16, display units 32a and 32b, imaging units 40 and 42, a detection unit 44, a distance measuring unit 46, and a motion sensor 48. The operating unit 13 receives basic operations such as activation, stop, and change of an operation mode of the display device 1.

The communication unit 16 performs communication with other devices. The communication unit 16 may support a communication system that performs wireless communication within a relatively small range such as a wireless LAN or Bluetooth, or may support a communication system that performs wireless communication within a relatively large range such as a 3G communication system or a 4G communication system for communication carriers. The communication unit 16 may support a wired communication system such as Ethernet. The communication unit 16 may support a plurality of communication systems.

The display units 32a and 32b include a display device such as a liquid crystal display or an organic electroluminescence panel, and displays various types of information according to a control signal input from the control unit 22. The display units 32a and 32b may be projection devices that project images on retinas of the user using a light source such as a laser beam or the like.

The imaging units 40 and 42 electronically capture images using an image sensor such as a charge coupled device image sensor (CCD) or a complementary metal oxide semiconductor (CMOS). The imaging units 40 and 42 convert the imaged images into signals, and output the signals to the control unit 22.

The detection unit 44 detects a real body existing in image ranges of the imaging units 40 and 42. For example, the detection unit 44 detects a body that is matched with a shape registered in advance (for example, a shape of a hand of a human), among real bodies existing in the image ranges. Even about a body, the shape of which is not registered in advance, the detection unit 44 may detect a range (the shape and the size) of the real body in the image based on brightness and/or chroma of pixels, edges of hue, and the like.

The distance measuring unit 46 measures distances to the real body existing in the image ranges of the imaging units 40 and 42. The distances to the real body are measured, for respective eyes, with respect to the positions of the respective eyes of the user who wears the display device 1. Therefore, when reference positions with which the distance measuring unit 46 measures the distances are deviated from the positions of the respective eyes, measured values of the distance measuring unit 46 are corrected to express the distances to the positions of the eyes according to the deviation.

In the present embodiment, the imaging units 40 and 42 function as both of the detection unit 44 and the distance measuring unit 46. That is, in the present embodiment, the imaging units 40 and 42 detect the body in the image ranges by analyzing the images imaged by the imaging units 40 and 42. Further, the imaging units 40 and 42 measure (calculate) the distance to the body by comparing the body included in the image captured by the imaging unit 40 and the body included in the image captured by the imaging unit 42.

The display device 1 may include the detection unit 44 separately from the imaging units 40 and 42. The detection unit 44 may be a sensor that detects the real body existing in the image ranges using at least one of visible light, infrared light, ultraviolet rays, a radio wave, a sound wave, magnetism, and capacitance, for example. The display device 1 may include the distance measuring unit 46 separately from the imaging units 40 and 42. The distance measuring unit 46 may be a sensor that detects the distance to the real body existing in the image ranges using at least one of the visible light, infrared light, ultraviolet rays, a radio wave, a sound wave, magnetism, and capacitance, for example. The display device 1 may include a sensor that can function as both of the detection unit 44 and the distance measuring unit 46, like a sensor using a time-of-flight (TOF) method.

The motion sensor 48 detects change of a position and change of a direction (attitude) of the display device 1. The change of a position and the change of a direction are three-dimensionally detected. That is, the motion sensor 48 detects the change of a position and the change of a direction not only in a horizontal direction but also in a vertical direction. The motion sensor 48 includes a triaxial acceleration sensor in order to detect the change of a position and the change of a direction of the display device 1, for example. The motion sensor 48 may include a global positioning system (GPS) receiver or a barometer sensor in order to detect the change of a position of the display device 1. The motion sensor 48 may use a measurement result of a distance by the distance measuring unit 46 in order to detect the change of a position of the display device 1. The motion sensor 48 may combine a plurality of systems to detect the change of a position of the display device 1. The motion sensor 48 may include a gyro sensor or a compass sensor in order to detect the change of a direction of the display device 1. The motion sensor 48 may combine a plurality of systems to detect the change of a direction of the display device 1.

The control unit 22 includes a central processing unit (CPU) as calculation means, and a memory as storage means, and realizes various functions by executing a program using these hardware resources. To be specific, the control unit 22 reads out a program and data stored in the storage unit 24 and loads the program and data to the memory, and causes the CPU to execute commands included in the program loaded to the memory. The control unit 22 then reads/writes data from/to the memory and the storage unit 24, and controls operations of the display unit 32*a* and the like, according to execution results of the commands by the CPU. When the CPU executes the commands, the data loaded to the memory, and the operation detected through the detection unit 44 are used as a part of parameters or determination conditions.

The storage unit 24 is constituted of a non-volatile storage device such as a flash memory, and stores therein various programs and data. The programs stored in the storage unit 24 include a control program 24*a*. The data stored in the storage unit 24 include object data 24*b*, acting data 24*c*, and virtual space data 24*d*. The storage unit 24 may be configured by a combination of a portable storage medium such as a memory card, and a read/write device that perform reading/writing from/to the storage medium. In this case, the control program 24*a*, the object data 24*b*, the acting data 24*c*, and the virtual space data 24*d* may be stored in the storage medium. The control program 24*a*, the object data 24*b*, the acting data 24*c*, and the virtual space data 24*d* may be acquired from another device such as a server via communication by the communication unit 16.

The control program 24*a* provides functions related to various types of control for operating the display device 1. The functions provided by the control program 24*a* include a function to superimpose a three-dimensional object on the images acquired by the imaging units 40 and 42 and display the superimposed images in the display units 32*a* and 32*b*, a function to detect operation to the three-dimensional object, a function to change the three-dimensional object according to the detected operation, and the like.

The control program 24*a* includes a detection processing unit 25, a display object control unit 26, a view point control unit 27, and an image composite unit 28. The detection processing unit 25 provides a function for detecting the real body existing in the image ranges of the imaging units 40 and 42. The function provided by the detection processing unit 25 includes a function to measure the distances to the detected respective bodies.

The display object control unit 26 provides a function for managing what types of three-dimensional objects are arranged in a virtual space, and in what state each of the three-dimensional objects is. The function provided by the display object control unit 26 includes a function to detect the operation to the three-dimensional object based on movement of the real body detected by the function of the detection processing unit 25, and change the three-dimensional object based on the detected operation.

The view point control unit 27 provides a function to manage a position and a direction of a view point of the user in the virtual space. The function provided by the view point control unit 27 includes a function to change the position and the direction of the view point of the user in the virtual space according to the change of a position and the change of a direction of the display device 1, which are detected by the motion sensor 48. For example, when it is detected by the motion sensor 48 that the display device 1 has been moved forward, the view point control unit 27 moves the view point of the user in the virtual space forward. For example, when it is detected by the motion sensor 48 that the display device 1 has been rotated rightward, the view point control unit 27 rotates the view point of the user in the virtual space rightward. In this way, the position and the direction of the view point of the user in the virtual space is changed in accordance with the change of a position and a direction of the display device 1, whereby change of an image in the virtual space that is superimposed and displayed on an image in the real space can be matched with change of the image in the real space.

The image composite unit 28 provides a function to generate an image to be displayed in the display unit 32*a* and an image to be displayed in the display unit 32*b* by compositing an image in the real space and an image in the virtual space. The function provided by the image composite unit 28 includes a function to determine front and rear relationship between a real body and the three-dimensional object, based on the distance to the real body measured by the function of the detection processing unit 25, and the distance from a view point to the three-dimensional object in the virtual space, and to adjust overlapping.

The object data 24*b* includes information related to the shape and the properties of the three-dimensional object. The object data 24*b* is used to display the three-dimensional object. The acting data 24*c* includes information related to how operation to the displayed three-dimensional object acts on the three-dimensional object. The acting data 24*c* is used to determine how to change the three-dimensional object, when the operation to the displayed three-dimensional object is detected. The change referred to here includes movement, rotation, deformation, disappearance, replacement, and the like. The virtual space data 24*d* holds information related to a state of the three-dimensional object arranged in the virtual space. The state of the three-dimensional object includes, for example, a position, an attitude, a status of deformation, and the like.

Then, one of examples of control based on the functions provided by the control program 24*a* will be described with reference to FIG. 7. An image P1*a* is an image obtained by the imaging unit 40, that is, an image corresponding to a scene of the real space viewed by the right eye. In the image P1*a*, a table T1 and a hand H1 of the user appear. The display device 1 also acquires an image of the same scene imaged by the imaging unit 42, that is, an image corresponding to a scene of the real space viewed by the left eye.

An image P2*a* is an image for the right eye generated based on the virtual space data 24*d* and the object data 24*b*. In this example, the virtual space data 24*d* holds information related to a state of a block-like three-dimensional object BL1 existing in the virtual space, and the object data 24*b* holds information related to the shape and the properties of the three-dimensional object BL1. The display device 1 reproduces a virtual space based on these pieces of information, and generates the image P2*a* that is the reproduced virtual space viewed from a view point of the right eye. The position of the right eye (view point) in the virtual space is determined based on a predetermined rule. Similarly, the display device 1 also generates an image that is the reproduced virtual space viewed from a view point of the left eye. That is, the display device 1 also generates an image that causes the three-dimensional object BL1 to be three-dimensionally displayed in combination with the image P2*a*.

Figure 7:
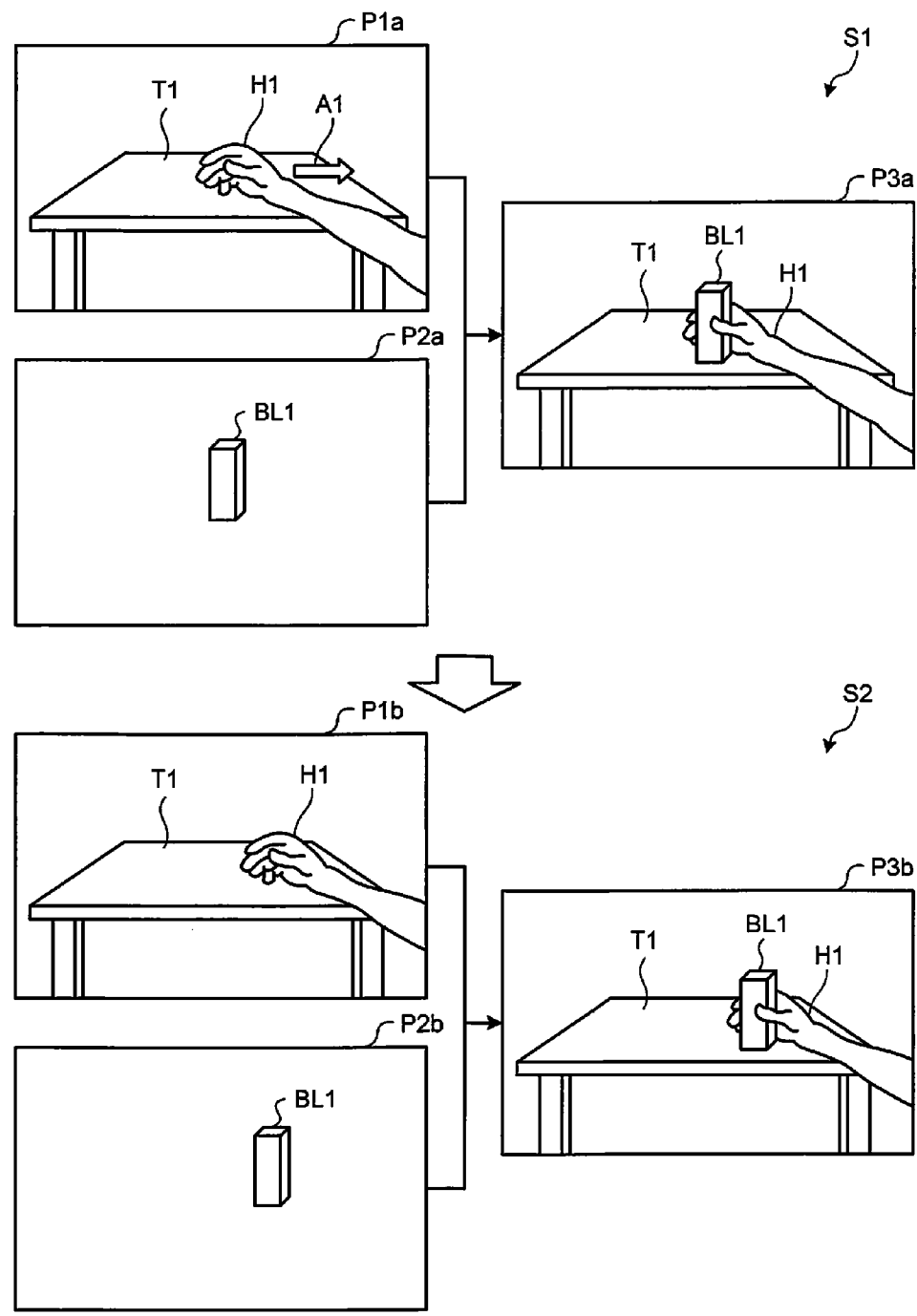
FIG. 7 is a diagram illustrating one of examples of control based on a function provided by a control program.

At Step S1 illustrated in FIG. 7, the display device 1 composites the image P1*a* and the image P2*a* to generate an image P3*a*. The image P3*a* is an image displayed in the display unit 32*a*, as an image for the right eye. At this time, the display device 1 determines the front and rear relationship between the real body existing in an imaging range of the imaging unit 40 and the three-dimensional object BL1 existing in the virtual space using the position of the right eye of the user as a reference point. Then, when the real body and the three-dimensional object BL1 overlap with each other, the display device 1 adjusts the overlapping such that one closer to the right eye of the user can be seen in front.

Such adjustment of overlapping is performed for each range (for example, for each pixel) of a predetermined size within a region on the image where the real body and the three-dimensional object BL1 overlap with each other. Therefore, the distance from a view point to the real body in the real space is measured for each range of a predetermined size on the image. Further, the distance from the view point to the three-dimensional object BL1 in the virtual space is calculated for each range of a predetermined size on the image, in consideration of the position, the shape, the attitude, and the like of the three-dimensional object BL1.

In the scene of Step S1 illustrated in FIG. 7, in the virtual space, the three-dimensional object BL1 is arranged at a position corresponding to right above a position where the table T1 exists in the real space. Further, in the scene of Step S1 illustrated in FIG. 7, the hand H1 of the user and the three-dimensional object BL1 exist in substantially the same distance in substantially the same direction, using the position of the right eye of the user as a reference point. Therefore, the overlapping is adjusted for each range of a predetermined size, so that the hand H1 appears in front in a portion corresponding to the thumb of the hand H1, and the three-dimensional object BL1 appears in front in other portions, of a region where the hand H1 and the three-dimensional object BL1 overlap with each other, in the composited image P3a. Further, the three-dimensional object BL1 appears in front in a region where the table T1 and the three-dimensional object BL1 overlap with each other.

With such adjustment of overlapping, at Step S1 illustrated in FIG. 7, the image P3a that can be seen as if the three-dimensional object BL1 were placed on the table T1 and the user held the three-dimensional object BL1 by hand H1 is obtained. By similar processing, the display device 1 composites the image captured by the imaging unit 42, and the image of the virtual space viewed from the view point of the left eye to generate an image to be displayed in the display unit 32b as an image for the left eye. When the image for the left eye is generated, the overlapping of the real body and the three-dimensional object BL1 is adjusted using the position of the left eye of the user as a reference point.

The display device 1 displays the composite images generated as described above in the display units 32a and 32b. As a result, the user can see the scene that is as if the three-dimensional object BL1 were placed on the table T1, and the user held the three-dimensional object BL1 with own hand H1.

In the scene of Step S1 illustrated in FIG. 7, the user moves the hand H1 in the direction of an arrow A1. In this case, in the scene of Step S2 illustrated in FIG. 7, the image obtained by the imaging unit 40 is changed to an image P1b in which the position of the hand H1 is moved to the right. Further, the display device 1 determines that the movement of the hand H1 is operation to move the three-dimensional object to the right while holding the three-dimensional object, and moves the position of the three-dimensional object to the right in the virtual space according to the operation. The movement of the three-dimensional object in the virtual space is reflected in the virtual space data 24d. As a result, the image for the right eye generated based on the virtual space data 24d and the object data 24b is changed to an image P2b in which the position of the three-dimensional object BL1 is moved in the right. Details of detection of the operation by the display device 1 will be described below.

The display device 1 composites the image P1b and the image P2b to generate an image P3b for the right eye. The image P3b is an image that can be seen as if the user held the three-dimensional object BL1 with the hand H1 at a more right side on the table T1 than the image P3a. Similarly, the display device 1 generates a composite image for the left eye. The display device 1 then displays the composite images generated as described above in the display units 32a and 32b. As a result, the user can see the scene that is as if the own hand H1 had held the three-dimensional object BL1 and moved it to the right.

Such update of the composite images for display is executed at a frequency (for example, 30 times per second) equivalent to a typical frame rate of a moving image. As a result, the change of the three-dimensional object BL1 according to the operation of the user is reflected to the image to be displayed in the display device 1 substantially in real time, and the user can operate the three-dimensional object BL1 as if the object actually existed, without a feeling of strangeness. Further, in the configuration according to the present embodiment, the hand H1 of the user, which operates the three-dimensional object BL1, is not positioned between the eyes of the user and the display units 32a and 32b, and thus the user can perform operation without caring about the display of the three-dimensional object BL1 being shielded by the hand H1.

Figure 8:
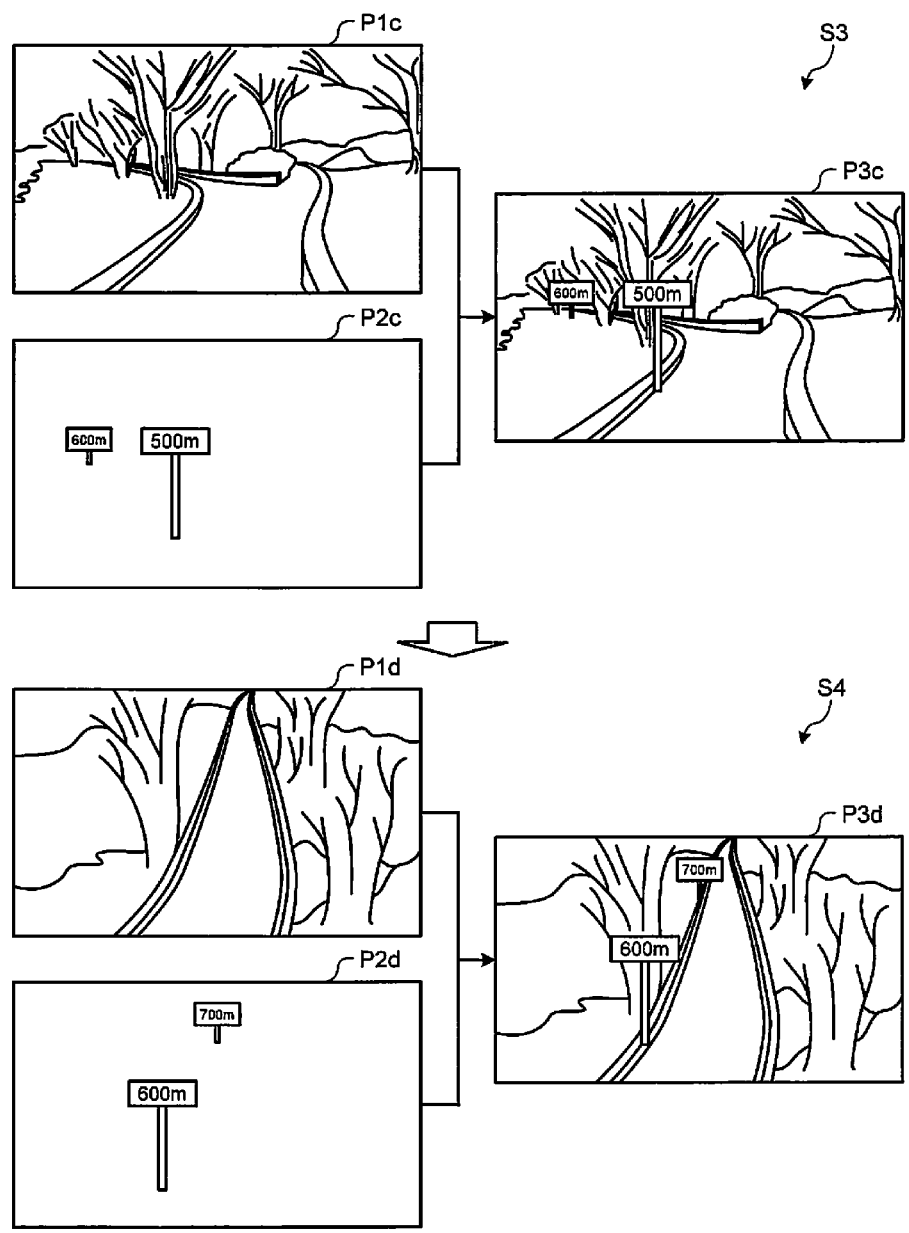
FIG. 8 is a diagram illustrating one of examples of changing a three-dimensional object in conjunction with change of a position.

Then, another example of the control based on the function provided by the control program 24a will be described with reference to FIGS. 8 to 11. FIG. 8 is a diagram illustrating one of examples of changing the three-dimensional object in conjunction with the change of a position. At Step S3 illustrated in FIG. 8, an image P1c is an image obtained by the imaging unit 40, that is, an image corresponding to a scene of the real space viewed by the right eye. In the image P1c, a jogging course in front of the user appears. The display device 1 also acquires an image corresponding to an image of the same scene imaged by the imaging unit 42, that is, a scene of the real space viewed by the left eye.

An image P1c is an image for the right eye generated based on the virtual space data 24d and the object data 24b. In this example, the virtual space data 24d holds information related to a status of three-dimensional objects of signs, which are arranged at positions corresponding to a side of the jogging course. The object data 24b holds information related to shapes and properties of the three-dimensional objects of the signs. Each of the three-dimensional objects has thereon a described figure that indicates a distance from a start point, and is arranged at a position corresponding to a position away from the start point along the jogging course by the distance indicated by the figure. Similarly, the display device 1 also generates an image of the virtual space viewed by the view point of the left eye.

At Step S3 illustrated in FIG. 8, the display device 1 composites the image P1c and the image P1c to generate an image P3c. The image P3c is an image displayed in the display unit 32a, as the image for the right eye. In the image P3c, the three-dimensional objects of the signs are added to the scene of the jogging course as if the signs actually existed.

When the user moves forward in the jogging course, the display device 1 detects the change of a position, and moves the position of the view point in the virtual space forward in accordance with the detected change of a position. For example, when the position of the display device 1 is moved forward by 1 m, the display device 1 moves the view point of the user in the virtual space by the distance corresponding to 1 m. By repetition of such change, the three-dimensional object in front of the user is getting closer to the user as the user moves on, as well as trees beside the course, and disappears from view as the user passes by. At Step S4 illustrated in FIG. 8, the display device 1 composites an image P1*d* and an image P2*d* to generate an image P3*d*. At Step S4 illustrated in FIG. 8, the three-dimensional object of the sign of "600 m" seen in the distance at the stage of Step S3 is displayed immediately in front of the user.

As described above, by changing the position of the display device 1, the user can change the three-dimensional object displayed in the display device 1 without performing operation with a hand. That is, the display device 1 accepts the change of a position of the display device 1 by the user, as operation to change the three-dimensional object. Such an operation to change the three-dimensional object with the change of a position is operation in line with a phenomenon experienced by the user in an actual space, and thus is intuitive and easy to understand for the user. Further, the operation with the change of a position can be combined with operation using a hand or the like, and thus can realize various types of change of the three-dimensional object and is highly convenient.

In the example illustrated in FIG. 8, the signs that do not actually exist are displayed by the side of the jogging course. Therefore, the display device 1 can display useful information for the user in association with a position on the jogging course. Further, the information displayed by the display device 1 can be differentiated for each user, and thus can describe information convenient for each user on the signs, which is different from an actual sign.

The three-dimensional object changed in conjunction with the change of a position is not limited to the signs. For example, a three-dimensional virtual shopping street may be built such that shops that the user can see are switched in conjunction with the user walking in a room or the like. The display device 1 may change the three-dimensional object in conjunction with the number of stepping on site.

The display device 1 may cause the degree of change of the three-dimensional object to be larger or smaller than the detected change of a position. For example, the display device 1 may provide change that is 10 times larger than the magnitude of the change of a position in the real space, to the three-dimensional object in the virtual space. For example, in the example illustrated in FIG. 8, the display device 1 may cause an interval at which the three-dimensional objects of the signs are arranged to be larger or smaller than an interval indicated by the description in the signs. By such adjustment of the interval of the signs, the distance to run can be adjusted according to user's physical condition. The display device 1 may associate movement of 10 m in the real space with movement of 100 m in the virtual space, or may associate the movement of 10 m in the real space with movement of 1 m in the virtual space. When a plurality of attraction facilities is displayed with three-dimensional objects in a place like a room only with white walls, the degree of change of the three-dimensional objects may be caused to be larger than the detected change of a position, whereby the user can easily move between distant facilities. For example, when it is desired to precisely control the three-dimensional objects, the degree of change of the three-dimensional objects may be caused to be smaller than the detected change of a position.

The display device 1 may change the three-dimensional object in conjunction with the change of a position in an up and down direction. For example, when the user jumps, the display device 1 may change the scene to be displayed, to a scene which is viewed from the height corresponding to the height of the jump. The scene is the three-dimensional object such as a building around which the user currently exists. In this case, when the user jumps to the fullest extent, the display device 1 may display a scene of looking down the three-dimensional object such as a building around which the user currently exists.

The display device 1 may integrate the amount of the change of a position, that is, the amount of movement, and change the three-dimensional object according to an integrated value. For example, the display device 1 may convert the integrated value of the amount of movement into an arrival point of when walking from Tokyo to Kyoto, and display distinctive buildings and scenery at the arrival point on the scene in the real space, as the three-dimensional objects in a superimposed manner. For example, when the arrival point corresponds to Yokohama, the display device 1 may display a three-dimensional object of a gate of China town on a part of a real scene in a superimposed manner. For example, when the arrival point corresponds to Shizuoka, the display device 1 may display a three-dimensional object of Mt. Fuji that is seen from the arrival point on the rear of the real scene in a superimposed manner.

Figure 9:
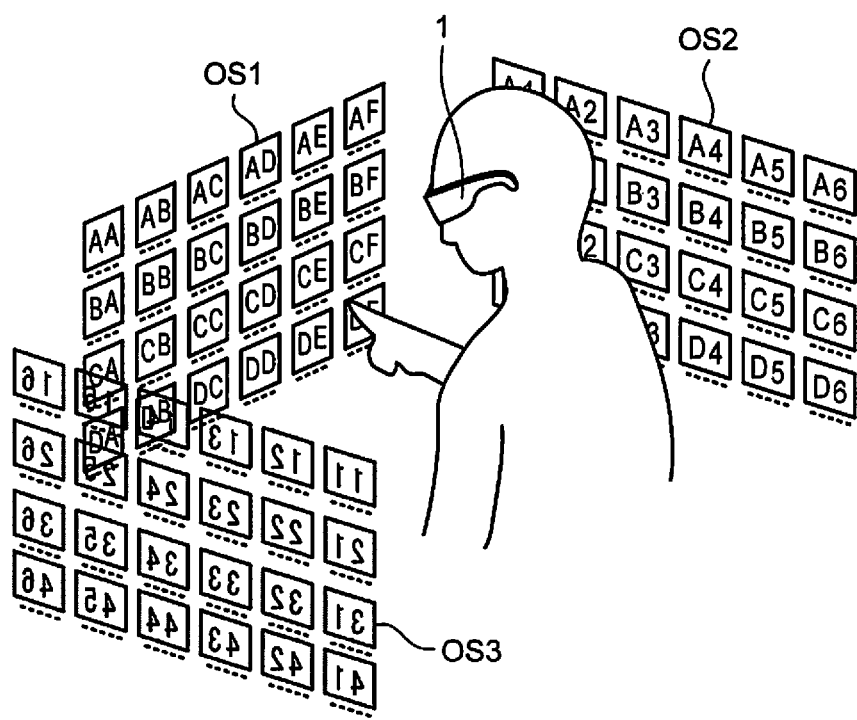
FIG. 9 is a diagram conceptually illustrating operation screens arranged around a user.
Figure 10:
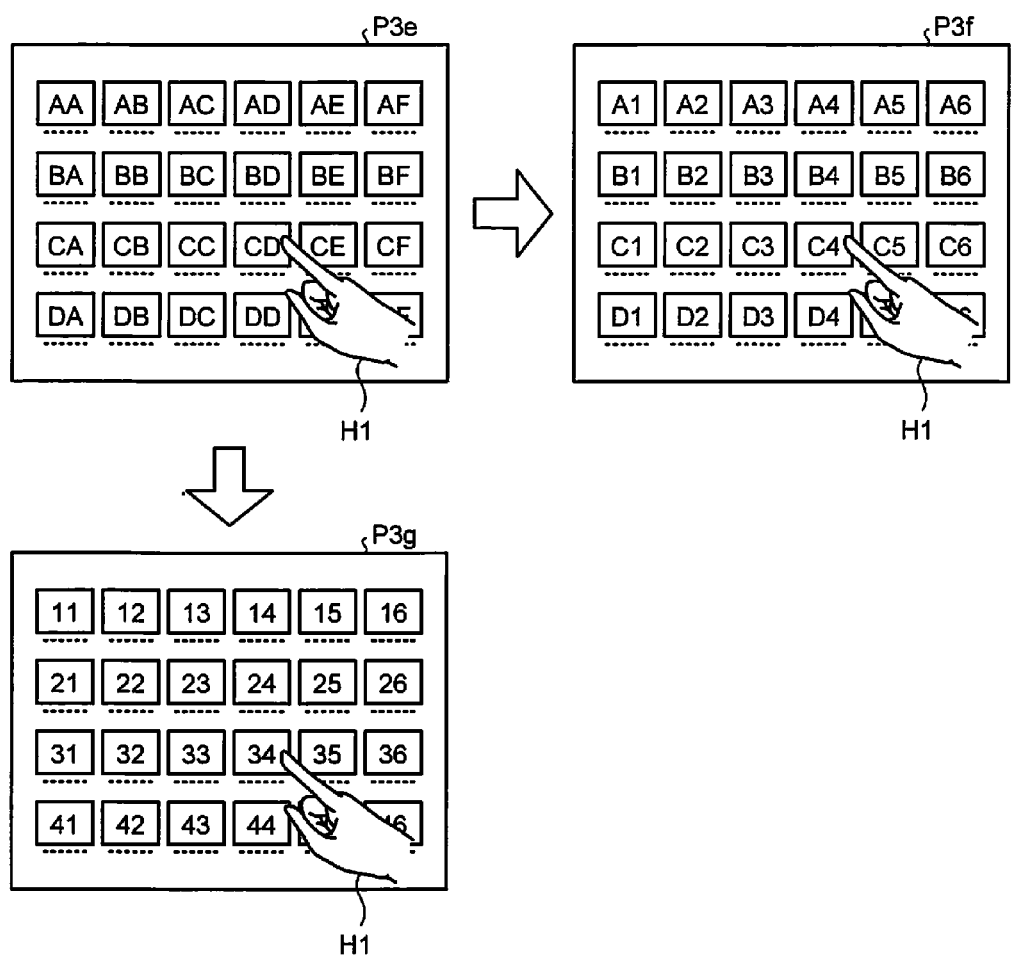
FIG. 10 is a diagram illustrating one of examples of changing a three-dimensional object in conjunction with change of a direction.

FIG. 9 is a diagram conceptually illustrating operation screens arranged around the user. FIG. 10 is a diagram illustrating one of examples of changing the three-dimensional object in conjunction with the change of a direction. In the example illustrated in FIGS. 9 and 10, the virtual space data 24*d* holds information related to states of three-dimensional objects of operation screens OS1 to OS3, and the object data 24*b* holds information related to the shapes and properties of the three-dimensional objects of the operation screens OS1 to OS3.

The operation screen OS1 is arranged at a position corresponding to the front of the user in the virtual space. The operation screen OS2 is arranged at a position corresponding to the right side of the user in the virtual space. The operation screen OS3 is arranged at a position corresponding to the left side of the user in the virtual space. A plurality of icons is arrayed on the operation screens OS1 to OS3.

When the user who wears the display device 1 faces the front, the display device 1 displays the operation screen OS1 as illustrated in an image P3*e*. In this state, when the user performs operation of pressing an icon on the operation screen OS1 with a finger of the hand H1, the display device 1 executes processing associated with the icon.

When the user turns to the right, the display device 1 changes the direction of the view point in the virtual space to the right according to the detected change of a direction. For example, when the head of the user who wears the display device 1 turns to the right by 90 degrees, the display device 1 changes the direction of the view point of the user in the virtual space to the right by 90 degrees. As a result, the display device 1 displays the operation screen OS2 arranged on the right side of the user in the virtual space, as illustrated in an image P3*f*. In this state, when the user performs operation of pressing an icon on the operation screen OS2 with a finger of the hand H1, the display device 1 executes processing associated with the icon.

When the user turns to the left, the display device 1 changes the direction of the view point in the virtual space to the left according to the detected change of a direction. For example, when the head of the user who wears the display device 1 turns to the left by 90 degrees, the display device 1 changes the direction of the view point in the virtual space to the left by 90 degrees. As a result, the display device 1 displays the operation screen OS3 arranged on the left side of the user in the virtual space, as illustrated in an image P3*g*. In this state, when the user performs operation of pressing an icon on the operation screen OS3 with a finger of the hand H1, the display device 1 executes processing associated with the icon.

As described above, the user can change the three-dimensional object displayed in the display device 1 by changing the direction of the display device 1 without performing the operation with the hand. That is, the display device 1 accepts the change of a direction of the display device 1 by the user, as the operation to change the three-dimensional object. Such operation to change the three-dimensional object with the change of a direction is operation in line with a phenomenon experienced by the user in an actual space, and thus is intuitive and easy to understand for the user. Further, the operation with the change of a direction can be combined with operation using the hand, and thus can realize various types of change of the three-dimensional object and is highly convenient.

In the example illustrated in FIGS. 9 and 10, the plurality of operation screens is displayed around the user. Therefore, the user can easily switch the operation screen to be operated by simply changing the direction into which the face is turned.

In FIGS. 9 and 10, one of examples of displaying the operation screens on three faces around the user has been illustrated. However, the display device 1 may display the operation screens on four faces around the user including the rear side of the user. Alternatively, a continuous face such as an inner surface of a cylinder surrounding the user may be employed as the operation screen. Alternatively, the operation screen may be provided on a face over the head of the user, that is, a face that can be seen when the direction of the view point is turned upward.

When the operation screens are provided on a plurality of flat faces surrounding the user, the display device 1 may adjust the direction of the view point or the three-dimensional object in the virtual space such that a face that exists in the direction into which the user faces, and, an angle of which with respect to a line of sight of the user is closest to 90 degrees, of the faces on which the operation screens are provided, becomes perpendicular to the line of sight of the user. By such adjustment of the direction of the view point or the three-dimensional object, visibility of the operation screens can be improved.

The three-dimensional object changed in conjunction with the change of a direction is not limited to the operation screen. For example, it may be configured such that three-dimensional objects of products are displayed on shelves around the user, and the products that the user can see and pick up are changed in conjunction with changing of the direction of the head of the user who wears the display device 1. Three-dimensional maps including three-dimensional objects of buildings may be arranged around the user, and the displayed map may be changed to a map in the direction into which the user faces in conjunction with changing the direction of the head of the user who wears the display device 1. The display device 1 may display weather forecast, an event, principal facilities of a region into which the line of sight of the user faces, as the three-dimensional objects, in conjunction with changing of the direction of the head of the user who wears the display device 1.

The display device 1 may associate a direction into which the user rotates his/her head with some sort of processing. For example, when the user rotates his/her head in the right direction, the display device 1 turns a page of the three-dimensional object of a displayed book, and when the user turns his/her head in the left direction, the display device 1 returns the page of the three-dimensional object of the book. In this case, processing is not in conjunction with the change of a direction for putting the rotated head back.

Figure 11:
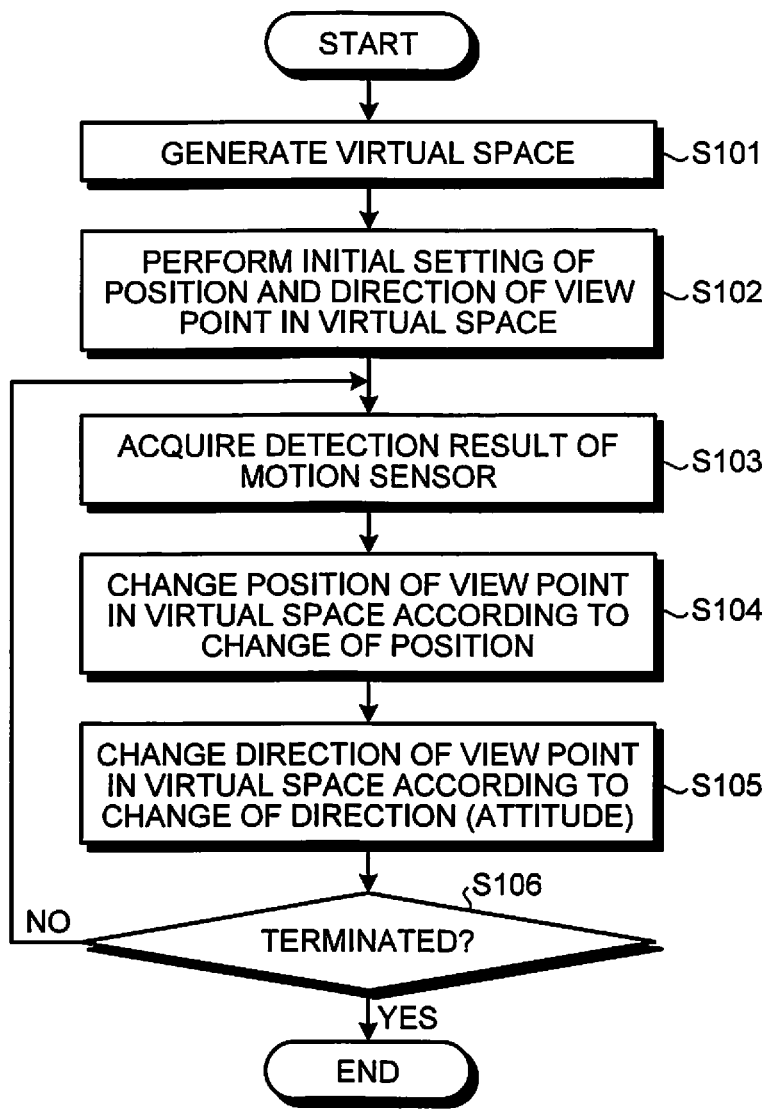
FIG. 11 is a flowchart illustrating a processing procedure of control of changing a three-dimensional object in conjunction with change of a position and a direction.

FIG. 11 is a flowchart illustrating a processing procedure of control of changing the three-dimensional object in conjunction with the change of a position and a direction. The processing procedure illustrated in FIG. 11 is realized by the control unit 22 executing the control program 24a. First of all, at Step S101, the control unit 22 generates a virtual space based on the virtual space data 24d and the object data 24b. Then, at Step S102, the control unit 22 performs initial setting of a position and a direction of a view point in the virtual space. The initial setting of the position and the direction of the view point in the virtual space is performed based on a rule of association between the real space and the virtual space, which is defined in advance, for example.

Subsequently, at Step S103, the control unit 22 acquires a detection result of the motion sensor 48. Then, at Step S104, the control unit 22 changes the position of the view point in the virtual space according to the change of a position of the display device 1, and at Step S105, the control unit 22 changes the direction of the view point in the virtual space according to the change of a direction of the display device 1.

Then, at Step S106, the control unit 22 determines whether the display of the three-dimensional object(s) is terminated. When the display of the three-dimensional object(s) is not terminated (No at Step S106), the control unit 22 returns to Step S103. When the display of the three-dimensional object(s) is terminated (Yes at Step S106), the control unit 22 terminates the processing procedure illustrated in FIG. 11.

Figure 12:
FIG. 12 is a diagram illustrating one of examples of information stored in object data.

Then, the object data 24b and the acting data 24c illustrated in FIG. 6 will be described in more detail with reference to FIGS. 12 to 18. FIG. 12 is a diagram illustrating one of examples of information stored in the object data 24b. FIGS. 13 to 18 are diagrams illustrating examples of information stored in the acting data 24c.

As illustrated in FIG. 12, in the object data 24b, information including a type, shape information, a color, the degree of transparency, and the like is stored for each three-dimensional object. The type indicates a physical property of the three-dimensional object. The type takes a value of a "rigid body", an "elastic body", or the like, for example. The shape information is information indicating a shape of the three-dimensional object. The shape information is a collection of vertex coordinates of faces that constitute the three-dimensional object. The color is a color of a surface of the three-dimensional object. The degree of transparency is a degree at which the three-dimensional object transmits light. The object data 24b can hold information related to a plurality of three-dimensional objects.

In examples illustrated in FIGS. 13 to 18, the information related to change of when pressing operation is detected is stored in the acting data 24c for each type of the three-dimensional object. As illustrated in FIG. 13, when the type of the three-dimensional object is a "rigid body", change of when the pressing operation is detected differs depending on presence of a fulcrum, presence of an obstacle in the direction of pressing, and a speed of pressing. The obstacle referred to here may be another three-dimensional object, or may be a real body. Whether the speed of pressing is fast or slow is determined based on a threshold.

When there is no fulcrum in the three-dimensional object, and no obstacle in the direction of pressing, the three-dimensional object is displayed in such a manner as to be moved in the direction of pressing according to an amount of pressing. The three-dimensional object displayed in this way is, for example, a block, a pen, or a book. As for the way of moving, whether being slipped or rotated may be determined based on the shape of the three-dimensional object. Further, whether the three-dimensional object is moved together with the pressing body, or the three-dimensional object is moved away from the body such that the three-dimensional object is flicked by the pressing body may be determined based on the speed of pressing, or may be determined based on a calculated value or a set value of frictional resistance between the three-dimensional object and the bottom surface.

When there is no fulcrum in the three-dimensional object, and there is an fixed obstacle in the direction of pressing, the three-dimensional object is displayed in such a manner as to be moved in the direction of pressing according to the amount of pressing, and to stop the movement at the timing when coming in contact with the obstacle. The three-dimensional object displayed in this way is, for example, a block, a pen, or a book. When the speed of pressing is fast, the three-dimensional object may destroy the obstacle and continue the movement. When the three-dimensional object comes in contact with the obstacle while being moved away from the body such that the three-dimensional object is flicked by the pressing body, the three-dimensional object may be moved in the reverse direction such that the three-dimensional object rebounds.

When there is no fulcrum in the three-dimensional object, there is another unfixed rigid body in the direction of pressing, and the speed of pressing is slow, the three-dimensional object is displayed in such a manner as to be moved in the direction of pressing according to the amount of pressing, and to be moved together with another rigid body after coming in contact with another rigid body. When there is no fulcrum in the three-dimensional object, there is another unfixed rigid body in the direction of pressing, and the speed of pressing is fast, the three-dimensional object is displayed in such a manner as to be moved in the direction of pressing according to the amount of pressing. Then, after the three-dimensional object comes in contact with another rigid body, another rigid body is displayed in such a manner as to be flicked and to be moved. After coming in contact with another rigid body, the three-dimensional object may be stopped on site, or may reduce the speed and continue the movement. The combination of the three-dimensional object and another rigid body displayed in this way is, for example, a combination of a ball and pins in bowling, or a combination of marbles.

When there is no fulcrum in the three-dimensional object, and there is another unfixed rigid body in the direction of pressing, but the three-dimensional object can pass through another rigid body, the three-dimensional object is displayed in such a manner as to be moved in the direction of pressing according to the amount of pressing, and to pass through another rigid body and continue the movement after coming in contact with another rigid body. In reality, a rigid body does not pass through a rigid body, but if such passing through is available, the user can be provided with a novel experience. The combination of the three-dimensional object and another rigid body is, for example, a combination of a ball and pins in bowling, or a combination of marbles. A threshold may be provided in the speed of pressing, and when the speed of pressing is the threshold or less, the three-dimensional object may not pass through another rigid body.

When there is a fulcrum in the three-dimensional object, the three-dimensional object is displayed in such a manner as to be rotated around the fulcrum according to the amount and the direction of pressing. The rotation referred to here may be rotations of 360 degrees, or may be reciprocating rotation within a predetermined rotation range. The three-dimensional object displayed in this way is, for example, a pendulum, a sandbag of boxing, or a windmill.

As illustrated in FIG. 14, when the type of the three-dimensional object is "elastic body", the change of when the pressing operation has been detected differs depending on the material, presence of limitation on the amount of change, and the speed of pressing. The material referred to here is an assumed material of the three-dimensional object, and is defined in the object data 24b.

When the material of the three-dimensional object is a rubber-based material, there is no limitation on the amount of change, and the speed of pressing is slow, the three-dimensional object is displayed in such a manner as to be deformed in the direction of pressing according to the amount of pressing, and to return to an original shape when being released from the pressed state. When the material of the three-dimensional object is a rubber-based material, there is no limitation on the amount of change, and the speed of pressing is fast, the three-dimensional object is displayed in such a manner as to be deformed in the direction of pressing according to the amount of pressing, and then to be flicked and moved in the direction of pressing while returning to the original shape. The three-dimensional object displayed in this way is, for example, a rubber ball, or an eraser.

When the material of the three-dimensional object is a rubber-based material, and there is a limitation on the amount of change, the three-dimensional object is displayed in such a manner as to be deformed in the direction of pressing according to the amount of pressing up to a deformable range, and, when the pressing operation continues to be detected after that, to be moved in the direction of pressing while returning to the original shape. The three-dimensional object displayed in this way is, for example, a rubber ball, or an eraser.

When the material of the three-dimensional object is a metal-based material, the three-dimensional object is displayed in such a manner as to be deformed in the direction of pressing according to the amount of pressing up to a deformable range, and to repeat returning to the original shape and deforming (vibrate) when being released from the pressed state. When the three-dimensional object is pressed in a direction other than the deformable direction, the three-dimensional object is moved similarly to the rigid body. The three-dimensional object displayed in this way is, for example, a plate spring or a helical spring.

As illustrated in FIG. 15, when the type of the three-dimensional object is "plastic body", the three-dimensional object is displayed such that a pressed portion is recessed, and the entire shape is changed. The three-dimensional object displayed in this way is, for example, clay.

As illustrated in FIG. 16, when the type of the three-dimensional object is "liquid", the change of when the pressing operation has been detected differs depending on the speed of pressing. When the speed of pressing is slow, the three-dimensional object is displayed such that the pressing body is submerged in the three-dimensional object, that is, in the liquid. When the speed of being pressed is a medium speed, the three-dimensional object is displayed such that the pressing body is submerged in the liquid, and the liquid ripples out in waves. When the speed of pressing is fast, the three-dimensional object is displayed such that the pressing body is submerged in the liquid, and the liquid makes a splash. The three-dimensional object displayed in this way is, for example, water in a glass.

As illustrated in FIG. 17, when the type of the three-dimensional object is "gas", the change of when the pressing operation has been detected differs depending on the speed of pressing. When the speed of pressing is slow, the three-dimensional object, that is, the gas is displayed in such a manner as to be interrupted by the pressing body, and to hang around the pressing body. When the speed of pressing is a medium speed, the gas is displayed in such a manner as to be scattered by the pressing body. When the speed of pressing is fast, the gas is displayed in such a manner as to cause a whirl by turbulence in the rear side of the moving direction of the pressing body. The three-dimensional object displayed in this way is, for example, smoke.

As illustrated in FIG. 18, when the type of the three-dimensional object is "aggregation", the change of when the pressing operation has been detected differs depending on a bonding state of elements of the aggregation. When there is no bonding between the elements of the aggregation, the three-dimensional object is displayed such that a pressed portion is recessed, and the entire shape of the aggregation is changed. The three-dimensional object displayed in this way is, for example, sand, or sugar.

When there is bonding between the elements of the aggregation, the three-dimensional object is displayed such that the pressed portion is recessed, and the entire shape of the aggregation is changed. Further, elements other than the pressed portion are displayed in such a manner as to be pulled and moved by the elements in the pressed portion. The three-dimensional object displayed in this way is, for example, a chain.

When there is no bonding between the elements of the aggregation, but attraction force or repulsive force acts between the three-dimensional object and the pressing body, the three-dimensional object is displayed in such a manner as to be moved without being in contact with the pressing body. When the attraction force acts between the three-dimensional object and the pressing body, the three-dimensional object is attracted by the pressing body when entering within a predetermined distance to the pressing body without being in contact with the pressing body. When the repulsive force acts between the three-dimensional object and the pressing body, the three-dimensional object is moved away from the pressing body when entering within a predetermined distance to the pressing body without being in contact with the pressing body. The combination of the three-dimensional object and the pressing body is, for example, a combination of iron powder and a magnet.

As described above, the three-dimensional object is changed based on the information stored in the object data 24b and the information stored in the acting data 24c, whereby the three-dimensional object can be changed in various manners according to the pressing operation. The information stored in the object data 24b and the acting data 24c is not limited to the above examples, and may be appropriately changed according to use or the like. For example, it may be set to switch the way of changing the three-dimensional object according to the type and the size of the pressing body, and/or the size of a contact area of the pressing body and the three-dimensional object.

Then, detection of operation of pressing the three-dimensional object, and change of the three-dimensional object according to detected operation will be described with reference to FIGS. 19 and 20. In the description below, a space viewed by the user who wears the display device 1 may be called display space. The display device 1 provides images respectively corresponding to the right eye and the left eye of the user, thereby to three-dimensionally (stereoscopically) display the real body and the three-dimensional object in the display space. The display device 1 associates the virtual space reproduced based on the virtual space data 24d, and the real space imaged by the imaging units 40 and 42, based on a predetermined rule, and displays a space in which these spaces are overlapped, as the display space.

Figure 19:
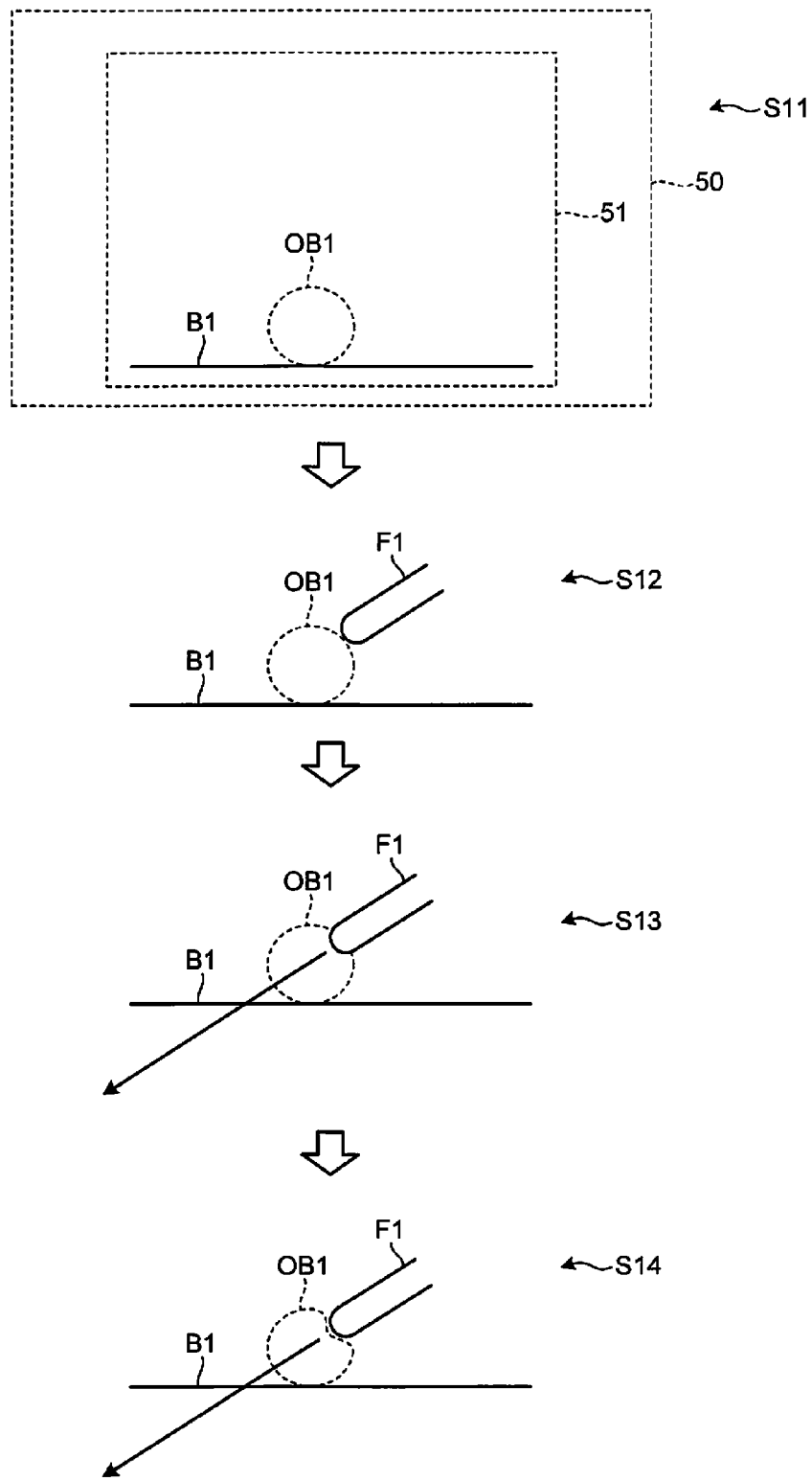
FIG. 19 is a diagram for describing a first example of detection of operation of pressing a three-dimensional object, and change of the three-dimensional object according to the detected operation.
Figure 20:
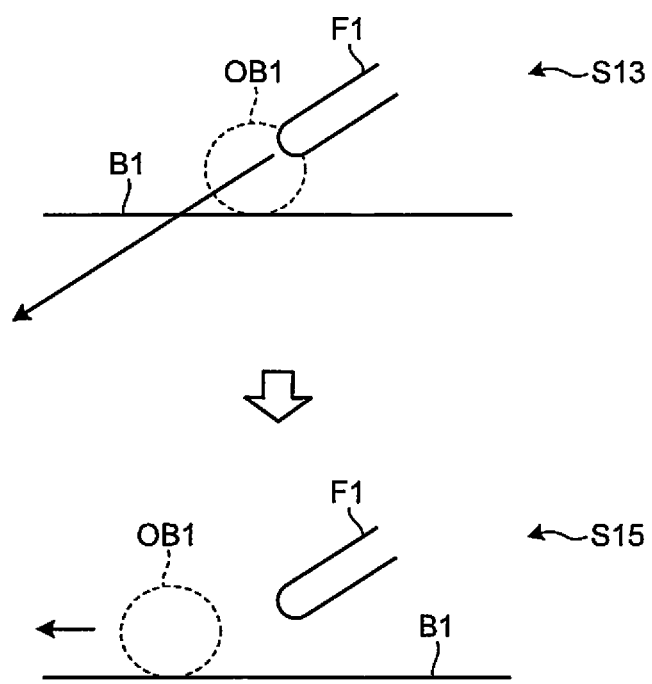
FIG. 20 is a diagram for describing the first example of detection of operation of pressing a three-dimensional object, and change of the three-dimensional object according to the detected operation.

FIGS. 19 and 20 are diagrams for describing detection of operation of pressing a three-dimensional object, and change of the three-dimensional object according to the detected operation. At Step S11 illustrated in FIG. 19, the display device 1 stereoscopically displays a three-dimensional object OB1 in a display space 50. The three-dimensional object OB1 is, for example, an object that is modeled on a ball. At Step S11, a bottom surface B1 that supports the three-dimensional object OB1 is displayed.

At Step S12, the user places a finger F1 to a position at which the finger F1 is in contact with the three-dimensional object OB1, and keeps the finger F1 to stand still. When the real body has been detected in the display space, and the state in which the body is in contact with the three-dimensional object OB1 is continued for a predetermined time or more, the display device 1 determines that the three-dimensional object OB1 has been selected as an object to be operated. Then, the display device 1 notifies the user of the fact that the three-dimensional object OB1 has been selected as the object to be operated, by changing a display style of the three-dimensional object OB1, or the like.

Determination of whether the body is in contact with the three-dimensional object OB1 is made based on the position of the body in the real space, the shape, the attitude, and the position in the virtual space of the three-dimensional object OB1, and the like. Comparison between the position in the real space and the position in the virtual space may be performed by converting a position in one space into a position in the other space based on the above-described predetermined rule, or may be performed by converting positions in both spaces into positions in a space for comparison. When a finger has been detected as the real body, the position of a tip of the finger may be processed as the position of the body. Humans often use a tip of a finger when operating something. Therefore, the position of the tip of the finger is processed as the position of the body, whereby more natural operation feeling can be provided to the user.

The notification of the fact that the three-dimensional object has been selected as the object to be operated is realized by, for example, changing the entire color of the three-dimensional object OB1, or changing the color of a vicinity of the position that is in contact with the body, of a surface of the three-dimensional object OB1. The display device 1 may perform notification with a sound and/or vibration, in place of, or in addition to such visual notification.

As described above, when the state in which the real body such as the finger is in contact with the three-dimensional object OB1 has been continuously detected for a predetermined time or more, the display device 1 determines that the three-dimensional object OB1 has been selected as the object to be operated. The continuous detection of the contact state for the predetermined time or more is added as one of conditions, whereby a possibility of selecting an unintended three-dimensional object as the object to be operated in the process of moving the finger to operate another three-dimensional object can be reduced.

Assume that, after the three-dimensional object OB1 is selected as the object to be operated, the user enters the finger F1 into an inner side of the three-dimensional object OB1 such that he/she presses the three-dimensional object OB1, as illustrated in Step S13. When the operation of entering the body into the three-dimensional object selected as the object to be operated has been detected, the display device 1 changes the three-dimensional object according to the operation. How to change the three-dimensional object is determined based on the type of the three-dimensional object defined in the object data 24b, and a rule of the change associated with the type defined in the acting data 24c.

For example, assume that the three-dimensional object OB1 is defined as an elastic body in the object data 24b, and it is defined in the acting data 24c that the elastic body is deformed in the direction of pressing according to the amount of pressing when pressed. In this case, as illustrated in Step S14, the display device 1 changes the three-dimensional object OB1 such that a portion into which the finger F1 enters is pressed and recessed.

Assume that the three-dimensional object OB1 is defined as a rigid body in the object data 24b, and it is defined in the acting data 24c that the rigid body is moved in the direction of pressing according to the amount of pressing when pressed. In this case, as illustrated in Step S15 of FIG. 20, the display device 1 moves the three-dimensional object OB1 into a direction of travel of the finger F1 such that the three-dimensional object OB1 is pressed by the finger F1. At Step S15 of FIG. 20, the three-dimensional object OB1 is supported by the bottom surface B1, and is thus moved according to a component of force applied to the rigid body in a direction horizontal to the bottom surface B1.

As described above, when the operation of pressing the three-dimensional object has been detected, the three-dimensional object OB1 is changed based on the object data 24b and the acting data 24c, whereby the three-dimensional object can be changed in various manners according to the operation. The operation of pressing is operation used in various scenes in the real world. Therefore, the processing of detecting and handling the operation of pressing the three-dimensional object OB1 is executed, whereby intuitive and highly convenient operability can be realized.

The body used for operating the three-dimensional object is not limited to the finger, and may be a hand, a foot, a stick, a tool, or the like. A manner in which the three-dimensional object is changed according to the pressing operation may conform to a real physical rule, or may be one that is unlikely to happen in reality.

The display device 1 may limit the space in which the display device 1 detects the operation to the three-dimensional object, to an operable range 51. The operable range 51 is a range that the hand of the user who wears the display device 1 can reach. In this way, the space in which the display device 1 detects the operation to the three-dimensional object is limited, whereby a load of calculation processing executed by the display device 1 in order to detect the operation can be reduced.

Figure 21:
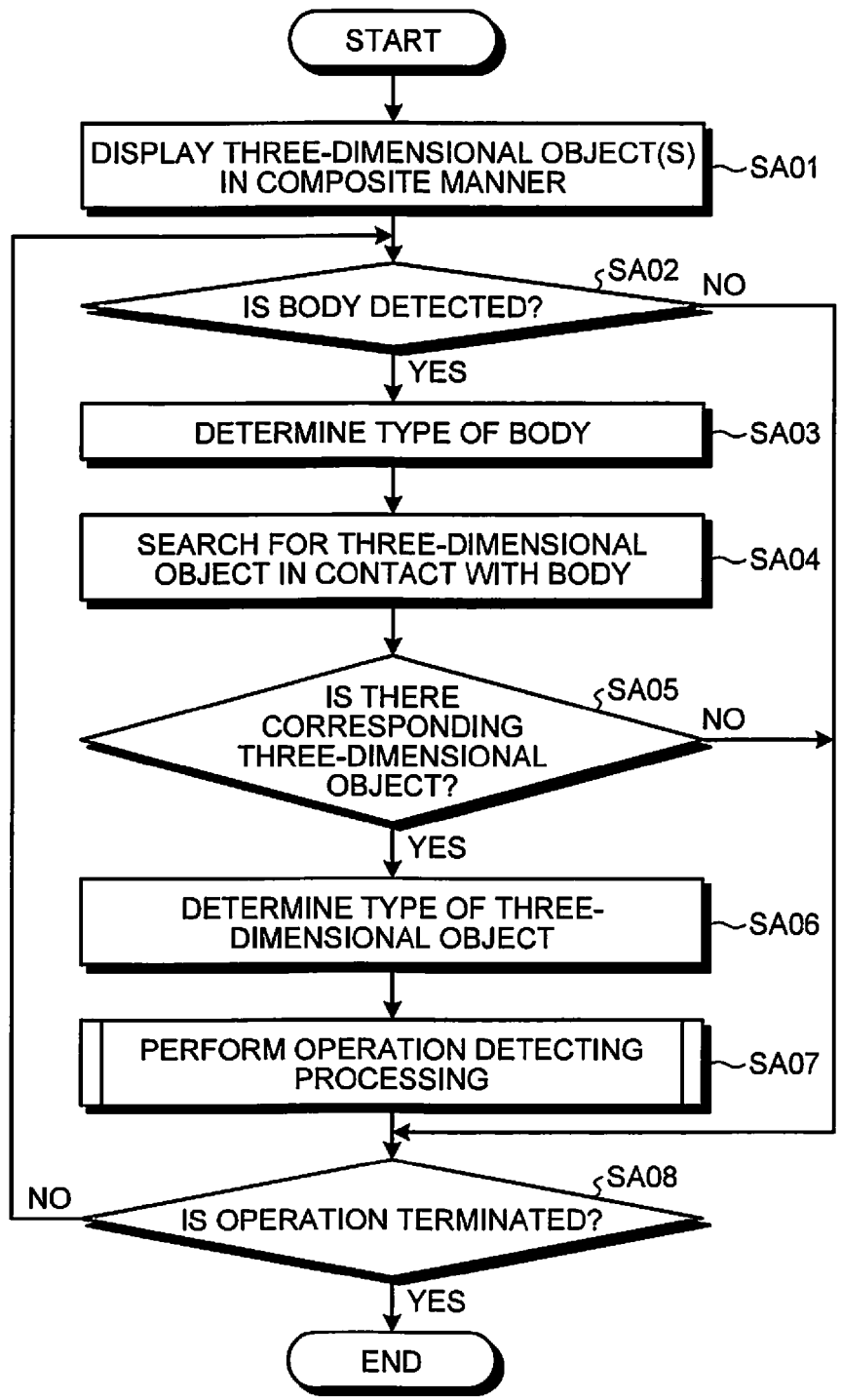
FIG. 21 is a flowchart illustrating a processing procedure of contact detecting processing in the first example.

Then, a first example of a processing procedure executed by the display device 1 with respect to the operation of pressing the three-dimensional object will be described with reference to FIGS. 21 and 22. FIG. 21 is a flowchart illustrating a processing procedure of contact detecting processing of the three-dimensional object. The processing procedure illustrated in FIG. 21 is realized by the control unit 22 executing the control program 24a.

As illustrated in FIG. 21, first of all, at Step SA01, the control unit 22 composites and displays an image in the virtual space including the three-dimensional object(s) and an image in the real space.

Subsequently, at Step SA02, the control unit 22 determines whether a predetermined body has been detected by the detection unit 44, that is, by the imaging units 40 and 42. The predetermined body is, for example, a finger of the user. When the predetermined body has not been detected (No at Step SA02), then at Step SA08, the control unit 22 determines whether operation completion has been detected.

The operation completion is, for example, detected when predetermined operation with respect to the operating unit 13 is performed. When the operation completion has been detected (Yes at Step SA08), the control unit 22 terminates the contact detecting processing. When the operation completion has not been detected (No at Step SA08), the control unit 22 re-executes Step SA02 and subsequent steps.

When the predetermined body has been detected (Yes at Step SA02), then at Step SA03, the control unit 22 determines the type of the predetermined body. The type of the predetermined body is determined based on, for example, a size, a shape, a color, or the like of the body in the images captured by the imaging units 40 and 42. Subsequently, at Step SA04, the control unit 22 searches for a three-dimensional object that is in contact with the predetermined body. When there is no three-dimensional object that is in contact with the predetermined body (No at Step SA05), the control unit 22 proceeds to Step SA08.

When a three-dimensional object that is in contact with the predetermined body is found (Yes at Step SA05), then at Step SA06, the control unit 22 determines the type of the three-dimensional object that is in contact with the predetermined body based on the object data 24b. Then, at Step SA07, the control unit 22 executes operation detecting processing described below. Subsequently, the control unit 22 proceeds to Step SA08.

Figure 22:
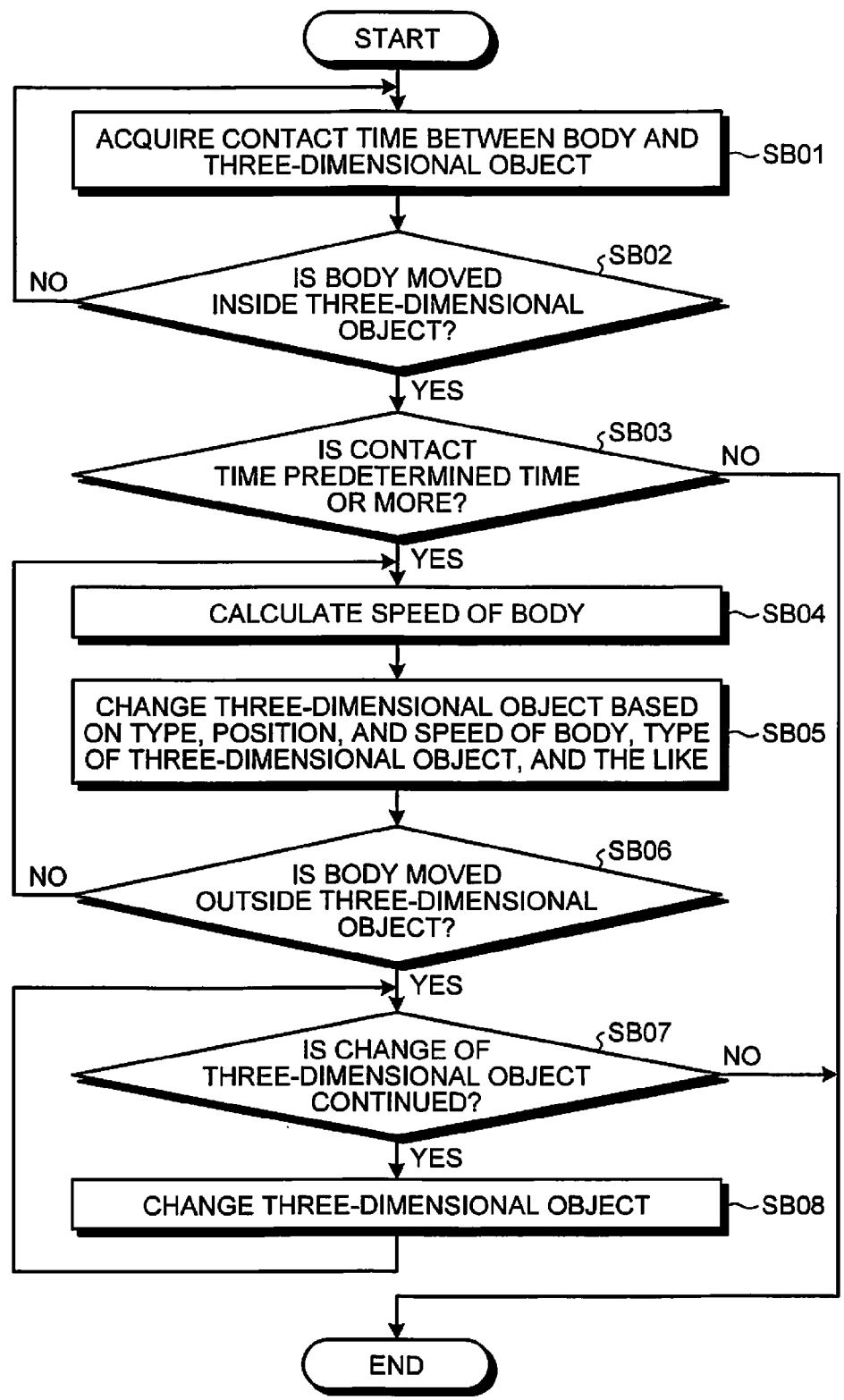
FIG. 22 is a flowchart illustrating a processing procedure of operation detecting processing in the first example.

FIG. 22 is a flowchart illustrating a processing procedure of the operation detecting processing. The processing procedure illustrated in FIG. 22 is realized by the control unit 22 executing the control program 24a.

As illustrated in FIG. 22, first of all, at Step SB01, the control unit 22 acquires a contact time of the predetermined body and the three-dimensional object. Then, at Step SB02, the control unit 22 determines whether the predetermined body has been moved to an inside of the three-dimensional object. When the predetermined body has not been moved to the inside of the three-dimensional object (No at Step SB02), the control unit 22 re-executes Step SB01 and subsequent steps.

When the predetermined body has been moved to the inside of the three-dimensional object (Yes at Step SB02), then at Step SB03, the control unit 22 determines whether the contact time is a predetermined time or more. When the contact time is shorter than the predetermined time (No at Step SB03), the three-dimensional object is determined not to be the object to be operated, and thus the control unit 22 terminates the operation detecting processing When the contact time is the predetermined time or more (Yes at Step SB03), then at Step SB04, the control unit 22 calculates the speed of the predetermined body. Then, at Step SB05, the control unit 22 changes the three-dimensional object based on the type, the position, and the speed of the predetermined body, the type of the three-dimensional object, and the like. A specific way of changing the three-dimensional object is determined according to the acting data 24c.

Subsequently, at Step SB06, the control unit 22 determines whether the predetermined body has been moved to an outside of the three-dimensional object. When the predetermined body has not been moved to the outside of the three-dimensional object, that is, when the pressing operation is continued (No at Step SB06), the control unit 22 re-executes Step SB04 and subsequent steps.

When the predetermined body has been moved to the outside of the three-dimensional object, that is, when the three-dimensional object has been released (Yes at Step SB06), then at Step SB07, the control unit 22 determines whether the change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SB07), then at Step SB08, the control unit 22 changes the three-dimensional object, and then re-executes Step SB07 and subsequent steps. When the change of the three-dimensional object is not continued (No at Step SB07), the control unit 22 terminates the operation detecting processing.

As described above, in the first example, the three-dimensional object is changed in various manners according to the pressing operation, whereby a highly convenient operation method can be provided to the user.

A second example of a processing procedure related to the operation of pressing a three-dimensional object will be described. The contact detecting processing in the second example is the same as the contact detecting processing in the first example. Therefore, in the second example, description overlapping with the first example is not repeated, and the operation detecting processing will be mainly described.

Figure 23:
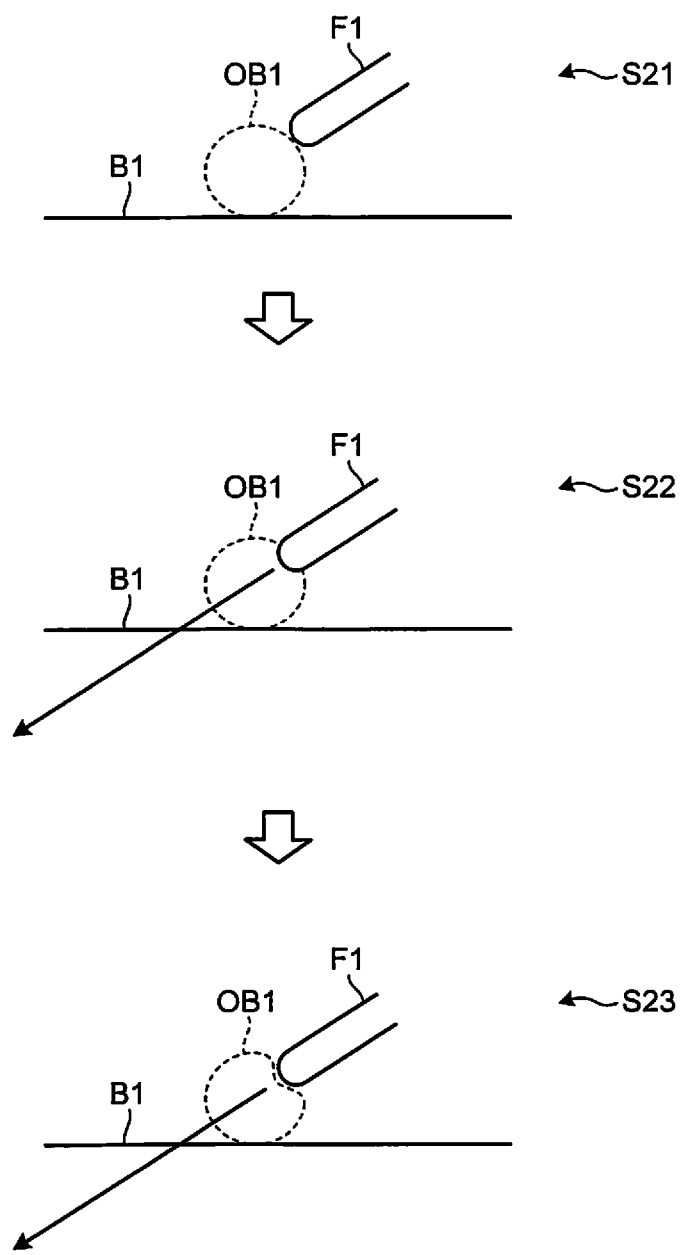
FIG. 23 is a diagram for describing a second example of detection of operation of pressing a three-dimensional object, and change of the three-dimensional object according to the detected operation.

First of all, detection of the operation of pressing a three-dimensional object, and change of the three-dimensional object according to the detected operation will be described with reference to FIG. 23. FIG. 23 is a diagram for describing detection of the operation of pressing a three-dimensional object, and change of the three-dimensional object according to the detected operation. At Step S21 illustrated in FIG. 23, the user brings the finger F1 in contact with the three-dimensional object OB1, and at Step S22, the user enters the finger F1 into an inner side of the three-dimensional object OB1.

When the real body has been detected in the display space, and the state in which the body is in contact with the three-dimensional object OB1, and is then moved to an inside of the three-dimensional object OB1 is continued for a predetermined time or more, the display device 1 determines that the three-dimensional object OB1 has been selected as the object to be operated. Then, the display device 1 notifies the user of the fact that the three-dimensional object OB1 has been selected as the object to be operated, by changing the display style of the three-dimensional object OB1, or the like. Further, as illustrated in Step S23, the display device 1 changes the three-dimensional object OB1 according to the operation with the finger F1 of at and after the contact detection, as if the three-dimensional object OB1 had already been selected as the object of the pressing operation at the stage of Step S21.

As described above, after the contact of the body and the three-dimensional object is detected, the pressing operation is made detectable even if the body does not stay on site, whereby the user can promptly start the operation of pressing the three-dimensional object. Further, the continuance of the state in which the body is moved to the inside of the three-dimensional object OB1 after the contact for the predetermined time or more is added as one of conditions, whereby the possibility of selecting an unintended three-dimensional object as the object to be operated in the process of moving the finger to operate another three-dimensional object can be reduced.

Figure 24:
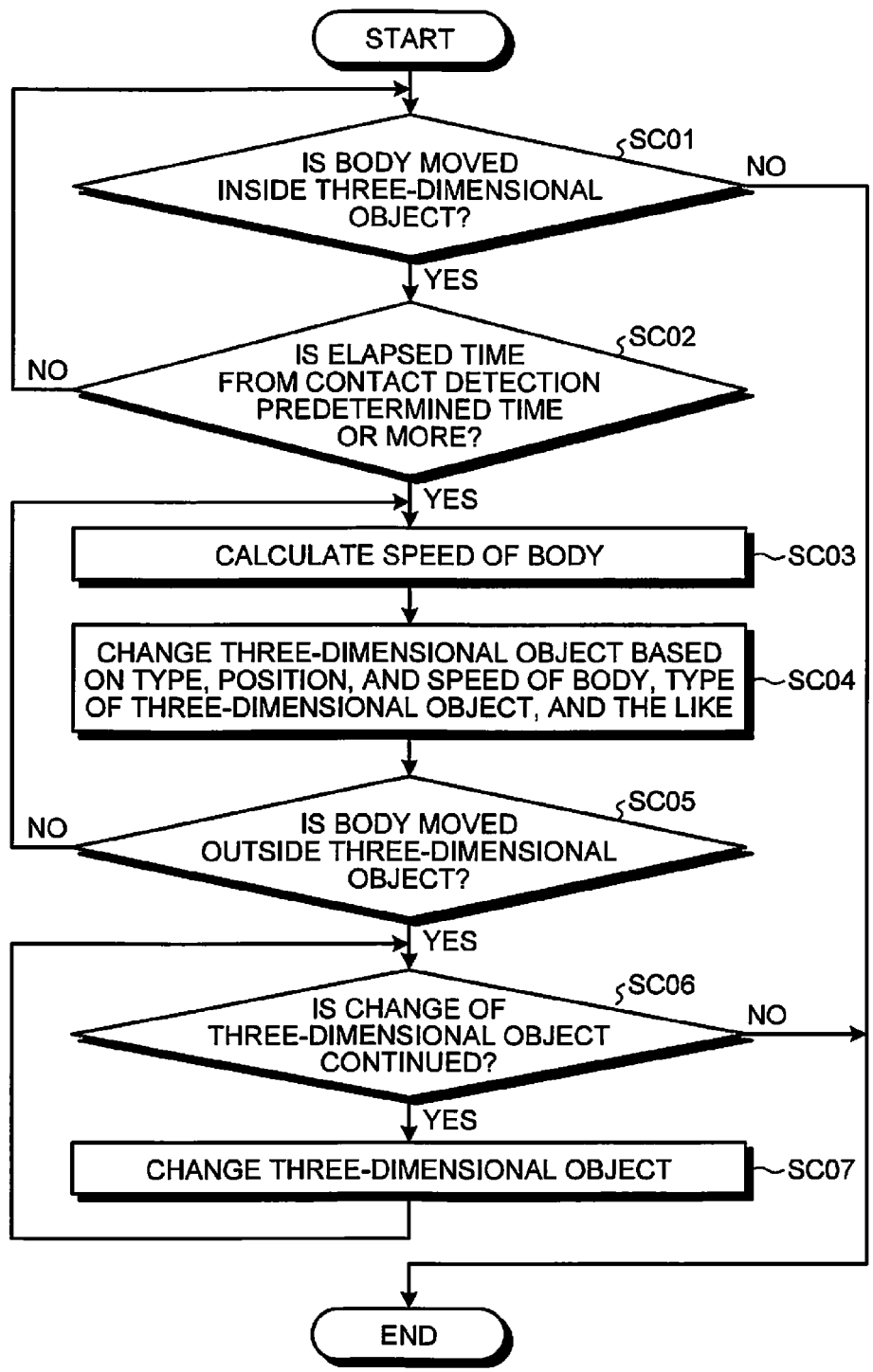
FIG. 24 is a flowchart illustrating a processing procedure of operation detecting processing in the second example.

Then, a processing procedure of the operation detecting processing in the second example will be described with reference to FIG. 24. FIG. 24 is a flowchart illustrating a processing procedure of the operation detecting processing. The processing procedure illustrated in FIG. 24 is realized by the control unit 22 executing the control program 24a. The processing procedure of the contact detecting processing is similar to the procedure illustrated in FIG. 21.

As illustrated in FIG. 24, first of all, at Step SC01, the control unit 22 determines whether a predetermined body has been moved to an inside of a three-dimensional object. When the predetermined body has not been moved to the inside of the three-dimensional object (No at Step SC01), the three-dimensional object is determined not to be the object to be operated, and thus the control unit 22 terminates the operation detecting processing.

When the predetermined body has been moved to the inside of the three-dimensional object (Yes at Step SC01), then at Step SC02, the control unit 22 determines whether an elapsed time from the contact detection is a predetermined time or more. When the elapsed time is shorter than the predetermined time (No at Step SC02), the control unit 22 re-executes Step SC01 and subsequent steps.

When the elapsed time is the predetermined time or more (Yes at Step SC02), then at Step SC03, the control unit 22 calculates the speed of the predetermined body. Then, at Step SC04, the control unit 22 changes the three-dimensional object based on the type, the position, and the speed of the predetermined body, the type of the three-dimensional object, and the like. A specific way of changing the three-dimensional object is determined according to the acting data 24c.

Subsequently, at Step SC05, the control unit 22 determines whether the predetermined body has been moved to an outside of the three-dimensional object. When the predetermined body has not been moved to the outside of the three-dimensional object, that is, when the pressing operation is continued (No at Step SC05), the control unit 22 re-executes Step SC03 and subsequent steps.

When the predetermined body has been moved to the outside of the three-dimensional object, that is, when the three-dimensional object has been released (Yes at Step SC05), then at Step SC06, the control unit 22 determines whether change of the three-dimensional object is continued. For example, when continuance of vibration for a predetermined time after the release is defined in the acting data 24c, it is determined that the change of the three-dimensional object is continued.

When the change of the three-dimensional object is continued (Yes at Step SC06), then at Step SC07, the control unit 22 changes the three-dimensional object, and then re-executes Step SC06 and subsequent steps. When the change of the three-dimensional object is not continued (No at Step SC06), the control unit 22 terminates the operation detecting processing.

As described above, in the second example, the pressing operation is recognized even if the state in which the body such as a finger is in contact with the three-dimensional object is not continued for the predetermined time or more. Therefore, the user can promptly start the operation of pressing the three-dimensional object.

A third example of a processing procedure related to the operation of pressing a three-dimensional object will be described. The contact detecting processing in the third example is the same as the contact detecting processing in the first example. Therefore, in the third example, description overlapping with the first example is not repeated, and the operation detecting processing will be mainly described.

First of all, detection of the operation of pressing a three-dimensional object, and change of the three-dimensional object according to the detected operation will be described with reference to FIGS. 25 and 26. FIGS. 25 and 26 are diagrams for describing detection of the operation of pressing a three-dimensional object, and change of the three-dimensional object according to the detected operation. At Step S31 illustrated in FIG. 25, the three-dimensional object OB1 is stereoscopically displayed in the display space. Further, the user brings the finger F1 in contact with the three-dimensional object OB1.

Assume that the user enters the finger F1 into an inside of the three-dimensional object OB1. When it is detected that the body that is in contact with the three-dimensional object OB1 has been moved to the inside of the three-dimensional object OB1, the display device 1 changes the three-dimensional object OB1 from the time point according to the operation with the finger F1, as illustrated in Step S32. In the example illustrated in FIG. 25, at Step S32, the three-dimensional object OB1 has already started movement in accordance with the movement of the finger F1.

Then, as illustrated in Step S33, the display device 1 determines the three-dimensional object OB1 as the object to be operated, at a stage where the movement of the finger F1 to the inside of the three-dimensional object OB1 is continued for a predetermined time or more. Then, the display device 1 notifies the user of the fact that the three-dimensional object OB1 has been determined as the object to be operated, by changing the display style of the three-dimensional object OB1, or the like. The display device 1 still continues to change the three-dimensional object OB1 while the movement of the finger F1 to the inside of the three-dimensional object OB1 is detected.

As illustrated in Step S34 of FIG. 26, when the movement of the finger F1 to the inside of the three-dimensional object OB1 has not been detected before a predetermined time elapses, the display device 1 applies reverse change to the change applied by that time, to the three-dimensional object OB1. As a result, the three-dimensional object OB1 is displayed at the same position in the same state as the stage of Step S31. The speed to apply the reverse change to the three-dimensional object OB1 may be faster than the speed at which the change to the three-dimensional object OB1 had been applied by that time. That is, the display device 1 may reversely change the three-dimensional object OB1 as if the display device 1 reversely reproduced the three-dimensional object OB1 at a high speed.

As described above, the display device 1 starts applying the change to the three-dimensional object from at the stage where the body enters into the inside of the three-dimensional object, whereby the user can recognize the three-dimensional object is getting selected before the selection is determined. As a result, the user can know whether an intended three-dimensional object has been selected at an early stage. When an unintended three-dimensional object has been selected, the user can put the unintendedly selected three-dimensional object back in an original state, by canceling the operation before the predetermined time elapses.

Until the movement of the finger F1 to the inside of the three-dimensional object OB1 is continued for a predetermined time or more, the three-dimensional object to which the change is applied may be displayed in a style different (for example, translucently) from a normal time or a state in which the selection as the object to be operated has been determined. By the change of the display style in such a manner, the user can easily discriminate the state of the three-dimensional object.

Figure 27:
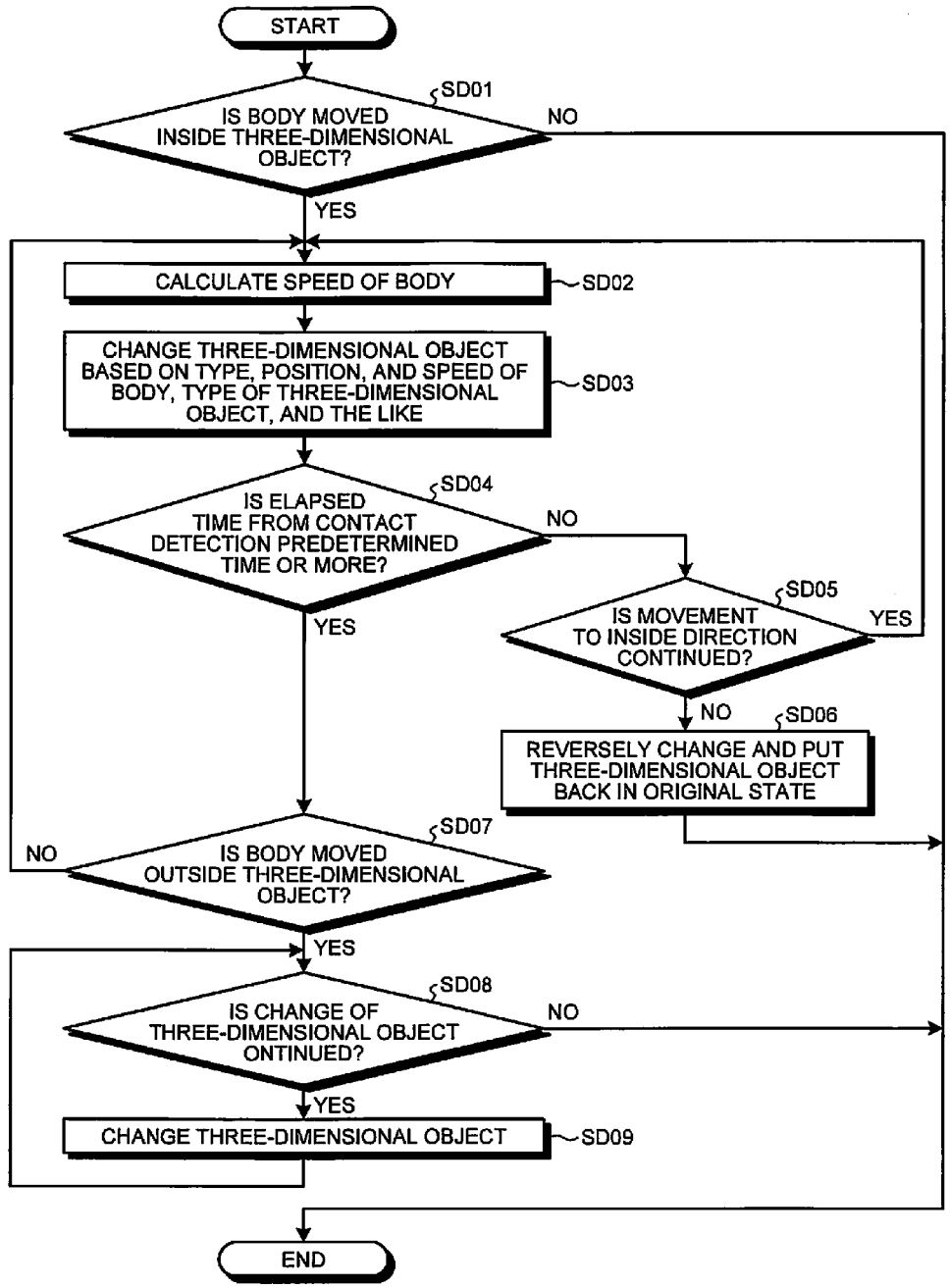
FIG. 27 is a flowchart illustrating a processing procedure of operation detecting processing in the third example.

Then, a processing procedure of the operation detecting processing in the third example will be described with reference to FIG. 27. FIG. 27 is a flowchart illustrating a processing procedure of the operation detecting processing. The processing procedure illustrated in FIG. 27 is realized by the control unit 22 executing the control program 24*a*. The processing procedure in the contact detecting processing is similar to the procedure illustrated in FIG. 21.

As illustrated in FIG. 27, first of all, at Step SD01, the control unit 22 determines whether a predetermined body has been moved to an inside of a three-dimensional object. When the predetermined body has not been moved to the inside of the three-dimensional object (No at Step SD01), the three-dimensional object is determined not to be the object to be operated, and thus the control unit 22 terminates the operation detecting processing.

When the predetermined body has been moved to the inside of the three-dimensional object (Yes at Step SD01), then at Step SD02, the control unit 22 calculates the speed of the predetermined body. Then, at Step SD03, the control unit 22 changes the three-dimensional object based on the type, the position, and the speed of the predetermined body, the type of the three-dimensional object, and the like. A specific way of changing the three-dimensional object is determined according to the acting data 24*c*.

Subsequently, at Step SD04, the control unit 22 determines whether an elapsed time from the contact detection is a predetermined time or more. When the elapsed time is shorter than the predetermined time, that is, when the three-dimensional object has not been determined as an object of the pressing operation (No at Step SD04), then at Step SD05, the control unit 22 determines whether the movement of the predetermined body to the inside of the three-dimensional object is continued.

When the movement to the inside of the three-dimensional object is continued (Yes at Step SD05), the control unit 22 re-executes Step SD02 and subsequent steps. When the movement to the inside of the three-dimensional object is not continued (No at Step SD05), then at Step SD06, the control unit 22 reversely changes the three-dimensional object and puts the three-dimensional object back in the original state. Then, the control unit 22 terminates the operation detecting processing.

When the elapsed time from the contact detection is the predetermined time or more (Yes at Step SD04), then at Step SD07, the control unit 22 determines whether the predetermined body has been moved to an outside of the three-dimensional object. When the predetermined body has not been moved to the outside of the three-dimensional object, that is, when the pressing operation is continued (No at Step SD07), the control unit 22 re-executes Step SD02 and subsequent steps.

When the predetermined body has been moved to the outside of the three-dimensional object, that is, when the three-dimensional object has been released (Yes at Step SD07), then at Step SD08, the control unit 22 determines whether the change of the three-dimensional object is continued. For example, when continuance of vibration for a predetermined time after the release is defined in the acting data 24*c*, it is determined that the change of the three-dimensional object is continued.

When the change of the three-dimensional object is continued (Yes at Step SD08), then at Step SD09, the control unit 22 changes the three-dimensional object, and re-executes Step SD08 and subsequent steps. When the change of the three-dimensional object is not continued (No at Step SD08), the control unit 22 terminates the operation detecting processing.

As described above, in the third example, from the time point when the pressing operation has been detected, the three-dimensional object is changed according to the operation. Therefore, the user can easily recognize that the three-dimensional object is an object of the pressing operation.

While the operation of pressing the three-dimensional object has been described as the operation related to the three-dimensional object, the operation detected by the display device 1 in relation to the three-dimensional object is not limited to the pressing operation. The display device 1 can also detect operation performed by holding the three-dimensional object by the user. Hereinafter, the operation performed by holding the three-dimensional object will be described.

Figure 28:
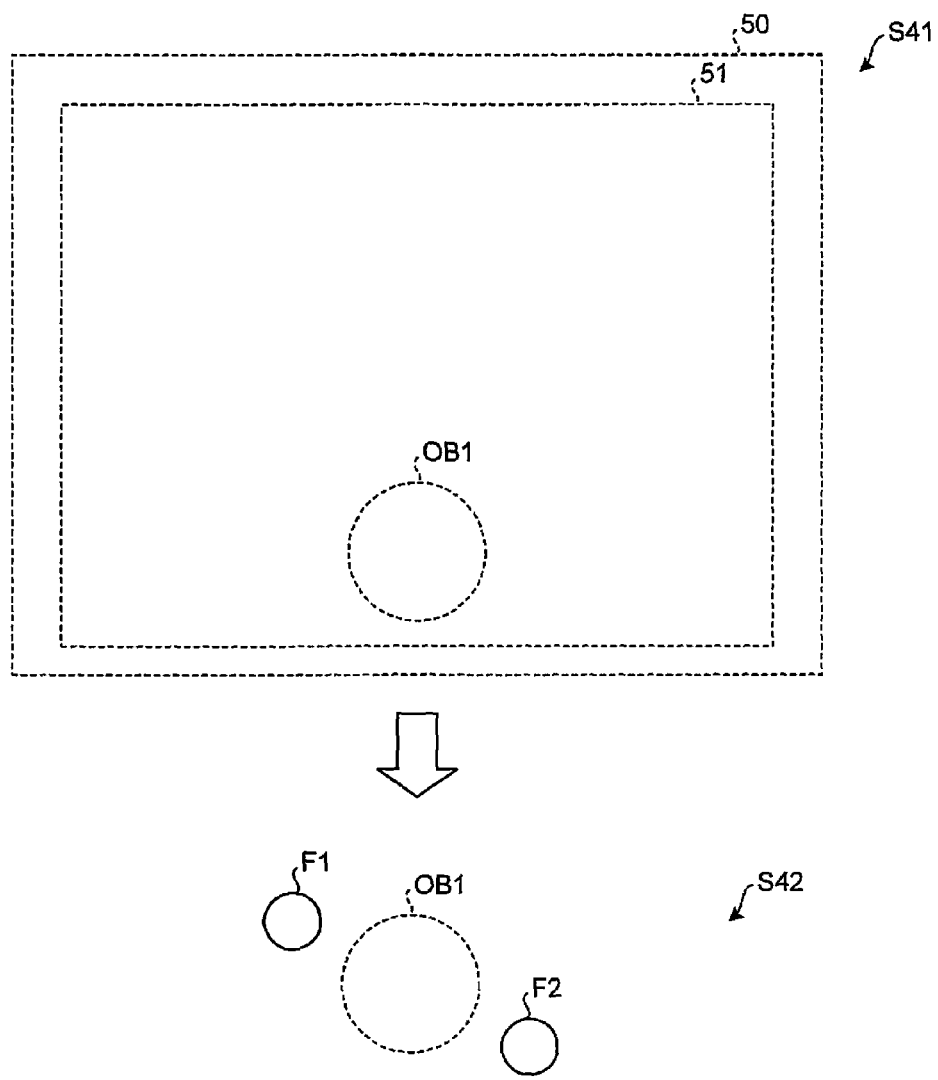
FIG. 28 is a diagram for describing a first example of detection of operation performed by holding a three-dimensional object.

Detection of the operation performed by holding the three-dimensional object will be described with reference to FIG. 28. FIG. 28 is a diagram for describing the detection of the operation performed by holding the three-dimensional object. At Step S41 illustrated in FIG. 28, a three-dimensional object OB1 is stereoscopically displayed in the display space 50.

Assume that the user wishes to hold the three-dimensional object OB1 and perform some sort of operation. To hold the three-dimensional object OB1 and perform some sort of operation, first of all, it is necessary to select the three-dimensional object OB1 as the object to be operated. To select the three-dimensional object OB1, as illustrated in Step S42, the user moves a finger F1 and a finger F2 such that the three-dimensional object OB1 is positioned between the finger F1 and the finger F2, and maintains the state for a predetermined time or more.

When two real bodies have been detected in the display space, and the state in which the three-dimensional object OB1 is positioned between the two bodies is continued for a predetermined time or more, the display device 1 determines that the three-dimensional object OB1 has been selected, and causes the three-dimensional object OB1 to be in a selected state. Then, the display device 1 notifies the user of the fact that the three-dimensional object OB1 is in a selected state, by changing the display style of the three-dimensional object OB1, or the like.

The determination of whether the three-dimensional object OB1 is positioned between the two bodies is made based on the positions of the two bodies in the real space, the shape, the attitude, and the position in the virtual space of the three-dimensional object OB1, and the like. Comparison between the position in the real space and the position in the virtual space may be performed by converting a position in one space into a position in the other space based on the above-described predetermined rule, or may be performed by converting positions in both spaces into positions in a space for comparison. When fingers have been detected as the real bodies, the positions of tips of the fingers may be processed as the positions of the bodies.

As descried above, when the state in which the three-dimensional object OB1 is positioned between the real bodies such as the fingers has been continuously detected for a predetermined time or more, the display device 1 determines that the three-dimensional object OB1 has been selected. The operation of arranging the fingers to sandwich the three-dimensional object OB1 between the fingers is similar to operation of holding something in order to select something in the real space. Therefore, the operation is intuitive and easy to understand, as operation for selecting the three-dimensional object. Further, the continuous detection of the state for the predetermined time or more is added as one of conditions, whereby the possibility of selecting an unintended three-dimensional object in the process of moving the fingers to select another three-dimensional object can be reduced.

After determining that the three-dimensional object OB1 is in the selected state, the display device 1 applies change, such as movement, deformation, or disappearance, to the three-dimensional object OB1 according to the movement of the finger F1 and the finger F2.

Figure 29:
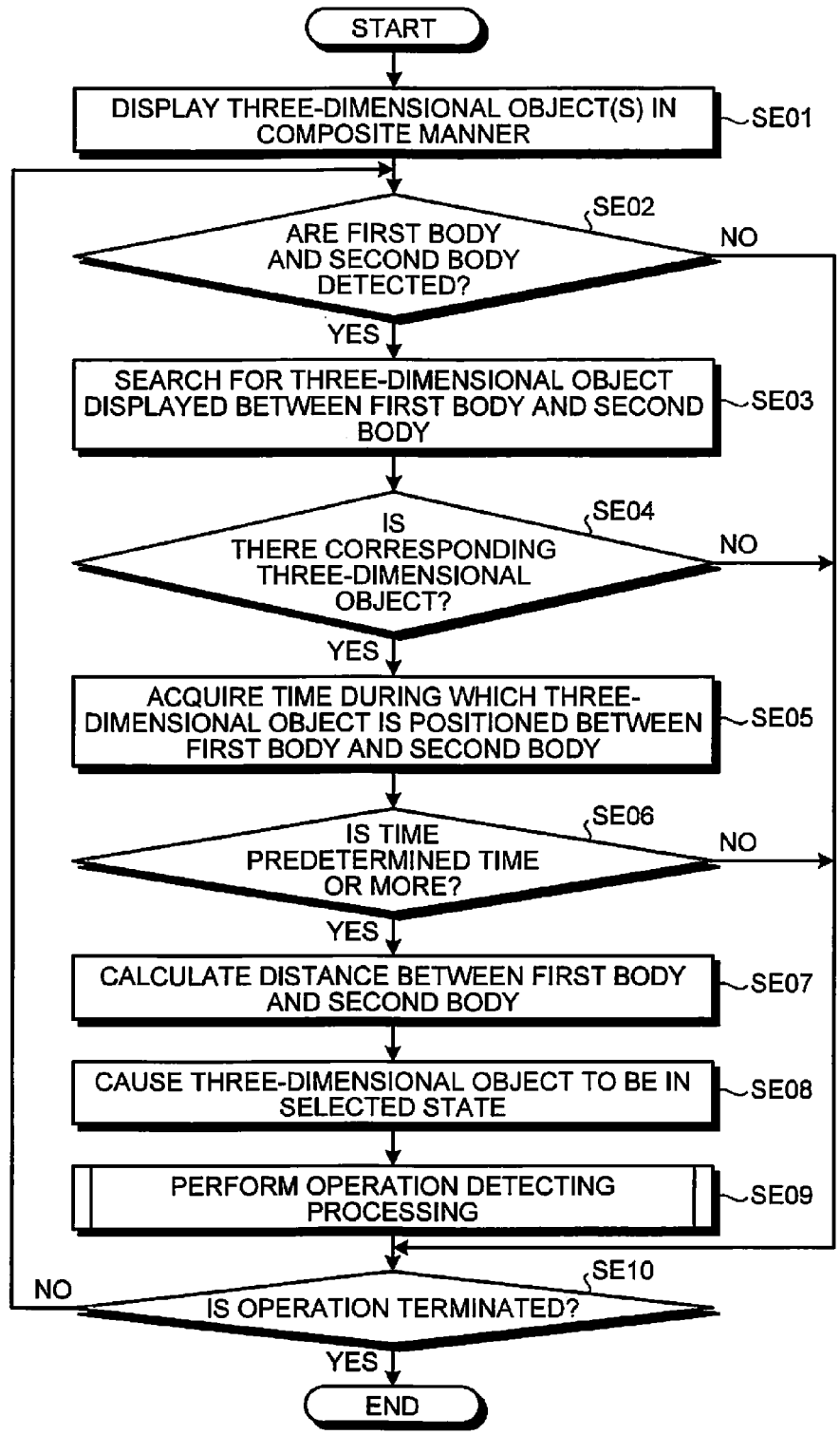
FIG. 29 is a flowchart illustrating a processing procedure of selection detecting processing in the first example.

Then, a first example of a processing procedure executed by the display device 1 in relation to the operation performed by holding the three-dimensional object will be described with reference to FIGS. 29 and 30. FIG. 29 is a flowchart illustrating a processing procedure of selection detecting processing of the three-dimensional object. The processing procedure illustrated in FIG. 29 is realized by the control unit 22 executing the control program 24a.

As illustrated in FIG. 29, first of all, at Step SE01, the control unit 22 composites and displays an image in the virtual space including the three-dimensional object(s) and an image in the real space.

Subsequently, at Step SE02, the control unit 22 determines whether a first body and a second body have been detected by the detection unit 44, that is, by the imaging units 40 and 42. The first body and the second body are real bodies, for example, fingers of the user. When the first body and the second body have not been detected (No at Step SE02), then at Step SE10, the control unit 22 determines whether operation completion has been detected.

The operation completion is, for example, detected when predetermined operation with respect to the operating unit 13 has been performed. When the operation completion has been detected (Yes at Step SE10), the control unit 22 terminates the selection detecting processing. When the operation completion has not been detected (No at Step SE10), the control unit 22 re-executes Step SE02 and subsequent steps.

When the first body and the second body have been detected (Yes at Step SE02), then at Step SE03, the control unit 22 searches the displayed three-dimensional object(s) for a three-dimensional object displayed between the first body and the second body. When there is no corresponding three-dimensional object (No at Step SE04), the control unit 22 proceeds to Step SE10.

When the three-dimensional object displayed between the first body and the second body is found (Yes at Step SE04), then at Step SE05, the control unit 22 acquires a time during which the three-dimensional object is positioned between the first body and the second body. When the acquired time is less than a predetermined time (No at Step SE06), the control unit 22 proceeds to Step SE10.

When the acquired time is the predetermined time or more (Yes at Step SE06), then at Step SE07, the control unit 22 calculates a distance between the first body and the second body. At Step SE08, the control unit 22 causes the three-dimensional object displayed between the first body and the second body to be in the selected state. Then, at Step SE09, the control unit 22 executes operation detecting processing described below, and, in the processing, changes the three-dimensional object in the selected state according to the detected operation. After the operation detecting processing has been completed, the control unit 22 proceeds to Step SE10.

Figure 30:
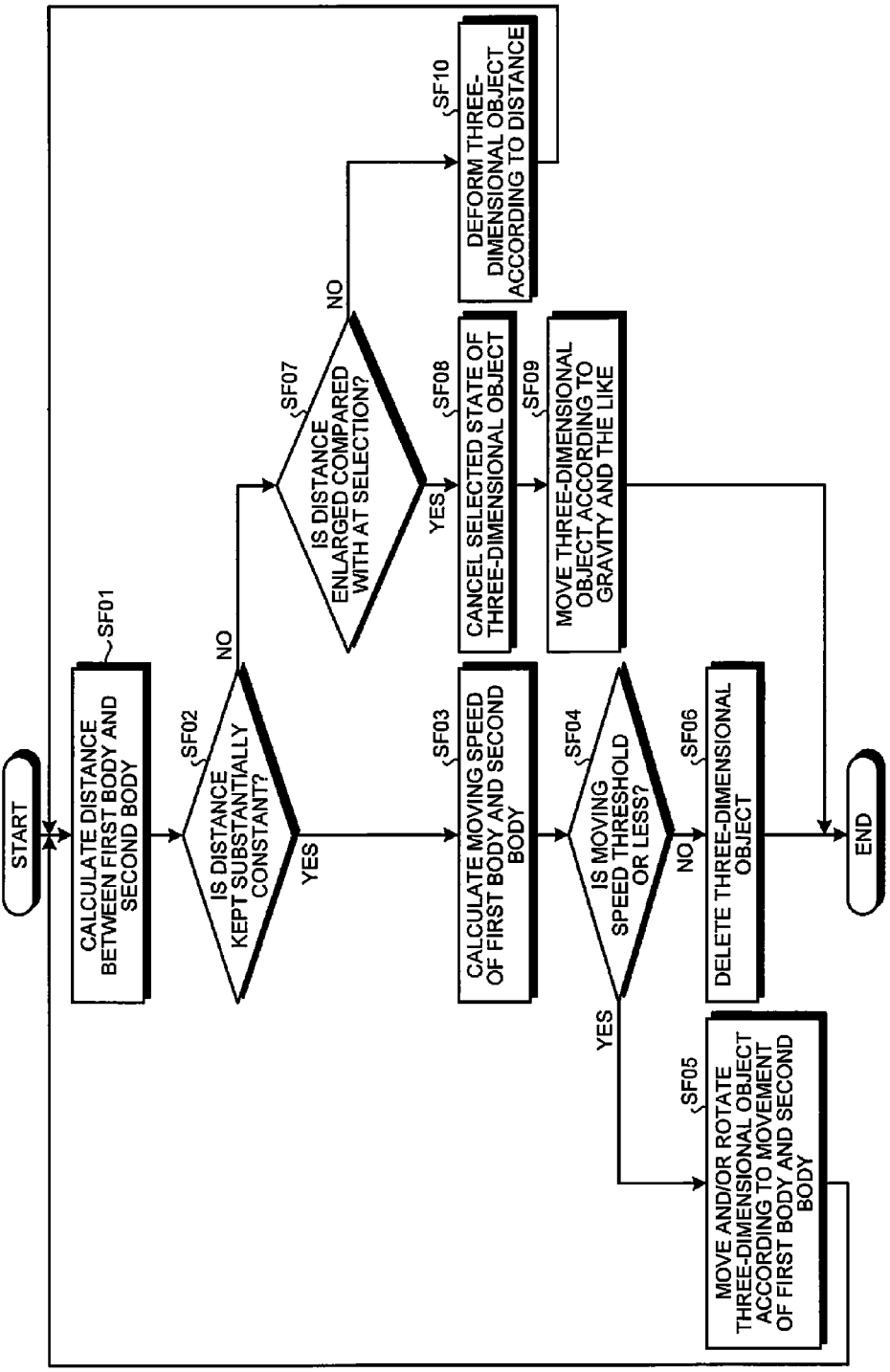
FIG. 30 is a flowchart illustrating a processing procedure of operation detecting processing in the first example.

FIG. 30 is a flowchart illustrating a processing procedure of the operation detecting processing. The processing procedure illustrated in FIG. 30 is realized by the control unit 22 executing the control program 24a.

As illustrated in FIG. 30, first of all, at Step SF01, the control unit 22 calculates a distance between the first body and the second body. Then, at Step SF02, the control unit 22 determines whether the distance between the first body and the second body at and after start time point of the operation detecting processing is kept substantially constant. The distance being kept substantially constant means that an amount of change of the distance between the first body and the second body at the current time point falls within a predetermined range (±10% or so of a maximum amount of change of the distance when the first body and the second body are moved at a normal speed), compared with the distance at the start time point of the operation detecting processing, for example. Alternatively, when the distance between the first body and the second body is continuously reduced at and after the start time point of the operation detecting processing (when the first body and the second body are moved into a direction of squashing the three-dimensional object), the control unit 22 may determine that the distance is kept substantially constant. Further alternatively, when the distance between the first body and the second body is changed only within a range of hand shake, or the like, the control unit 22 may determine that the distance is kept substantially constant.

When the distance between the first body and the second body is kept substantially constant (Yes at Step SF02), then at Step SF03, the control unit 22 calculates a moving speed of the first body and the second body. Then, at Step SF04, the control unit 22 determines whether the calculated moving speed is a threshold or less. The threshold used here is a moving speed of a fingertip of a human when he/she throws an object. The moving speed to be compared with the threshold may be an average speed of the moving speeds of the first body and the second body, or may be a faster one or a slower one of the moving speeds of the first body and the second body.

When the moving speed is the threshold or less (Yes at Step SF04), then at Step SF05, the control unit 22 applies change to the three-dimensional object according to detected movement of the first body and second body. For example, when movement of the first body and the second body in the right direction is detected, the control unit 22 moves the three-dimensional object in the right direction in accordance with the movement of the first body and the second body. When left-handed rotation of the first body and the second body is detected, the control unit 22 rotates the three-dimensional object in a left-handed direction in accordance with the rotation of the first body and the second body. When the movement and the rotation have been detected at the same time, the movement and the rotation are executed at the same time. When there is an obstacle against the movement and/or the rotation of the three-dimensional object, the movement and/or the rotation of the three-dimensional object may be stopped at a time point when the three-dimensional object comes in contact with the obstacle. The obstacle may be a real body, or may be another three-dimensional object. Then, the control unit 22 re-executes Step SF01 and the subsequent steps.

When the moving speed is faster than the threshold (No at Step SF04), then at Step SF06, the control unit 22 deletes the three-dimensional object. When deleting the three-dimensional object, the control unit 22 may display animation such that the three-dimensional object flies on to the moving direction of the first body and the second body. Then, the control unit 22 terminates the operation detecting processing. As described above, the three-dimensional object is deleted when the first body and the second body are moved at a high speed to throw the three-dimensional object, whereby the deletion of the three-dimensional object can be realized with intuitive operation. Instead of the operation to move the first body and the second body at a high speed, the deletion of the three-dimensional object may be allocated to operation to squash the three-dimensional object. Instead of deleting the three-dimensional object, the three-dimensional object may be put back to an initial arrangement location. The display device 1 may not perform the processing of Steps SF03, SF04, and SF06. That is, when the distance between the first body and the second body is determined to be kept substantially constant at Step SF02, the display device 1 may execute Step SF05 regardless of the moving speed of the two bodies.

When the distance between the first body and the second body is not kept substantially constant (No at Step SF02), then at Step SF07, the control unit 22 determines whether the distance is enlarged, compared with at the time of selecting the three-dimensional object, that is, the start time point of the operation detecting processing. When the distance is enlarged (Yes at Step SF07), then at Step SF08, the control unit 22 cancels the selected state of the three-dimensional object. The operation to enlarge the distance between the first body and the second body is similar to operation to release a held real object. Therefore, the operation is intuitive and easy to understand, as the operation for canceling the selection of the three-dimensional object.

Subsequently, at Step SF09, the control unit 22 moves the three-dimensional object, the selection state of which has been canceled, according to the gravity and the like. Then, the control unit 22 terminates the operation detecting processing. The movement here is displayed such that the three-dimensional object falls down according to the gravity, and is stopped on a floor or a table, for example. Before stopping the movement of the three-dimensional object, the control unit 22 may cause the three-dimensional object to bound according to elasticity of the three-dimensional object and hardness of the floor or the table. The control unit 22 may calculate magnitude of impact of when the three-dimensional object collides with the floor or the table, and when the impact is larger than a predetermined value, the control unit 22 may display the three-dimensional object as if it had been broken. The control unit 22 may move the three-dimensional object slower than the case where the actual gravity works.

When the distance between the first body and the second body is reduced, compared with at the time of selecting the three-dimensional object (No at Step SF07), then at Step SF10, the control unit 22 deforms the three-dimensional object according to the distance. Then, the control unit 22 re-executes Step SF01 and the subsequent steps. The degree of deformation of the three-dimensional object may be changed according to elasticity set to the three-dimensional object as an attribute. The control unit 22 may increase the degree of deformation as the distance between the first body and the second body is reduced, regarding an object to which low hardness is set as the attribute, like the three-dimensional object that is modeled on a rubber ball. The control unit 22 may keep the degree of deformation small even if the distance between the first body and the second body is reduced, regarding an object to which high hardness is set as the attribute, like the three-dimensional object that is modeled on a block.

When the distance between the first body and the second body is reduced, compared with at the time of selecting the three-dimensional object, the display device 1 may reduce the size of the three-dimensional object instead of deforming the three-dimensional object. When the distance between the first body and the second body becomes a predetermined value or less, the display device 1 may display the three-dimensional object as if it had been broken.

As described above, in the first example, when the state in which the three-dimensional object is positioned between the bodies such as the fingers is continued for a predetermined time or more, the three-dimensional object is selected. Therefore, the selection of the three-dimensional object can be realized by intuitive and easily understandable operation.

Figure 31:
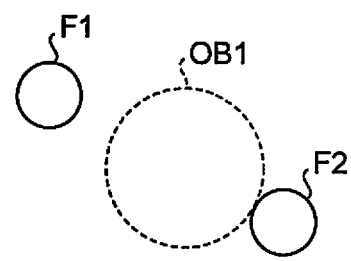
FIG. 31 is a diagram for describing a modification of the first example of detection of operation performed by holding a three-dimensional object.

AS illustrated in FIG. 31, the display device 1 may employ continuance of the state in which at least one of the first body and the second body is in contact with the three-dimensional object for a predetermined time or more, as one of conditions to select the three-dimensional object. By employment of the contact with the three-dimensional object, as one of conditions of selection, the user can easily select a desired three-dimensional object when a plurality of three-dimensional objects is closely displayed.

A second example of a processing procedure related to the operation performed by holding the three-dimensional object will be described. The operation detecting processing in the second example is the same as the operation detecting processing in the first example. Therefore, in the second example, description overlapping with the first example is not repeated, and the selection detecting processing will be mainly described.

First of all, detection of the operation performed by holding the three-dimensional object will be described with reference to FIG. 32. FIG. 32 is a diagram for describing detection of the operation performed by holding the three-dimensional object. At Step S51 illustrated in FIG. 32, a three-dimensional object OB1 is stereoscopically displayed in the display space. To select the three-dimensional object OB1, the user moves the finger F1 and the finger F2 such that the three-dimensional object OB1 is positioned between the finger F1 and the finger F2.

When two real bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in the selected state. Then, the display device 1 notifies the user of the fact that the three-dimensional object OB1 is in the selected state, by changing the display style of the three-dimensional object OB1, or the like.

The two bodies do not necessarily stay at the positions where the two bodies sandwich the three-dimensional object OB1 while the display device 1 is monitoring the change of the distance between the two bodies. That is, after moving the finger F1 and finger F2 such that the three-dimensional object OB1 is positioned between the finger F1 and finger F2 as illustrated at Step S51, the user can move the finger F1 and the finger F2 to other positions without keeping the state of the finger F1 and the finger F2.

Assume that the user has moved the finger F1 and the finger F2 from the state of Step S51 while keeping a distance D1 between the finger F1 and the finger F2 substantially constant, as illustrated at Step S52. In this case, as illustrated at Step S53, the display device 1 causes the three-dimensional object OB1 to be in the selected state at a stage where the state in which the distance D1 between the finger F1 and the finger F2 is kept substantially constant is continued for a predetermined time or more. Then, the display device 1 moves the three-dimensional object OB1 to between the finger F1 and the finger F2 as if the three-dimensional object OB1 had already been selected at the stage of Step S51. The display device 1 may store the movement of the finger F1 and the finger F2 from Steps S51 to S53, and apply rotation or the like to the three-dimensional object OB1 in accordance with the stored movement. Subsequently, the display device 1 applies change, such as movement, deformation, or disappearance, to the three-dimensional object OB1 according to the movement of the finger F1 and the finger F2.

As described above, when the two bodies are once moved to the position where these bodies sandwich the three-dimensional object, the display device 1 allows the user to select the three-dimensional even if these bodies do not stay at the position thereafter, whereby the user can promptly start operation after the selection of the three-dimensional object.

Figure 33:
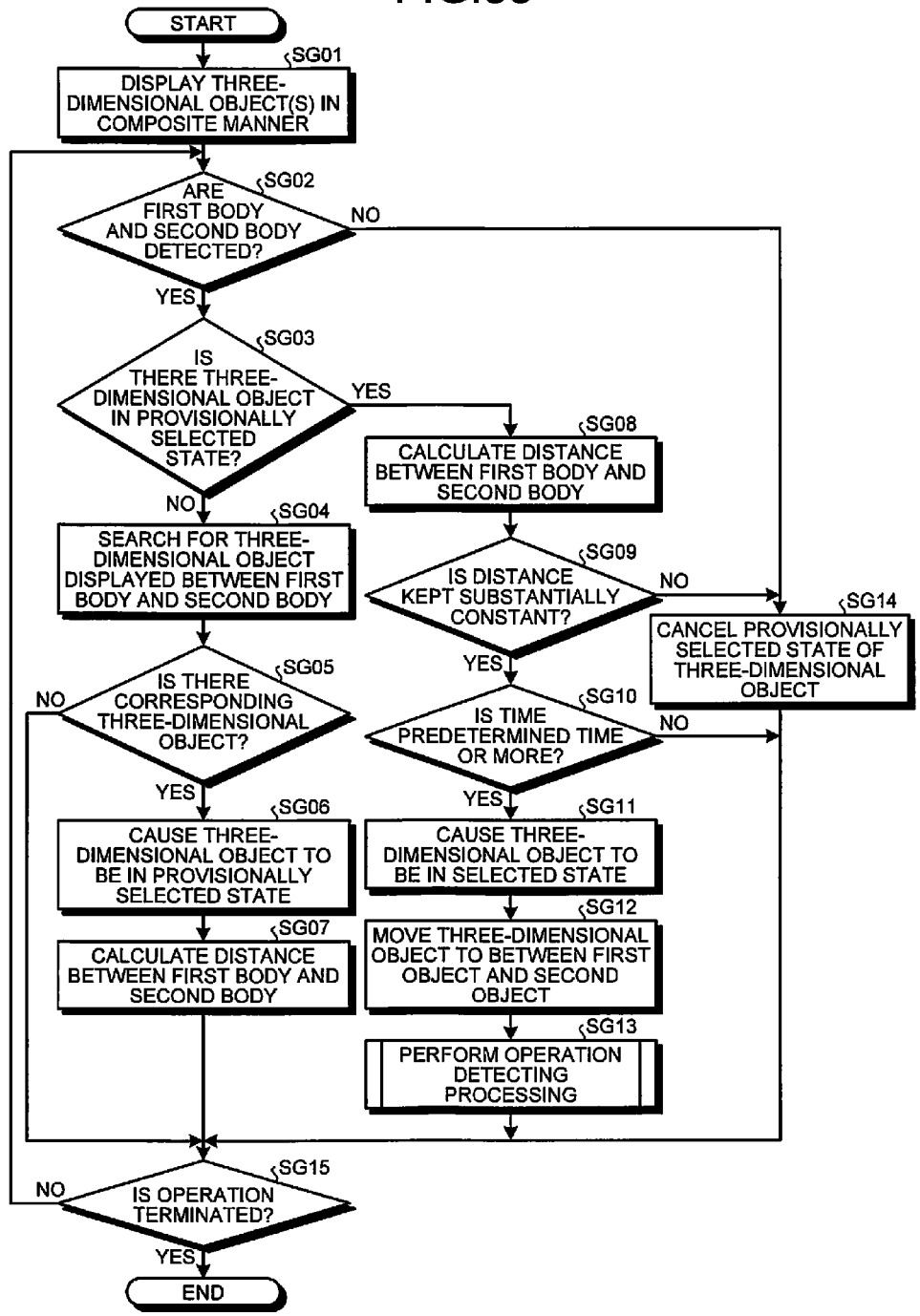
FIG. 33 is a flowchart illustrating a processing procedure of selection detecting processing in the second example.

Then, a processing procedure of the selection detecting processing in the second example will be described with reference to FIG. 33. FIG. 33 is a flowchart illustrating a processing procedure of the selection detecting processing of the three-dimensional object. The processing procedure illustrated in FIG. 33 is realized by the control unit 22 executing the control program 24*a*.

As illustrated in FIG. 33, first of all, at Step SG01, the control unit 22 composites and displays an image in the virtual space including the three-dimensional object(s) and an image in the real space. Subsequently, at Step SG02, the control unit 22 determines whether the first body and the second body have been detected by the detection unit 44, that is, by the imaging units 40 and 42. When the first body and the second body have not been detected (No at Step SG02), then at Step SG14, if there is a three-dimensional object in a provisionally selected state, the control unit 22 cancels the provisionally selected state of the three-dimensional object. The provisionally selected state is a state in which whether the distance between the two bodies is kept substantially constant is monitored, after the state in which the three-dimensional object is displayed between the two bodies has been detected.

Then, at Step SG15, the control unit 22 determines whether operation termination has been detected. When the operation termination has been detected (Yes at Step SG15), the control unit 22 terminates the selection detecting processing. When the operation termination has not been detected (No at Step SG15), the control unit 22 re-executes Step SG02 and the subsequent steps.

When the first body and the second body have been detected (Yes at Step SG02), then at Step SG03, the control unit 22 determines whether there is a three-dimensional object in the provisionally selected state. When there is no three-dimensional object in the provisionally selected state (No at Step SG03), then at Step SG04, the control unit 22 searches displayed three-dimensional object(s) for a three-dimensional object displayed between the first body and the second body. When there is no corresponding three-dimensional object (No at Step SG05), then the control unit 22 proceeds to Step SG15.

When the three-dimensional object displayed between the first body and the second body is found (Yes at Step SG05), then at Step SG06, the control unit 22 causes the three-dimensional object displayed between the first body and the second body to be in the provisionally selected state. At Step SG07, the control unit 22 calculates a distance between the first body and the second body. Then, the control unit 22 proceeds to Step SG15.

When the first body and the second body have been detected, and there is the three-dimensional object in the provisionally selected state (Yes at Step SG03), then at Step SG08, the control unit 22 calculates the distance between the first body and the second body. Then, at Step SG09, the control unit 22 determines whether the distance is kept substantially constant. When the distance is not kept substantially constant (No at Step SG09), then at Step SG14, the control unit 22 cancels the provisionally selected state of the three-dimensional object in the provisionally selected state. Then, the control unit 22 proceeds to Step SG15.

When the distance between the first body and the second body is kept substantially constant (Yes at Step SG09), then at Step SG10, the control unit 22 determines whether a period in which the distance is kept substantially constant is a predetermined time or more. When the period in which the distance is kept substantially constant is less than the predetermined time (No at Step SG10), the control unit 22 proceeds to Step SG15.

When the period in which the distance is kept substantially constant is the predetermined time or more (Yes at Step SG10), then at Step SG11, the control unit 22 causes the three-dimensional object displayed between the first body and the second body to be in the selected state. Further, at Step SG12, the control unit 22 moves the three-dimensional object to between the first body and the second body. Then, at Step SG13, the control unit 22 executes the operation detecting processing illustrated in FIG. 30, and in the processing, changes the three-dimensional object in the selected state according to the detected operation. After the operation detecting processing is terminated, the control unit 22 proceeds to Step SG15.

As described above, in the second example, when the three-dimensional object is positioned between the bodies such as the fingers, and thereafter the distance between the bodies is kept substantially constant for a predetermined time or more, the three-dimensional object is selected. Therefore, the user can promptly start operation after the selection of the three-dimensional object.

As illustrated in Steps S61 to S63 of FIG. 34, the display device 1 may employ keeping the distance between the first body and the second body substantially constant for the predetermined time or more after at least one of the first body and the second body comes in contact with the three-dimensional object, as one of conditions to select the three-dimensional object. By employment of the contact with the three-dimensional object, as one of conditions of selection, the user can easily select a desired three-dimensional object when a plurality of three-dimensional objects is closely displayed.

A third example of a processing procedure related to the operation performed by holding the three-dimensional object will be described. In the third example, description overlapping with the first example is not repeated, and the selection detecting processing and the operation detecting processing will be mainly described.

First, detection of the operation performed by holding the three-dimensional object will be described with reference to FIGS. 35 and 36. FIGS. 35 and 36 are diagrams for describing detection of the operation performed by holding the three-dimensional object. At Step S71 illustrated in FIG. 35, a three-dimensional object OB1 is stereoscopically displayed in the display space. Further, to select the three-dimensional object OB1, the user moves the finger F1 and the finger F2 such that the three-dimensional object OB1 is positioned between the finger F1 and the finger F2.

When two real bodies have been detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in the selected state. Then, the display device 1 notifies the user of the fact that the three-dimensional object OB1 is in the selected state, by changing the display style of the three-dimensional object OB1, or the like.

The two bodies do not necessarily stay at the positions where the two bodies sandwich the three-dimensional object OB1 while the display device 1 is monitoring the change of the distance between the two bodies. That is, after moving the finger F1 and finger F2 such that the three-dimensional object OB1 is positioned between the finger F1 and finger F2 as illustrated at Step S71, the user can move the finger F1 and the finger F2 to other positions without keeping the state of the finger F1 and the finger F2.

Assume that the user has moved the finger F1 and the finger F2 from the state of Step S71 while keeping a distance D1 between the finger F1 and the finger F2 substantially constant, as illustrated at Step S72. In this case, the display device 1 applies change, such as movement, deformation, or disappearance, to the three-dimensional object OB1, according to movement of the finger F1 and the finger F2, from at a stage where it is detected that the three-dimensional object OB1 is displayed between the finger F1 and the finger F2, that is, from at a stage of Step S71. Then, as illustrated at Step S73, the display device 1 causes the three-dimensional object OB1 to be in a selected state at a stage where the state in which the distance D1 between the finger F1 and the finger F2 is kept substantially constant is continued for a predetermined time or more.

As illustrated in Steps S74 of FIG. 36, when the distance D1 between the finger F1 and the finger F2 is enlarged before the predetermined time elapses, that is, when selection has not been performed, the display device 1 applies reverse change to the change applied by that time, to the three-dimensional object OB1. As a result, the three-dimensional object OB1 is displayed at the same position in the same state as the stage of Step S71. The speed to apply the reverse change to the three-dimensional object OB1 may be faster than the speed at which the change to the three-dimensional object OB1 had been applied by that time. That is, the display device 1 may reversely change the three-dimensional object OB1 as if the three-dimensional object OB1 was reversely reproduced at a high speed.

As described above, the display device 1 starts applying the change to the three-dimensional object from at the stage where it is detected that the three-dimensional object is displayed between the two bodies, whereby the user can recognize that the three-dimensional object is getting selected before the selection is determined. As a result, the user can recognize whether the intended three-dimensional object has been selected at an early stage. Until the state in which the distance between the two bodies is kept substantially constant is continued for the predetermined time or more, the display device 1 may display the three-dimensional object, to which the change is applied, in a different style (for example, translucently) from a normal time or from the selected state, thereby to allow the user to be able to easily discriminate a state of the three-dimensional object.

Figure 37:
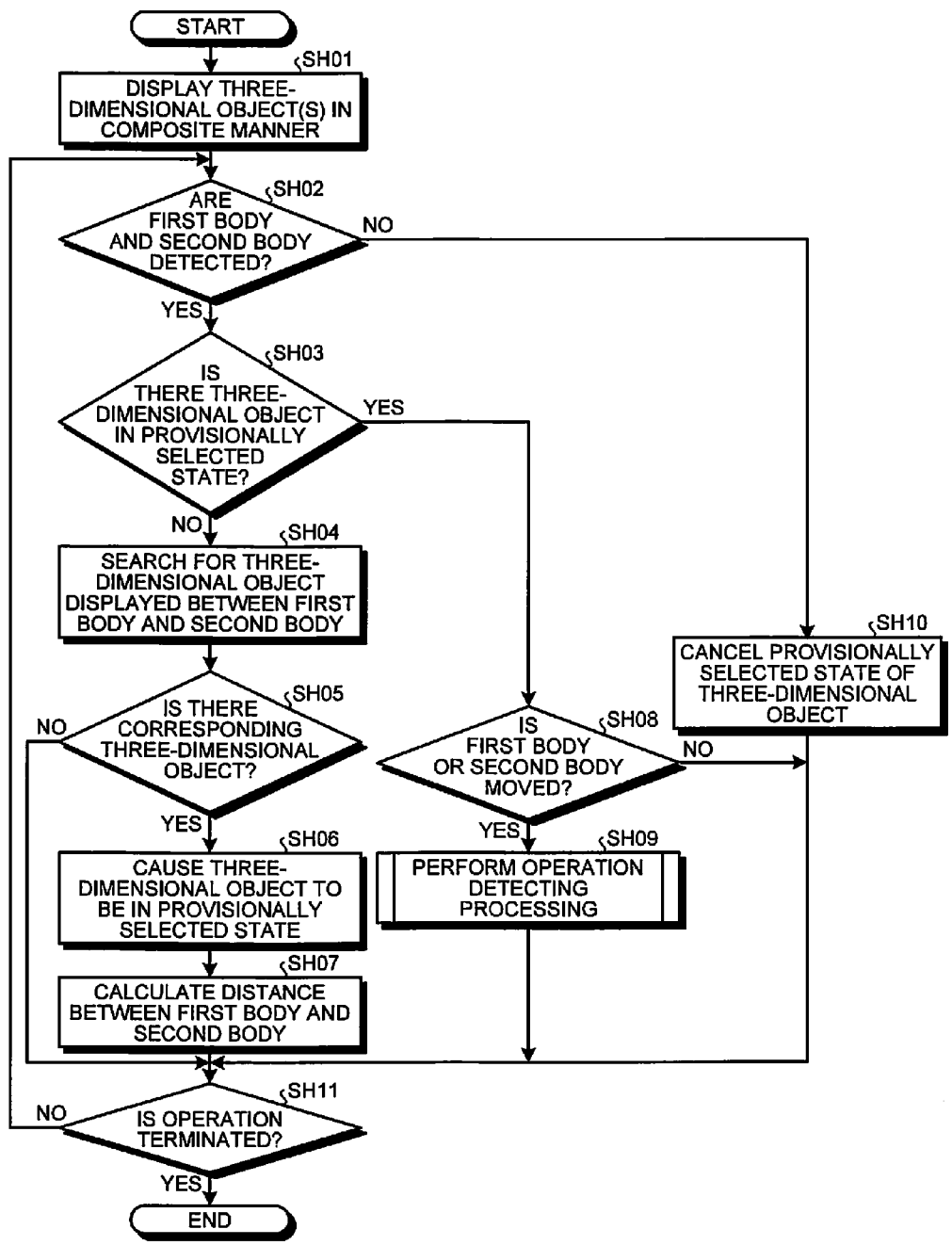
FIG. 37 is a flowchart illustrating a processing procedure of selection detecting processing in the third example.

Then, a processing procedure executed by the display device 1 in relation to the operation performed by holding the three-dimensional object will be described with reference to FIGS. 37 and 38. FIG. 37 is a flowchart illustrating a processing procedure of the selection detecting processing of the three-dimensional object. The processing procedure illustrated in FIG. 37 is realized by the control unit 22 executing the control program 24a.

As illustrated in FIG. 37, first of all, at Step SH01, the control unit 22 composites and displays an image in the virtual space including the three-dimensional object(s) and an image in the real space. Subsequently, at Step SH02, the control unit 22 determines whether the first body and the second body have been detected by the detection unit 44, that is, by the imaging units 40 and 42. When the first body and the second body have not been detected (No at Step SH02), then at Step SH10, if there is a three-dimensional object in a provisionally selected state, the control unit 22 cancels the provisionally selected state of the three-dimensional object.

Then, at Step SH11, the control unit 22 determines whether operation completion has been detected. When the operation completion has been detected (Yes at Step SH11), the control unit 22 terminates the selection detecting processing. When the operation completion has not been detected (No at Step SH11), the control unit 22 re-executes Step SH02 and subsequent steps.

When the first body and the second body have been detected (Yes at Step SH02), then at Step SH03, the control unit 22 determines whether there is a three-dimensional object in the provisionally selected state. When there is no three-dimensional object in the provisionally selected state (No at Step SH03), then at Step SH04, the control unit 22 searches displayed three-dimensional object(s) for a three-dimensional object displayed between the first body and the second body. When there is no corresponding three-dimensional object (No at Step SH05), the control unit 22 proceeds to Step SH11

When the three-dimensional object displayed between the first body and the second body is found (Yes at Step SH05), then at Step SH06, the control unit 22 causes the three-dimensional object displayed between the first body and the second body to be in the provisionally selected state. At Step SH07, the control unit 22 calculates the distance between the first body and the second body. Then, the control unit 22 proceeds to Step SH11.

When the first body and the second body have been detected, and there is the three-dimensional object in the provisionally selected state (Yes at Step SH03), then at Step SH08, the control unit 22 determines whether at least one of the first body and the second body has been moved. When both of the first body and the second body has not been moved (No at Step SH08), the control unit 22 proceeds to Step SH11.

Figure 38:
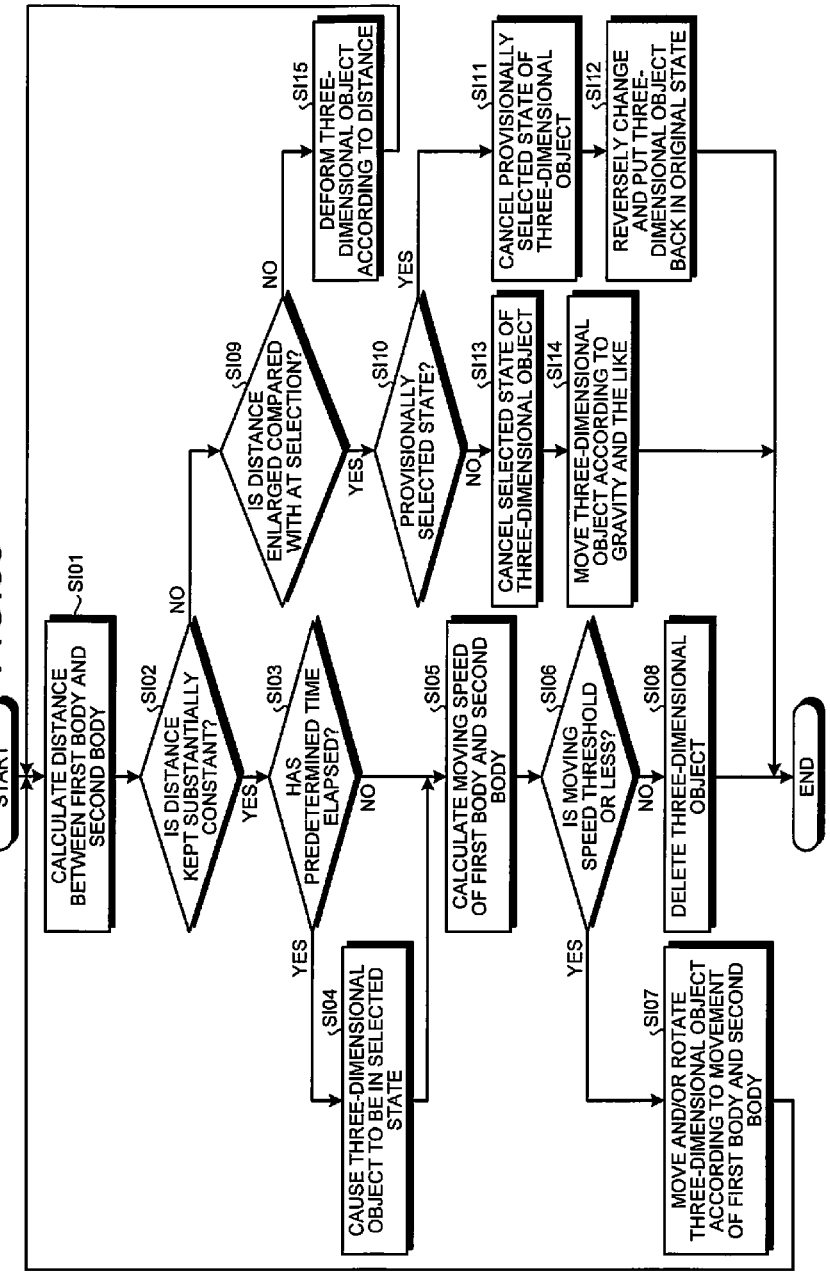
FIG. 38 is a flowchart illustrating a processing procedure of operation detecting processing in the third example.

When at least one of the first body and the second body has been moved (Yes at Step SH08), then at Step SH09, the control unit 22 executes the operation detecting processing illustrated in FIG. 38, and in the processing, changes the three-dimensional object in the selected state, according to the detected operation. After the operation detecting processing is terminated, the control unit 22 proceeds to Step SH11.

FIG. 38 is a flowchart illustrating a processing procedure of the operation detecting processing. The processing procedure illustrated in FIG. 38 is realized by the control unit 22 executing the control program 24a. As illustrated in FIG. 38, first of all, at Step SI01, the control unit 22 calculates the distance between the first body and the second body. Then, at Step SI02, the control unit 22 determines whether the distance between the first body and the second body at and after the start time point of the operation detecting processing is kept substantially constant.

When the distance between the first body and the second body is kept substantially constant (Yes at Step S102), then at Step SI03, the control unit 22 determines whether a predetermined time has elapsed after the operation detecting processing is started. When the predetermined time has elapsed (Yes at Step SI03), then at Step SI04, if there is a three-dimensional object in the provisionally selected state, the control unit 22 causes the three-dimensional object to be in the selected state. When the predetermined time has not elapsed (No at Step S103), Step SI04 is not executed.

Subsequently, at Step SI05, the control unit 22 calculates the moving speed of the first body and the second body. Then, at Step SI06, the control unit 22 determines whether the calculated moving speed is a threshold or less. When the moving speed is the threshold or less (Yes at Step SI06), then at Step SI07, the control unit 22 moves and/or rotates the three-dimensional object according to the detected movement of the first body and the second body. Then, the control unit 22 re-executes Step SI01 and subsequent steps.

When the moving speed is faster than the threshold (No at Step SI06), then at Step SI08, the control unit 22 deletes the three-dimensional object. In deleting the three-dimensional object, the control unit 22 may display animation such that the three-dimensional object flies on to the moving direction of the first body and the second body. Then, the control unit 22 terminates the operation detecting processing. Instead of the operation to move the first body and the second body at a high speed, the deletion of the three-dimensional object may be allocated to operation to squash the three-dimensional object. Instead of the deletion of the three-dimensional object, the three-dimensional object may be put back to an initial arrangement location. The display device 1 may not perform the processing of Steps SI05, SI06, and SI08. That is, the display device 1 may execute Step SI07 regardless of the moving speed of the two bodies when determining No at Step SI03 or after executing Step SI04.

When the distance between the first body and the second body is not kept substantially constant (No at Step S102), then at Step SI09, the control unit 22 determines whether the distance is enlarged, compared with at the time of selecting the three-dimensional object, that is, the start time point of the operation detecting processing. When the distance is enlarged (Yes at Step SI09), then at Step SI10, the control unit 22 determines whether the three-dimensional object displayed between the first body and the second body is in the provisionally selected state.

When the three-dimensional object is in the provisionally selected state (Yes at Step SI10), then at Step SI11, the control unit 22 cancels the provisionally selected state of the three-dimensional object. Further, at Step SI12, the control unit 22 reversely changes and puts the three-dimensional object back in the original state. Then, the control unit 22 terminates the operation detecting processing.

When the three-dimensional object is not in the provisionally selected state, that is, the three-dimensional object is in the selected state (No at Step SI10), then at Step SI13, the control unit 22 cancels the selected state of the three-dimensional object. Then, at Step SI14, the control unit 22 moves the three-dimensional object, the selection state of which has been canceled, according to the gravity, and the like. Then, the control unit 22 terminates the operation detecting processing. The movement here is displayed such that the three-dimensional object falls down according to the gravity, and is stopped on a floor or a table, for example. Before stopping the movement of the three-dimensional object, the control unit 22 may cause the three-dimensional object to bound according to elasticity of the three-dimensional object and hardness of the floor or the table. The control unit 22 may calculate magnitude of impact of when the three-dimensional object collides with the floor or the table, and when the impact is larger than a predetermined value, the control unit 22 may display the three-dimensional object as if it had been broken. The control unit 22 may move the three-dimensional object slower than the case where the actual gravity works.

When the distance between the first body and the second body is reduced, compared with at the time of selecting the three-dimensional object (No at Step SI09), then at Step SI15, the control unit 22 deforms the three-dimensional object according to the distance. Then, the control unit 22 re-executes Step SI01 and subsequent steps. The degree of deforming the three-dimensional object may be changed according to the hardness set to the three-dimensional object, as an attribute.

As described above, in the third example, from the time point when the three-dimensional object positioned between the bodies such as the fingers is detected, the three-dimensional object is changed according to the operation. Therefore, the user can easily recognize the selection of the three-dimensional object.

As illustrated in Steps S81 to S83 of FIG. 39, keeping the distance between the first body and the second body substantially constant for the predetermined time or more after at least one of the first body and the second body comes in contact with the three-dimensional object may be employed as one of conditions to select the three-dimensional object. By employment of the contact with the three-dimensional object as one of conditions of selection, the user can easily select a desired three-dimensional object when a plurality of three-dimensional objects is closely displayed.

The display device 1 described in the above embodiments can be applied to various uses. The three-dimensional object (display item) that is an object to be operated may be an object that is modeled on a thing that actually exists, such as a book, a block, a spoon, chopsticks, trumps, clay, or a musical instrument, or may be an object that does not actually exist, such as a virtual avatar, a character in a game, or a virtual reality AR tag. The change applied to the three-dimensional object according to the detected operation is not limited to the movement, deformation, disappearance, or the like. For example, change in one object includes replacement of the one object with another object. Further, the change applied to the three-dimensional object according to the pressing operation is not limited to the embodiments, and may be changed according to the type of the three-dimensional object.

For example, when the three-dimensional object that is modeled on clay (hereinafter, simply referred to as "clay") is used as the object to be operated, the clay may be deformed according to the pressing operation so that the user can form the clay into an arbitrary shape. The viscosity of the clay may be decreased over time as if the clay would be dried. The viscosity of the clay may be improved when operation to press the clay with a finger or a hand put in the three-dimensional object of water has been detected.

When the three-dimensional object that is modeled on a record (hereinafter, simply referred to as "record") is used as the object to be operated, the record may be rotated around a fulcrum according to the pressing operation, and the sound may be recorded. A technique by a disk jockey, such as scratch, may be virtually realized by having rotation and reproduction of a sound in conjunction with each other.

Embodiment 2

One of examples of applying a display device 1 to a product sale through a network will be described. FIGS. 40 to 44 are diagrams for describing one of examples in which the display device 1 is applied to a sale of pizza through a network.

FIG. 40 is a diagram for describing start of order processing of pizza. When starting an order of pizza, a user wears the display device 1, and looks at a plane having a certain level of space. For example, when the user looks at a table T1, the display device 1 displays an image P3h in which the actual table T1 appears. The display device 1 acquires object data 24b, acting data 24c, and virtual space data 24d from a sale site of pizza through communication by a communication unit 16 according to an instruction of the user, and generates a virtual space based on the acquired data. The display device 1 superimposes an image of the generated virtual space and an image in the real space to display an image P3i.

In the image P3i, a plurality of three-dimensional objects is arranged on the table T1. The arranged three-dimensional objects include large dough 61L, medium dough 61M, small dough 61S, cases 62a to 62f which respectively contain toppings such as sesame, tomato, and cheese, a rolling pin 63, a ketchup tube 64, and an oven 65. The dough 61L is dough for a large-size pizza, the dough 61M is dough for a medium-size pizza, and the dough 61S is dough for a small-size pizza. By the start of the order processing of pizza as described above, the ingredients of pizza and the oven 65 are arranged on the plane, as the three-dimensional objects.

The display device 1 may display the ingredients of pizza and the oven 65, using the object data 24b, the acting data 24c, and the virtual space data 24d stored in the storage unit 24 in advance.

Figure 41:
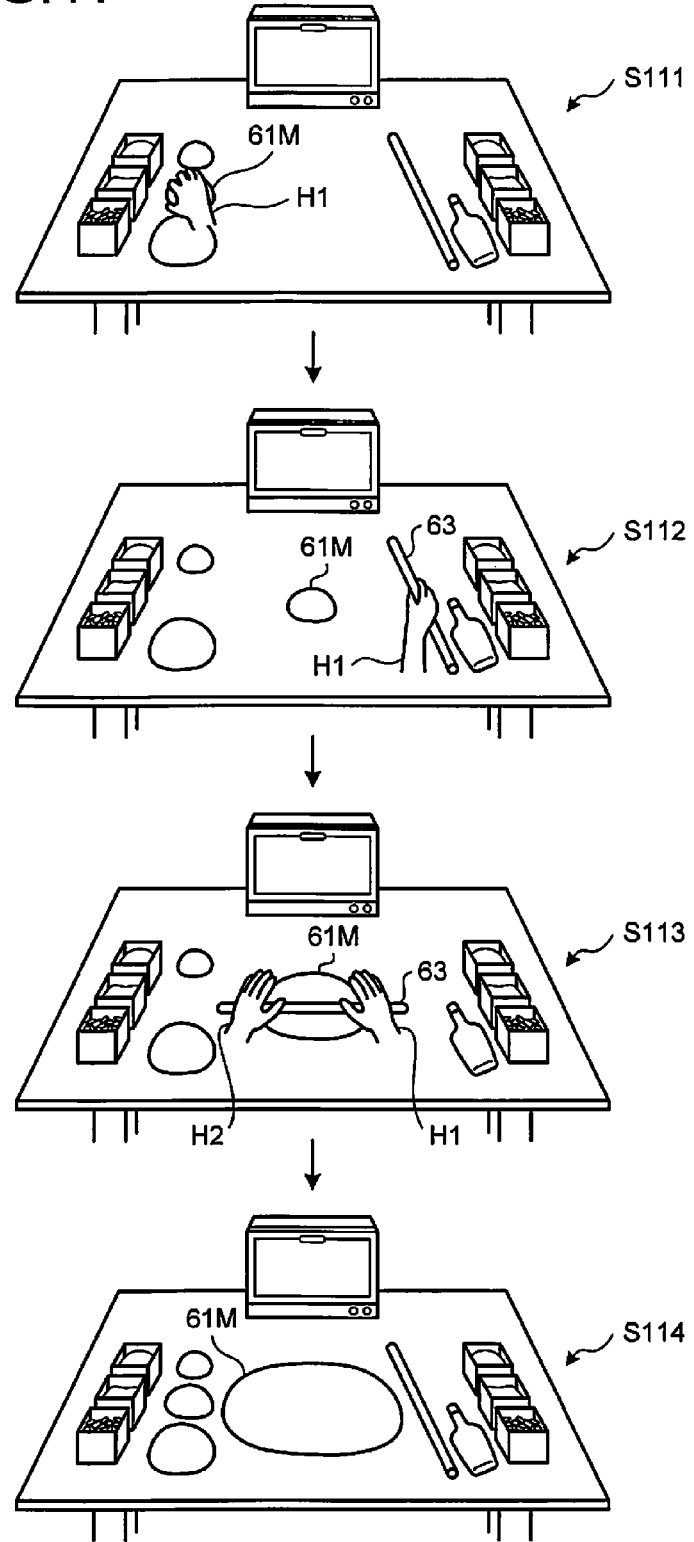
FIG. 41 is a diagram for describing a process of determining the size and the thickness of dough.

FIG. 41 is a diagram for describing a process of determining the size and the thickness of dough. At Step S111 of FIG. 41, the user holds the dough 61M with a hand H1. By being held, the dough 61M is selected and becomes in a state of being moved according to movement of the hand H1. At Step S112, the user places the dough 61M in the almost center of the plane of the table T1, and holds the rolling pin 63 with the hand H1. By being held, the rolling pin 63 is selected, and becomes in a state of being moved according to the movement of the hand H1.

At Step S113, the user places the rolling pin 63 on the dough 61M, and rotates the rolling pin 63 with hands H1 and H2. In the object data 24b, the rolling pin 63 is defined as a rigid body, and the dough 61M is defined as a plastic body. In the acting data 24c, it is defined that, when the plastic body is pressed by the rigid body, a pressed portion is recessed. Therefore, when the user rotates the rolling pin 63 on the dough 61M, the dough 61M is circularly rolled out, and becomes thinner. The user rotates the rolling pin 63 on the dough 61M until the dough 61M comes to have a desired size and thickness, as illustrated in Step S114.

The operation to determine the size and the thickness of the dough is not limited to the example illustrated in FIG. 41. For example, when the user expands the interval between the both hands after holding the dough 61M with the both hands, the dough 61M may be rolled out to a circle with a diameter of the interval of the both hands. Alternatively, when the user holds a part of the dough 61M with two fingers, the entire dough 61M may be deformed into a circular thin shape with the thickness of the interval of the two fingers. In these operations, by adjustment of the interval of the hands or of the fingers, the size and the thickness of the dough can be easily adjusted.

Figure 42:
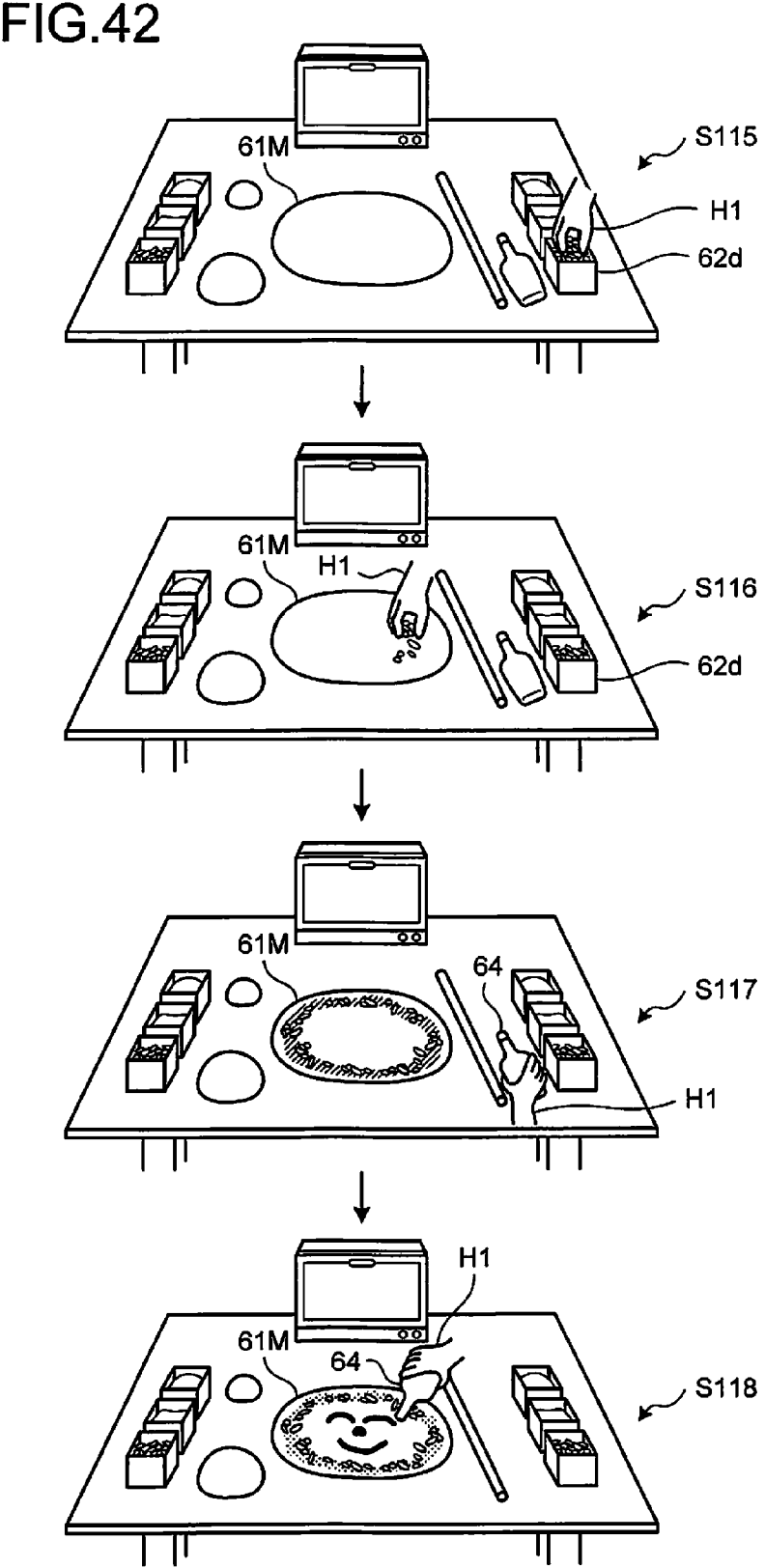
FIG. 42 is a diagram for describing a process of adding toppings.

FIG. 42 is a diagram for describing a process of adding toppings. At Step S115 of FIG. 42, the user holds sesame put in the case 62d with the fingers of the hand H1. By being held, the sesame is selected and becomes in a state of being moved according to the movement of the hand H1. At Step S116, the user moves the sesame to a desired position on the dough 61M, and then expands the interval of the fingers of the hand H1. As a result, the sesame is arranged on a desired position on the dough 61M.

By repetition of similar operation, the user arranges desired toppings as much as desired on desired positions.

At Step S117, the user holds the ketchup tube 64 with the hand H1. By being held, the ketchup tube 64 is selected and becomes in a state of being moved according to the movement of the hand H1. At Step S118, the user holds the ketchup tube 64 with an outlet down, and moves the ketchup tube 64 on the dough 61M while pressing a belly portion. In the acting data 24c, the tube is defined such that contents are pressed out through the outlet when the belly portion is pressed. By use of the action, at Step S118, a picture is drawn by the user on the dough 61M with the ketchup.

Figure 43:
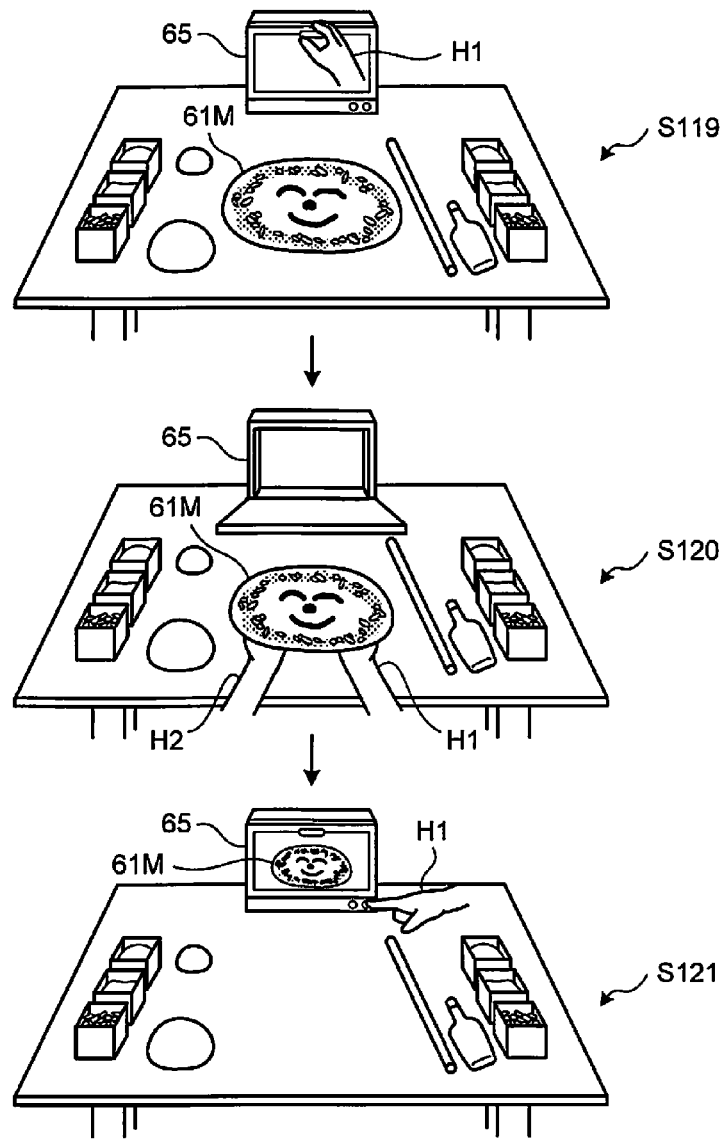
FIG. 43 is a diagram for describing an order process of a pizza.

FIG. 43 is a diagram for describing a process of ordering a pizza. At Step S119 of FIG. 43, the user opens a front door of the oven 65 with the hand H1. At Step S120, the user holds the dough 61M with the hands H1 and H2, and puts the dough 61M in the oven 65, and at Step S121, the user presses a switch of the oven 65 with a finger of the hand H1.

When the operation for heating the pizza is performed as described above, the order of the pizza is determined, and order data is transmitted to the sale site of pizza. The last process for making a product is associated with execution of an order, whereby the user can intuitively execute the order without performing unnecessary operation, while following the process of making the product. The operation for ordering a pizza may be another operation. For example, a three-dimensional object including a button for order, which is displayed together with the ingredients of pizza, is displayed, and operation to press the button may be employed as the operation for ordering a pizza.

The order data is used for the purpose of determining the price of the pizza, and for the purpose of reproducing the ordered pizza. The order data includes information related to the size of the selected dough, the size and the thickness of the rolled dough, the types, the amounts, the positions of the toppings, and the like. The order data may include an image of the three-dimensional object of the pizza made by the user, or a history of the operation of when the user made the three-dimensional object of the pizza. These pieces of information are acquired in a process of reproducing a similar process of actually making a pizza, by operating the three-dimensional objects of the ingredients of the pizza by the user. Therefore, the user can order the pizza with a method through which the user can easily imagine a pizza to be made, without performing troublesome operation such as inputting a quantity.

Figure 44:
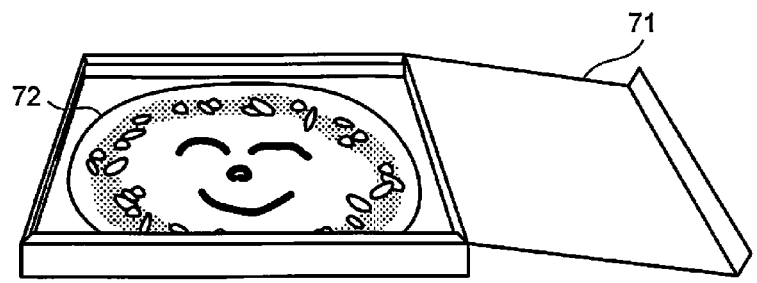
FIG. 44 is a diagram illustrating one of examples of a pizza to be delivered.

Subsequently, as illustrated in FIG. 44, a pizza 72 put in a pizza box 71 is delivered according to the order data. The pizza 72 is cooked to reproduce the three-dimensional object of the pizza made in FIGS. 40 to 43 as accurately as possible. The reproduction of the pizza 72 may be performed by a cook by reference to the order data. The cook may cook the pizza 72 while looking at the image of the pizza 72 made in the three-dimensional object by the user, or by looking at a video that reproduces the operation history of the user. Alternatively, a cooking machine (robot) may cook the pizza 72 based on the order data.

As described above, the order data is created based on the operation with respect to the three-dimensional object, whereby customizing and ordering the product to user's taste can be easily realized.

Then, a processing procedure of the order processing will be described with reference to FIG. 45. The order processing illustrated in FIG. 45 is realized by the control unit 22 executing the control program 24a.

Figure 45:
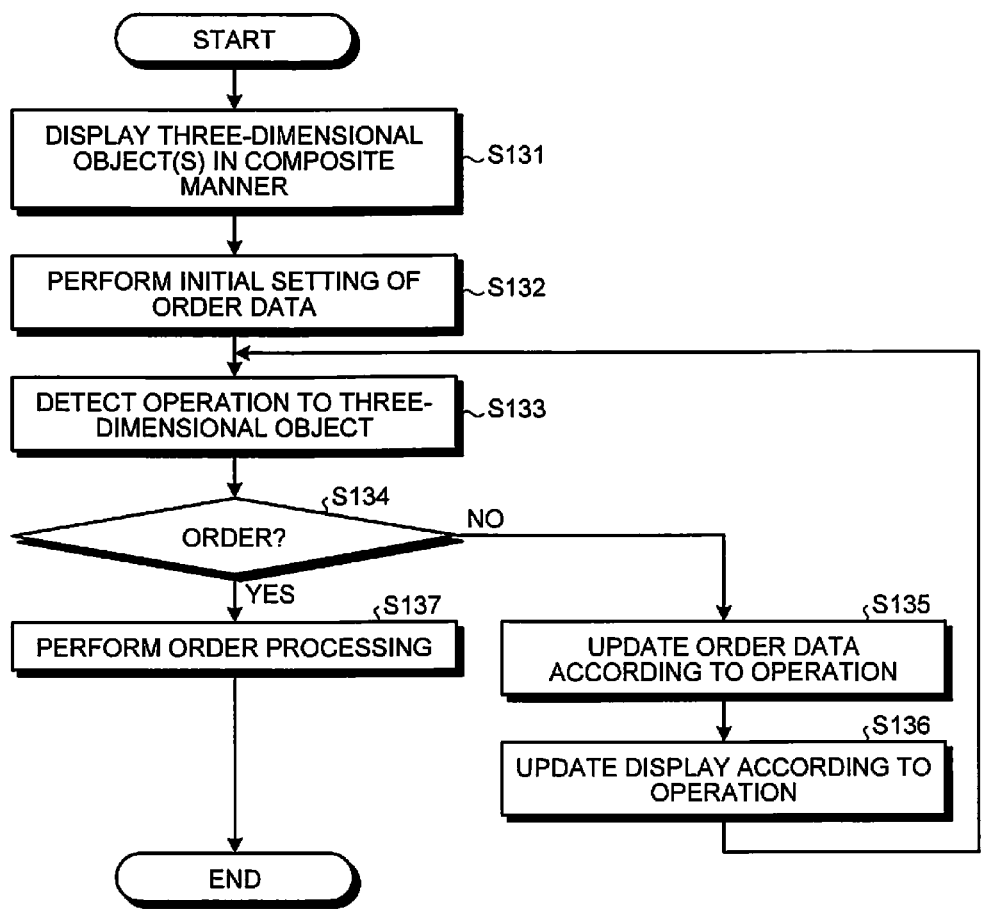
FIG. 45 is a flowchart illustrating a processing procedure of order processing.

As illustrated in FIG. 45, first of all, at Step S131, the control unit 22 composites and displays an image in the virtual space including the three-dimensional object(s) related to the product, and an image in the real space. Subsequently, at Step S132, the control unit 22 performs initial setting of the order data. To be specific, the control unit 22 causes a state of the product indicated by the current three-dimensional object(s), and a state of the product indicated by the order data to accord with each other.

At Step S133, the control unit 22 detects operation with respect to the three-dimensional object. Then, at Step S134, the control unit 22 determines whether the detected operation is operation associated with execution of the order. When the detected operation is not the operation associated with the execution of the order (No at Step S134), the control unit 22 proceeds to Step S135. At Step S135, the control unit 22 updates the order data according to the detected operation. Then, at Step S136, the control unit 22 updates display of the display units 32a and 32b according to the detected operation. Subsequently, the control unit 22 returns to Step S133.

When the detected operation is operation associated with the execution of the order at Step S134 (Yes at Step S134), then at Step S137, the control unit 22 executes the order processing. To be specific, the control unit 22 transmits the order data to an order destination through communication by a communication unit 16. Subsequently, the control unit 22 terminates the order processing.

The above order system can be used when the user orders other foods through the network. For example, when ordering a noodle, the user reproduces a process of boiling a noodle, a process of making a soup, and a process of adding toppings, using the three-dimensional objects, whereby the user can specify the amount of noodle, how long the noodle is boiled (hardness), the strength of a flavor, the types, the amounts, and arrangement of the toppings. For example, when ordering a bento box, the user reproduces a process of packing dishes in the bento box and a process of packing rice in the bento box, using the three-dimensional objects, whereby the user can specify the types, the amounts, and arrangement of the dishes, and the amount of the rice. For example, when ordering sushi, the user reproduces a process of making a sushi by hand, using the three-dimensional objects, whereby the user can specify the types of sushi ingredients and how to arrange sushi in a sushi oke (wooden bowl).

In the above order system, the virtual space may be shared by a plurality of users. In this case, the virtual space is managed by one of display devices 1 owned by a plurality of users or another device such as a server, and information related to operation detected by each display device 1 is transmitted to the device that manages the virtual space by communication. The device that manages the virtual space updates the three-dimensional objects in the virtual space and the order data, based on the transmitted information related to the operation. By sharing of the virtual space by the plurality of users in this way, the work of making a pizza in the virtual space can be performed in cooperation with each other.

The above order system can be applied to when a product other than foods is ordered through the network. For example, when a bouquet or a flower arrangement is ordered, flowers in stock in a flower shop may be displayed as the three-dimensional objects. In this case, the user can purchase a bouquet or a flower arrangement made by combination of favorite flowers in favorable arrangement, by reproducing a process of combining the three-dimensional objects of favorite flowers to make the bouquet or the flower arrangement. In this case, an interior of the flower shop may be reproduced with the three-dimensional object, and the order may be performed by bringing the finished bouquet or flower arrangement to a cash register. The bouquet or the flower arrangement may be delivered to a home or a shipping address, or the user may visit the flower shop and receive the product by asking the shop to inform the user of the timing of the product ready, or being notified by the shop.

The above order system may be applied to when clothes and accessories are ordered through the network. In this case, the user can purchase products after combining the three-dimensional objects of the clothes and the accessories, and confirming the coordinate. Items to be combined may be the three-dimensional objects of the products in different shops. Further, the user can combine the three-dimensional object of the product with real clothes or accessories that the user has already purchased. In this way, the clothes and the accessories are displayed as the three-dimensional objects to which operation such as movement can be performed, whereby the user can purchase products while confirming various combinations.

The clothes and the accessories are displayed in a manner superimposed with the real space, as the three-dimensional objects, whereby the user can accurately grasp the size of the product.

When ordering the clothes and the accessories through the network, the products may be displayed in a virtual shopping mall that is modeled on an actual shop. In this case, a display that cannot be performed in reality can be performed, such as floating the product in the air. Further, unlike a paper catalogue, the stock and the display can be associated with each other, such that the product is not displayed if there is no stock. Further, the products are merely virtually displayed, and thus the user may be able to perform payment of all purchased products in one shop, regardless of which shop the products are sold at. In this case, distribution of the sales of each shop is executed in background processing.

The order of the product is executed by bringing the three-dimensional object of the product to the cash register, for example. Alternatively, the order of the product is realized by performing operation of taking out a three-dimensional object that is modeled on a credit card from a wallet, or by performing operation presenting a three-dimensional object that is modeled on a credit card. Actual payment is executed by an actual credit card registered in advance.

The virtual space including the shopping mall may be shared by a plurality of users. In this case, the three-dimensional object that indicates each user, such as an avatar, may be displayed at a position corresponding to a view point of the user in the virtual space. By display of the three-dimensional objects that indicate the users, popularity of the shops and the products can be easily recognized.

Aspects of the present invention described in the above embodiments can be arbitrarily changed without departing from the gist of the present invention. Further, the above embodiments may be appropriately combined. For example, the control program described in the embodiments may be divided into a plurality of modules, or may be integrated with another program.

In the above-described embodiments, the display device has detected the operation to the three-dimensional object by itself. However, the display device may detect the operation to the three-dimensional object in cooperation with a server. In this case, the display device sequentially transmits images captured by the imaging units or information detected by the detection units to the server, and the server detects the operation, and notifies the display device of the detection result. With such a configuration, the load of the display device can be reduced.

The invention claimed is:

1. A stereoscopic display device, comprising:
 a display unit configured to three-dimensionally display an object by displaying images respectively corresponding to both eyes of a user wearing the stereoscopic display device;
 a sensor configured to detect, by using at least one of visible light, infrared light, ultraviolet rays, a radio wave, a sound wave, magnetism, and capacitance, first and second real bodies that operate the object; and
 a controller including a central processing unit and a memory, said controller being configured to
  calculate a distance between the first real body and the second real body,
  determine whether the calculated distance is constant,
  in response to the calculated distance being constant,
   calculate a moving speed of the first and second real bodies,
   delete the object in response to the moving speed being greater than a predetermined value, and
   move the object according to movement of the first and second real bodies in response to the moving speed being not greater than the predetermined value, and
  in response to the calculated distance being reduced,
   deform the object according to movement of the first and second real bodies, and
   perform order processing of ordering a product corresponding to a shape of the deformed object in response to a predetermined change accompanying movement of the deformed object and occurred in the deformed object according to the movement of the first and second real bodies, wherein the predetermined change accompanying the movement of the deformed object is a last process for making the product and is associated with execution of the order of the product.

2. The stereoscopic display device according to claim 1, wherein the controller is configured to
 combine a first object with a second object according to the movement of the first and second real bodies, the first and second objects being three-dimensionally displayed by the display unit, and
 perform the order processing of ordering the product that is a combination of (i) a first product or a member that constitutes the first product corresponding to the first object with (ii) a second product or a member that constitutes the second product corresponding to the second object.

3. The stereoscopic display device according to claim 2, wherein the controller is configured to perform the order processing based on information indicating a manner of combining the first object with the second object.

4. The stereoscopic display device according to claim 1, wherein the display device is configured to share a virtual space in which the object is arranged with another display device.

5. The stereoscopic display device according to claim 1, wherein the controller is configured to deform the object according to a change of a position or a direction of the stereoscopic display device, and perform the order processing of the product according to the shape of the deformed object.

6. The stereoscopic display device according to claim 1, wherein
the object which is three-dimensionally displayed by the display unit includes a first object and a second object, and
the controller is configured to perform the order processing by moving the first object, in response to the movement of the first and second real bodies, to superimpose the first object on the second object.

7. The stereoscopic display device according to claim 1, wherein
the controller is configured to perform the order processing which includes a process of making the product.

8. A method of controlling a stereoscopic display device including a display unit, a sensor, and a controller, said controller including a central processing unit and a memory, the method comprising:

three-dimensionally displaying an object on the display unit by displaying images respectively corresponding to both eyes of a user;

detecting, by the sensor which uses at least one of visible light, infrared light, ultraviolet rays, a radio wave, a sound wave, magnetism, and capacitance, first and second real bodies that operate the object;

calculating, by the controller, a distance between the first real body and the second real body;

determining, by the controller, whether the calculated distance is constant;

in response to the calculated distance being constant,
calculating, by the controller, a moving speed of the first and second real bodies,
deleting, by the controller, the object in response to the moving speed being greater than a predetermined value, and
moving, by the controller, the object according to movement of the first and second real bodies in response to the moving speed being not greater than the predetermined value; and in response to the calculated distance being reduced,
deforming, by the controller, the object according to movement of the first and second real bodies, and
performing, by the controller, order processing of ordering a product corresponding to a shape of the deformed object in response to a predetermined change accompanying movement of the deformed object and occurred in the deformed object according to the movement of the first and second real bodies, wherein the predetermined change accompanying the movement of the deformed object is a last process for making the product and is associated with execution of the order of the product.

* * * * *